US008342957B2

(12) United States Patent
Carpenter et al.

(10) Patent No.: US 8,342,957 B2
(45) Date of Patent: Jan. 1, 2013

(54) CONVERTIBLE IN-REVENUE AND OUT-OF-REVENUE GAMING SYSTEM AND METHOD WITH A REAL-TIME PLAYER DASHBOARD DISPLAY

(75) Inventors: John J. Carpenter, Austin, TX (US); Keith Riggs, Austin, TX (US); Allison Pope, Austin, TX (US); Michael D. Conway, Austin, TX (US); Clint Owen, Austin, TX (US); Bradley W. Johnson, Austin, TX (US); JP Cody, Austin, TX (US)

(73) Assignee: Multimedia Games, Inc., Austin, TX (US)

( * ) Notice: Subject to any disclaimer, the term of this patent is extended or adjusted under 35 U.S.C. 154(b) by 0 days.

(21) Appl. No.: 13/232,900

(22) Filed: Sep. 14, 2011

(65) Prior Publication Data

US 2012/0083908 A1 Apr. 5, 2012

Related U.S. Application Data

(60) Provisional application No. 61/388,596, filed on Sep. 30, 2010, provisional application No. 61/406,035, filed on Oct. 22, 2010.

(51) Int. Cl.
*A63F 13/00* (2006.01)

(52) U.S. Cl. ........................................... 463/27; 463/42

(58) Field of Classification Search .................... 463/27, 463/42

See application file for complete search history.

(56) References Cited

U.S. PATENT DOCUMENTS

| | | | | |
|---|---|---|---|---|
| 6,039,648 | A | 3/2000 | Guinn et al. | |
| 7,934,994 | B2 * | 5/2011 | LeMay et al. | 463/32 |
| 2004/0224773 | A1 * | 11/2004 | Sham | 463/42 |
| 2008/0102916 | A1 | 5/2008 | Kovacs et al. | |
| 2008/0113745 | A1 | 5/2008 | Williams et al. | |
| 2009/0048012 | A1 | 2/2009 | Patel et al. | |
| 2009/0104965 | A1 * | 4/2009 | House et al. | 463/20 |
| 2009/0131145 | A1 | 5/2009 | Aoki et al. | |
| 2009/0176572 | A1 | 7/2009 | Reddy et al. | |
| 2009/0189351 | A1 | 7/2009 | Baerlocher et al. | |
| 2010/0004058 | A1 * | 1/2010 | Acres | 463/27 |
| 2010/0035674 | A1 | 2/2010 | Slomiany et al. | |
| 2010/0130280 | A1 | 5/2010 | Arezina et al. | |
| 2011/0159940 | A1 * | 6/2011 | Acres | 463/11 |

OTHER PUBLICATIONS

International Search Report dated Feb. 22, 2012, in PCT application No. PCT/US2011/53192 (3 pages).

Written Opinion of the International Search Authority dated Feb. 22, 2012, in PCT application No. PCT/US2011/53192 (7 pages).

* cited by examiner

*Primary Examiner* — Masud Ahmed

(74) *Attorney, Agent, or Firm* — Russell D. Culbertson, Esq.; JP Cody

(57) ABSTRACT

A convertible in-revenue and out-of-revenue gaming system is disclosed that includes a server connected to automatically convert operating modes and control in-revenue and out-of-revenue operation of one or more banks of gaming machines wherein each of the gaming machines includes a video camera connected to capture live player video feed during competition or tournament operating mode, and each of the gaming machines is operable to display a tournament game presentation simultaneously with a player dashboard. The player dashboard includes a display of the live player video, the player position, the player score, and remaining time in the competition or tournament.

16 Claims, 47 Drawing Sheets

1200

1400

CONVERTIBLE IN-REVENUE AND OUT-OF-REVENUE GAMING SYSTEM AND METHOD WITH A REAL-TIME PLAYER DASHBOARD DISPLAY

CROSS-REFERENCE TO RELATED APPLICATIONS

The Applicants claim the benefit, under 35 U.S.C. §119(e), of U.S. Provisional Patent Application No. 61/388,596 filed Sep. 30, 2010, and entitled "Convertible In-Revenue and Out-of-Revenue Gaming System and Method With a Real-Time Player Dashboard Display," and of U.S. Provisional Patent Application No. 61/406,035 filed Oct. 22, 2010, having the same title. The entire content of each of these provisional applications is incorporated herein by this reference.

COPYRIGHT NOTICE

A portion of the disclosure of this patent document contains material which is subject to copyright protection. The copyright owner has no objection to the facsimile reproduction of the patent document or the patent disclosure, as it appears in the U.S. Patent and Trademark Office patent files or records, but otherwise reserves all rights of copyright whatsoever.

BACKGROUND OF THE INVENTION

1. Field of the Invention

This invention relates to wagering games, gaming machines, gaming systems, and associated methods. More particularly, the invention relates to convertible in-revenue and out-of-revenue gaming machines, systems and related methods including a player dashboard display operable during tournament or competition operating mode.

2. Description of the Related Art

Various gaming systems have been developed to provide in-revenue and out-of-revenue gaming machines and systems. Most of those systems are either dedicated to in-revenue operation or out-of-revenue operation. An example of in-revenue operation is where play at a gaming machine or system is initiated with a money (or equivalent) wager by a player. An example of out-of-revenue operation is where game play at a gaming machine or system does not require a wager (e.g. tournament or free play).

There continues to be a need for innovative methods and gaming systems which provide convertibility between in-revenue and out-of-revenue gaming operation. There is also a need for innovative methods and systems for presenting tournament games in different ways to generate player interest and excitement.

SUMMARY OF THE INVENTION

In accordance with one or more embodiments of the present invention, a convertible in-revenue and out-of-revenue gaming system includes a server connected to automatically convert operating modes and control in-revenue and out-of-revenue operations of one or more banks of gaming machines. Each gaming machine may include a video camera connected to capture a live video feed during tournament or competition play. During tournament or competition operating mode, each gaming machine may be operable to display a game presentation simultaneously with a player dashboard.

The player dashboard includes display areas for presenting the live streaming video, the player score, the player position, and the time remaining.

These and other advantages and features of the invention will be apparent from the following description of illustrative embodiments, considered along with the accompanying drawings.

DESCRIPTION OF ILLUSTRATIVE EMBODIMENTS

Figure 1:
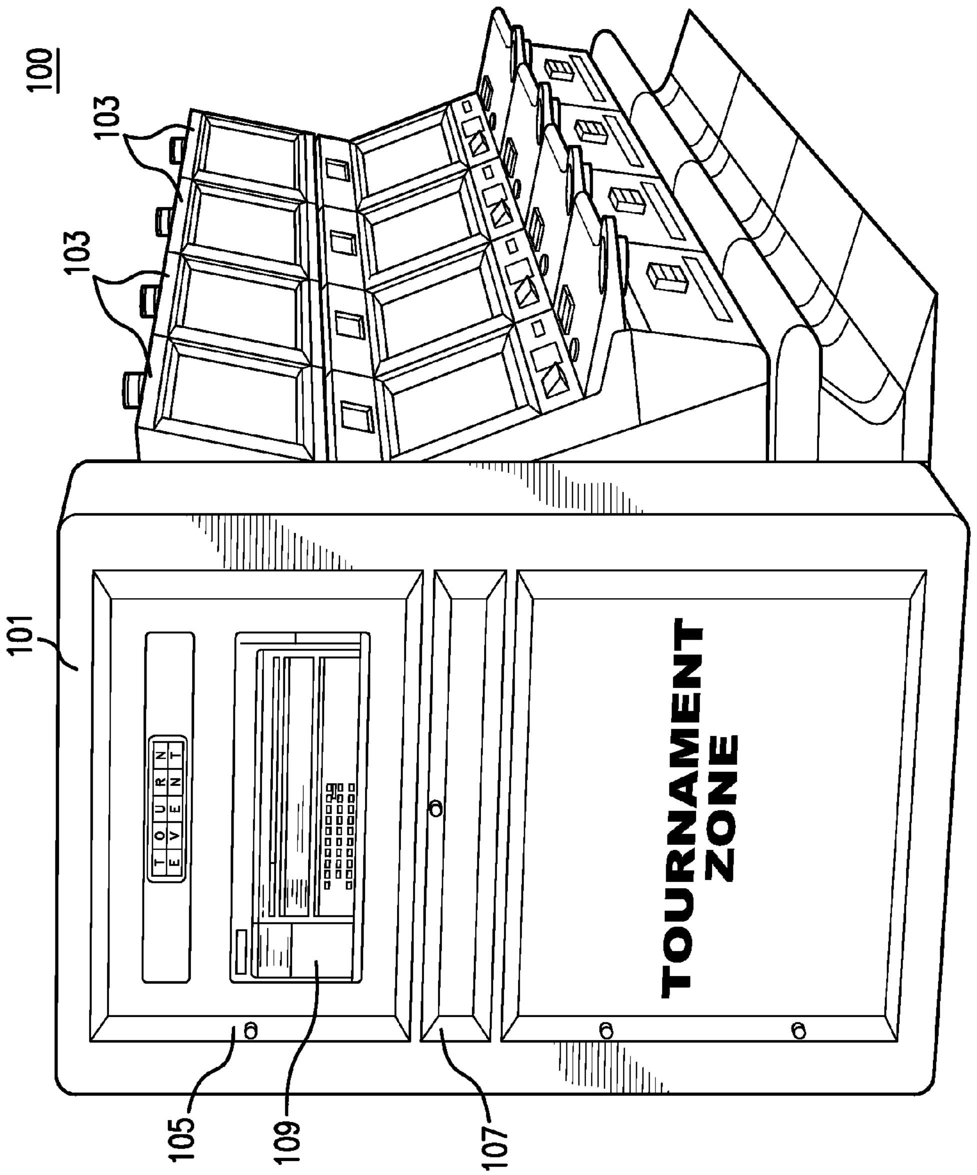
FIG. 1 illustrates an example convertible in-revenue and out-of-revenue game system shown with a control center server controlling a bank of gaming machines with respective game themes, such as during an in-revenue gaming operating mode, in accordance with one or more embodiments.

Referring to FIG. 1 and also to FIGS. 2-7, example server-based convertible in-revenue and out-of-revenue gaming system 100 is shown with control center server 101 enabling remote functionality management of a number of gaming machines 103, such as updating game configuration, uploading advertisements, administering tournaments, and converting in-revenue and out-of-revenue operation, in accordance with one or more embodiments. Control center server 101 includes a user console secured by key-locked cabinet doors 105 and 107. The user console includes display 109 and a conventional keyboard and mouse (not shown). Display 109 is visible through a window of door 105. Door 107 opens about a horizontally disposed hinge or hinges situated at the lower portion of the door so that it may swing downward. Behind door 107 a recessed slide-able tray may support the keyboard and mouse and slide outward approximately six to eight inches to accommodate user (such as a casino operator) access to the keyboard and mouse. The keyboard, mouse, and display 109 connect to the server which may be a conventional personal computer motherboard or server grade hardware with ports to support the peripherals along with network connections and memory, such as a hard drive, PROM or CD ROM, containing the programming to support the server controlling in-revenue and out-of-revenue operating modes of gaming machines 103 and to support creation, editing, and storing of command, instruction, and data sets associated with in-revenue and/or out-of-revenue events. The installed software may include a Microsoft Windows® OS enabling menu driven document creation and editing to provide user-friendly document/program search or creation, editing, storage, and execution functionality within the limits of the user's authorization level. User authorization and access may be accommodated through an initial username and password entry screen. Once a user's authorization has been verified through matching with records stored on the server or network, a main menu may be displayed enabling a user to access, initiate or program out-of-revenue or in-revenue events.

As will be discussed further below, control center server 101 may be programmed to implement several different controllers providing functions or services for the gaming machines 103 and associated equipment (such as the overhead display 111 described below). In particular, control center server 101 may implement a tournament controller for controlling and facilitating the conversion of gaming machines 103 from individual in-revenue play to tournament play (either in-revenue or out-of-revenue) and back. During tournament play, the tournament controller communicates with the various gaming machines 103 participating in the tournament, maintains information on the conduct of the tournament, such as real-time standings and scores, and makes tournament information available to the gaming machines 103 or other system elements for display over the course of the tournament. In its operation as a tournament controller, control center server 101 also controls the conversion of gaming machines 103 back from tournament play mode to individual play mode.

During in-revenue operational mode (such as shown for example in FIGS. 1-3), gaming machine 103 may operate conventionally wherein a player may: a) enter currency, such as through bill acceptor 403, b) initiate a wager by selecting one or more lines and one or more credits per line, such as by respectively pressing the lines and credits buttons on button deck 405, and c) initiate play of the game displayed on display 115 by pressing the play, repeat bet, or max bet button on button deck 405. In-revenue operation may be performed through Class II or Class III gaming machines.

Class II gaming machines include bingo-based, lottery and/or central determination gaming machines; for example, a player may initiate a game at a Class II gaming machine, a processor for the gaming machine may send a request for a game outcome which may be transmitted to the gaming machine from an external server (e.g. central determination server) based on a random determination, and a game presentation may be displayed by the gaming machine in accordance with the game outcome. Often Class II gaming systems include a network of connected gaming machines (player stations) and use a finite pool of outcomes wherein the pool of possible outcomes are reduced by one each time an outcome is selected from the pool.

Class III gaming machines may include a random or pseudo-random number generator operated by a processor which may be local or remote to the gaming machine. The processor may determine a game outcome using the random number generator and the gaming machine may display a game presentation in accordance with the determined game outcome.

In either Class II or III gaming machines or systems, the player may be paid an award by the gaming machine or gaming system in accordance with the determined game outcome and a paytable which may be stored on the gaming machine or may be accessible by the gaming machine.

Conversion of a selected set of gaming machines 103 connected to control center server 101 may be programmed to occur at one or more selected times during any period of time, e.g. a day, week, month, as may be elected by a user (operator). In accordance with programming as tournament controller, control center server 101 may transmit instructions to the selected set of gaming machines 103 concerning an impending conversion and subsequently to initiate a conversion from in-revenue operating mode for individual play to a competition operating mode for group play. The programming may be initiated automatically according to a schedule or may be initiated manually by a user. In one or more embodiments, control center server 101 may be programmed to transmit an impending conversion instruction or instructions to the selected set of gaming machines in a selected period of time or times prior to the conversion, such as 15, 10, 5, and/or 1 minute. For example, control center server 101 may instruct each gaming machine 103 to display a fifteen minute warning, ten minute warning, five minute warning, and then display a sixty second countdown. Control center server 101 may further instruct each gaming machine 103 to disable additional in-revenue play following the completion of the countdown and following completion of any current game play to automatically cash out the credit meter of any associated gaming machine 103. Following cash out, control center server 101 functioning as tournament controller may transmit instructions to each of gaming machines 103 to display respectively associated players names and to install the competition game for the group play session being initiated.

Figure 28:
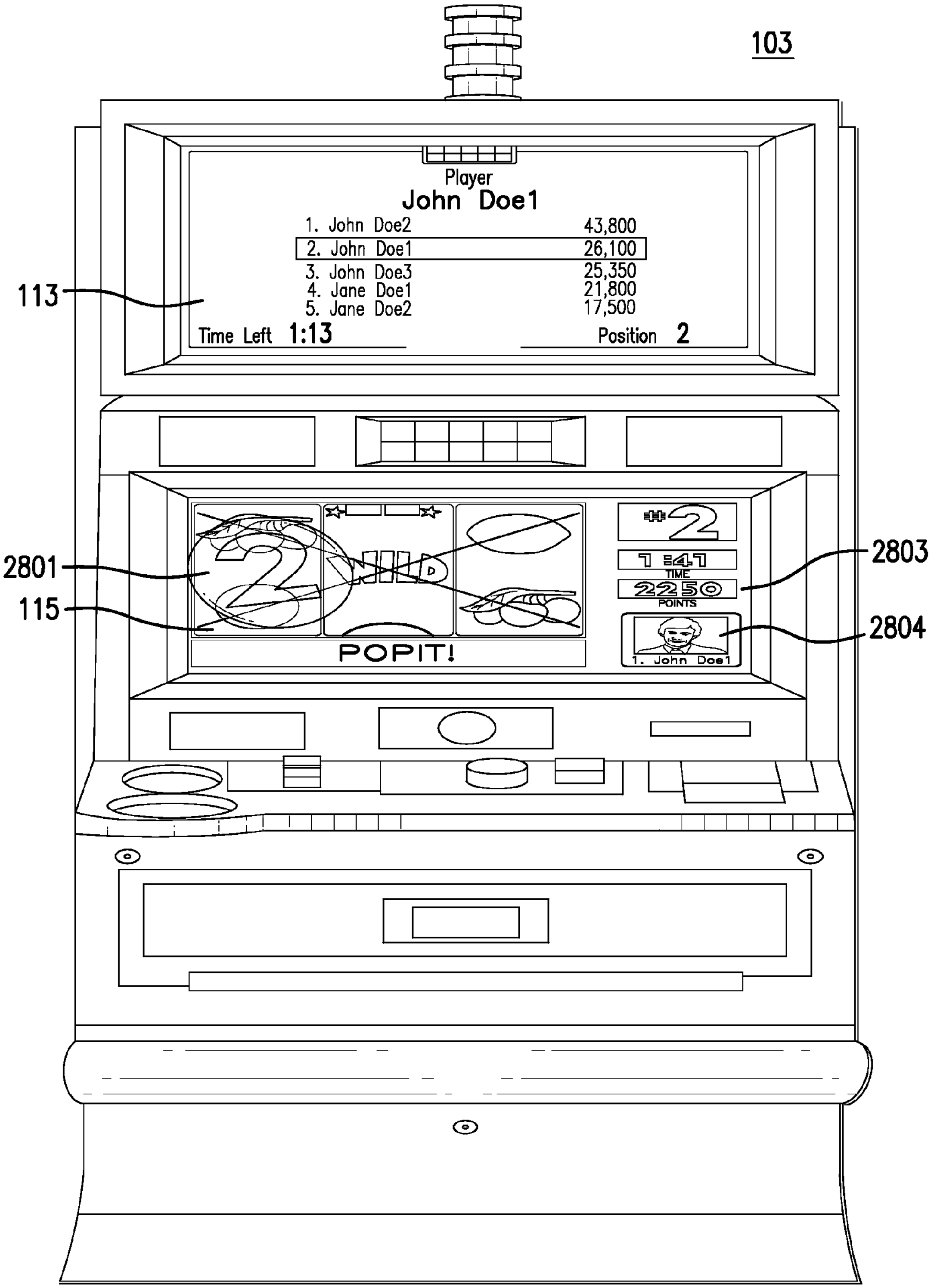
FIG. 28 illustrates the front view of a gaming machine including a player dashboard and interactive game feature in accordance with one or more embodiments.

One example of an out-of-revenue operational mode may be a tournament event (such as shown for example in FIGS. 6-7) wherein a game having the same pay table and volatility is installed and operational on each of gaming machines 103. During a tournament event, each participating gaming machine 103 may be operated without funds, players may accumulate virtual points or dollars by playing a game on their respective gaming machine 103, and one or more winners may be identified based on the accumulated totals obtained during a predetermined period of time, which may correspond to a programmed or manually initiated definitive start and stop time or a predetermined number of plays. For example, an operator may initiate a tournament event by using a menu program with the console connected to control center server 101 and selecting: the participating gaming machines, an amount of time for the tournament to play, and begin tournament. Alternatively, the predetermined period of time may comprise randomly triggered start and/or stop times, such as through a game event or through use of a random number generator. During the tournament event, each participating gaming machine may capture live streaming video of tournament contestants through respective cameras 401 (shown in FIG. 4 and FIG. 5) and transfer the live video feed in accordance with programming to selected locations, such as overhead display 111 (FIG. 6 and others) or player dashboard 2803 (FIG. 28). Throughout the tournament event, leader board 601 shown in FIGS. 6 and 7 may be displayed on a real-time basis to present tournament standings and live video feed 603 may be displayed to present player reactions on overhead display 111. During tournaments, the player's video may be displayed for a certain amount of time along with their current position. The video feed may then be switched so that overhead display 111 shows live video of another player participating in the tournament. In one implementation, video of all players in the tournament, or some subset such as the top five players, may be serially displayed on overhead display 111. That is, video of the first place player is displayed for a time, then switched to the second place player, then the third place player and so forth, returning to video of the first place player upon completion of showing all or the designated subset of players. Also, some implementations may cause the video displayed at overhead display 111 to be switched when there is a change in rankings of the players in a tournament. For example, the video displayed at overhead display 111 may be switched to live video of the new first place player when a lower ranking player overtakes the leader to become the new first place player. At the completion of a tournament the winner's video may be shown on overhead signs with a celebratory message. In one or more instances, a player may opt for anonymity while playing. In one or embodiments, the player may select a player avatar from a set of available avatars and/or a pseudonym which may be displayed in place of a live video feed of the player.

Figure 2:
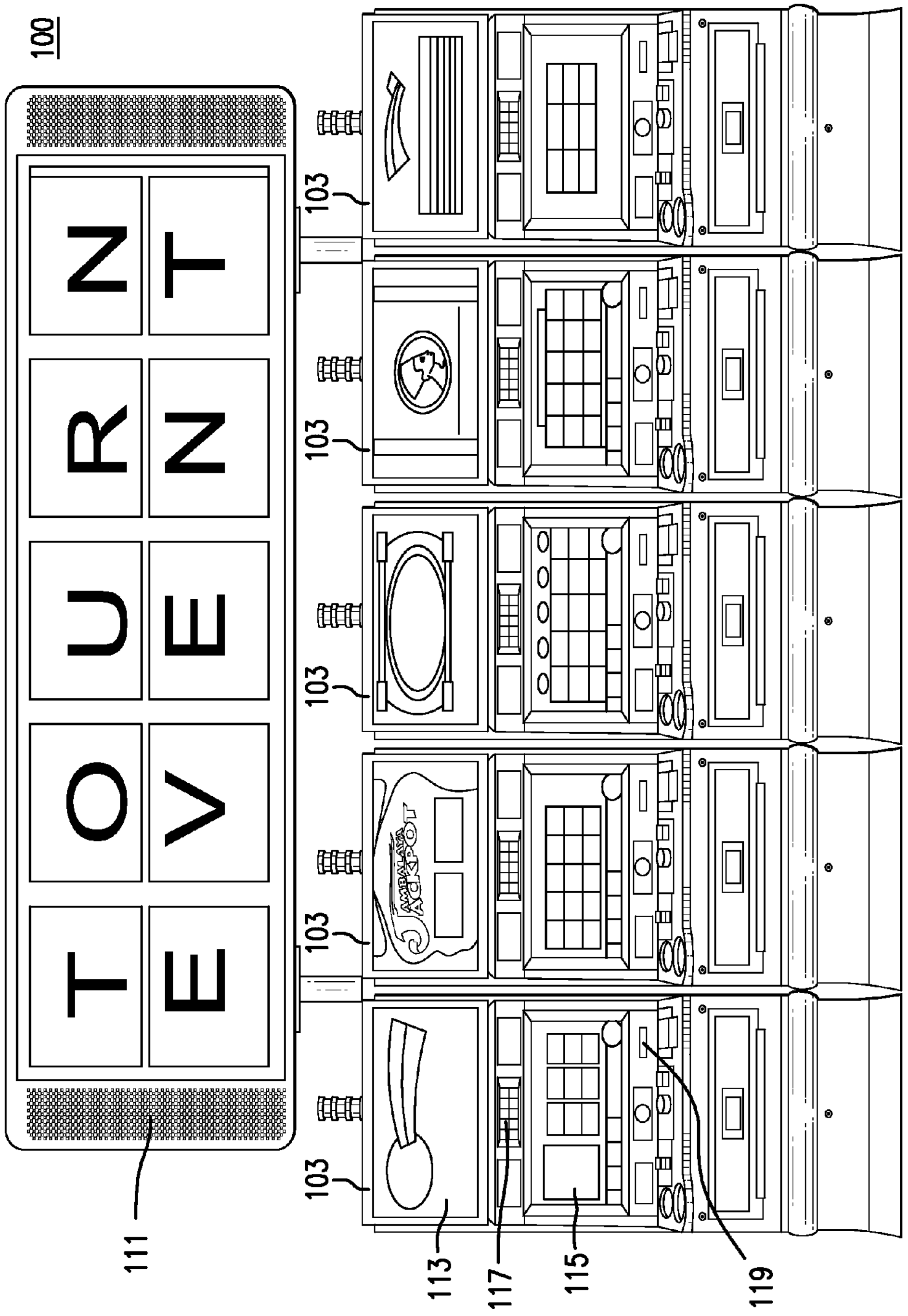
FIG. 2 illustrates an example convertible in-revenue and out-of-revenue gaming system with a bank of gaming machines with respective game themes, such as during an in-revenue gaming operating mode, and a connected overhead display showing an example tournament advertising banner TOURNEVENT® in accordance with one or more embodiments.

Referring to FIG. 2, another embodiment of convertible in-revenue and out-of-revenue gaming system 100 is shown with a bank of gaming machines 103 with respective game themes, such as during an in-revenue gaming operating mode, and connected to overhead display 111 (showing an example tournament advertising banner) in accordance with one or more embodiments. Each of gaming machines 103 and overhead display 111 may be conventionally networked to coordinate gaming events and conversion between in-revenue and out-of-revenue operating modes. A networked conversion and controller unit may be an external server, such as control center server 101, a remote floor server, or a remote backend server, or, one of gaming machines 103 may be programmed to operate as a control center server. As shown by example in FIG. 2, gaming machines 103 may be configured in-revenue and have various games being presented or offered, such as Multimedia Games' Ringy Dingy Reels®, Jambalaya Jackpot®, Meltdown®, Queen of the Desert®, and Texas Tornado®, with respective pay tables and volatilities.

In the case where one of gaming machines 103 may operate as the control center server, the screenshot examples shown herein (e.g. FIG. 8 et seq.) may be displayed on one of the displays, such as display 113 or 115, each of which or either may be implemented as touch screen displays. In order to access the control center server operability, a user (operator) may be required to insert an authorized user card in card reader 119 and enter a password such as may be prompted on display 117. Upon identification of an authorized user, gaming machine 103 may display a menu on display 113 providing options for initiating or programming in-revenue or out-of-revenue operating modes and may further display a virtual keyboard on display 115 which may be used to enter data into respective fields shown on display 113. Additionally, in the case where one of gaming machines 103 may operate as the convertible server, all or a portion of gaming machines 103 may store the applicable programming so that in the event that an initially designated master gaming machine becomes inoperable, one of the other gaming machines 103 may, either automatically according to a designated priority or manually, be designated to assume the control center server operations.

Figure 3B:
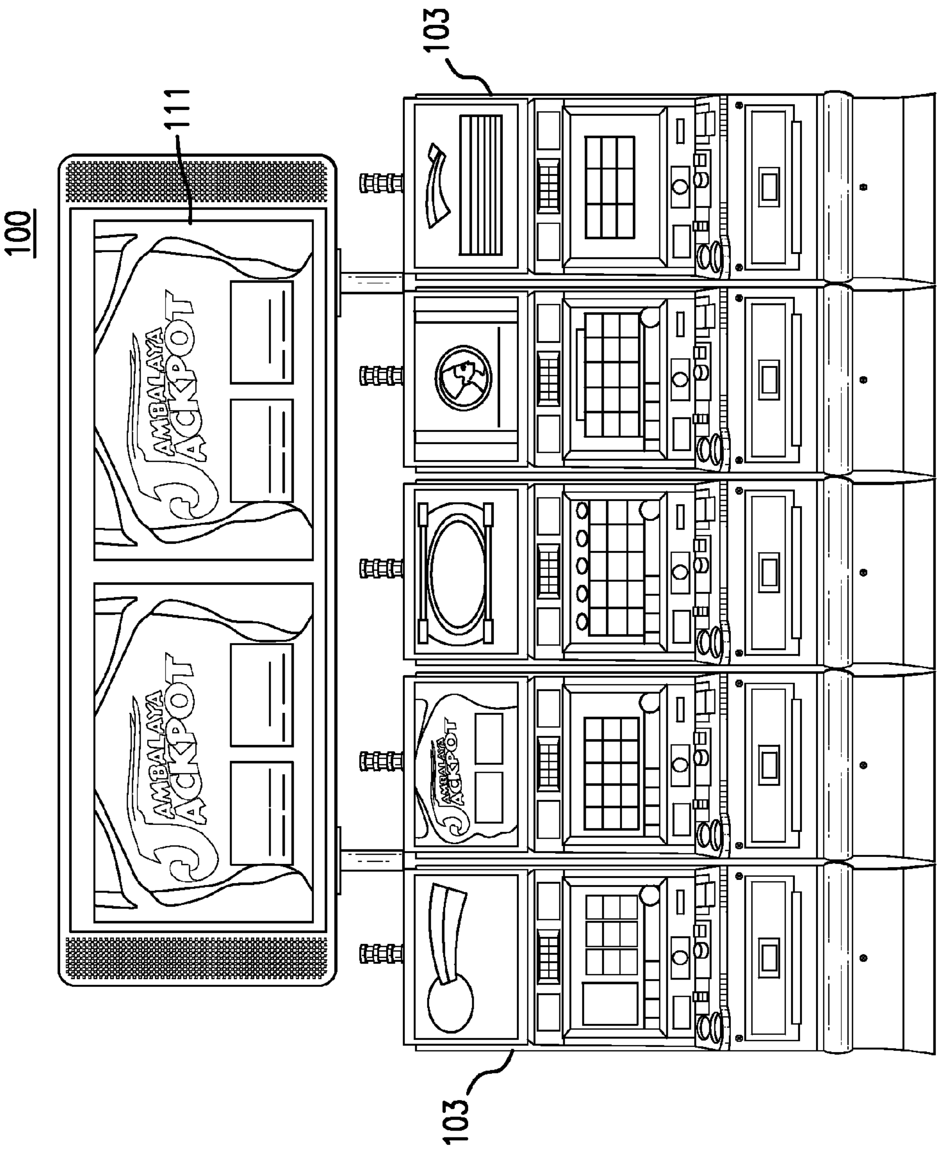
FIG. 3B comprises a front view of the example convertible in-revenue and out-of-revenue gaming system shown in FIG. 3A with the overhead display showing an example game theme advertising banner JAMBALAYA JACKPOT® in accordance with one or more embodiments.
Figure 3A:
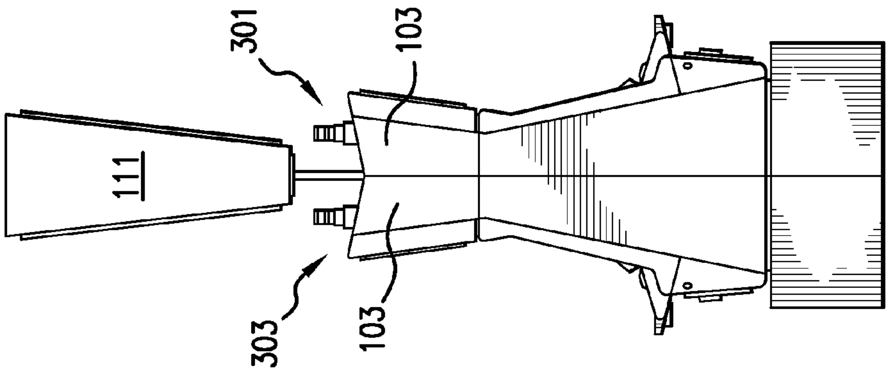
FIG. 3A comprises a side view of an example convertible in-revenue and out-of-revenue gaming system with two back-to-back banks of gaming machines with respective game themes, such as during an in-revenue gaming operating mode, and a connected overhead display in accordance with one or more embodiments.

Referring to FIGS. 3A and 3B, a side and front view, respectively, of an example implementation of convertible in-revenue and out-of-revenue gaming system 100 is shown with two back-to-back sets 301, 303 of gaming machines 103 (which may be referred to as a bank or a pair of banks) with respective game themes, such as during an in-revenue gaming operating mode, and connected to a pair of back-to-back overhead displays 111 (showing an example game theme advertising banner) in accordance with one or more embodiments. As shown in FIG. 3A, pairs of back-to-back overhead displays 111 may be installed as a single unit with a casing that may be wider at the top than the bottom and the overhead displays may be slanted to adjust the viewing angle. While the overhead displays 111 may be fixed in relation to the casing, another embodiment may include a swivel attachment of each of display 111 along a horizontal axis enabling adjustment of the viewing angle of each display 111 with relation to the swivel attached to the respective display and the casing. For example the swivel attachments may be secured to the bottom of the casing and the respective overhead display 111; and, tightening screws may be implemented either together with the swivel attachments or separately to fix the angle of the plane of each overhead display 111.

Figure 4:
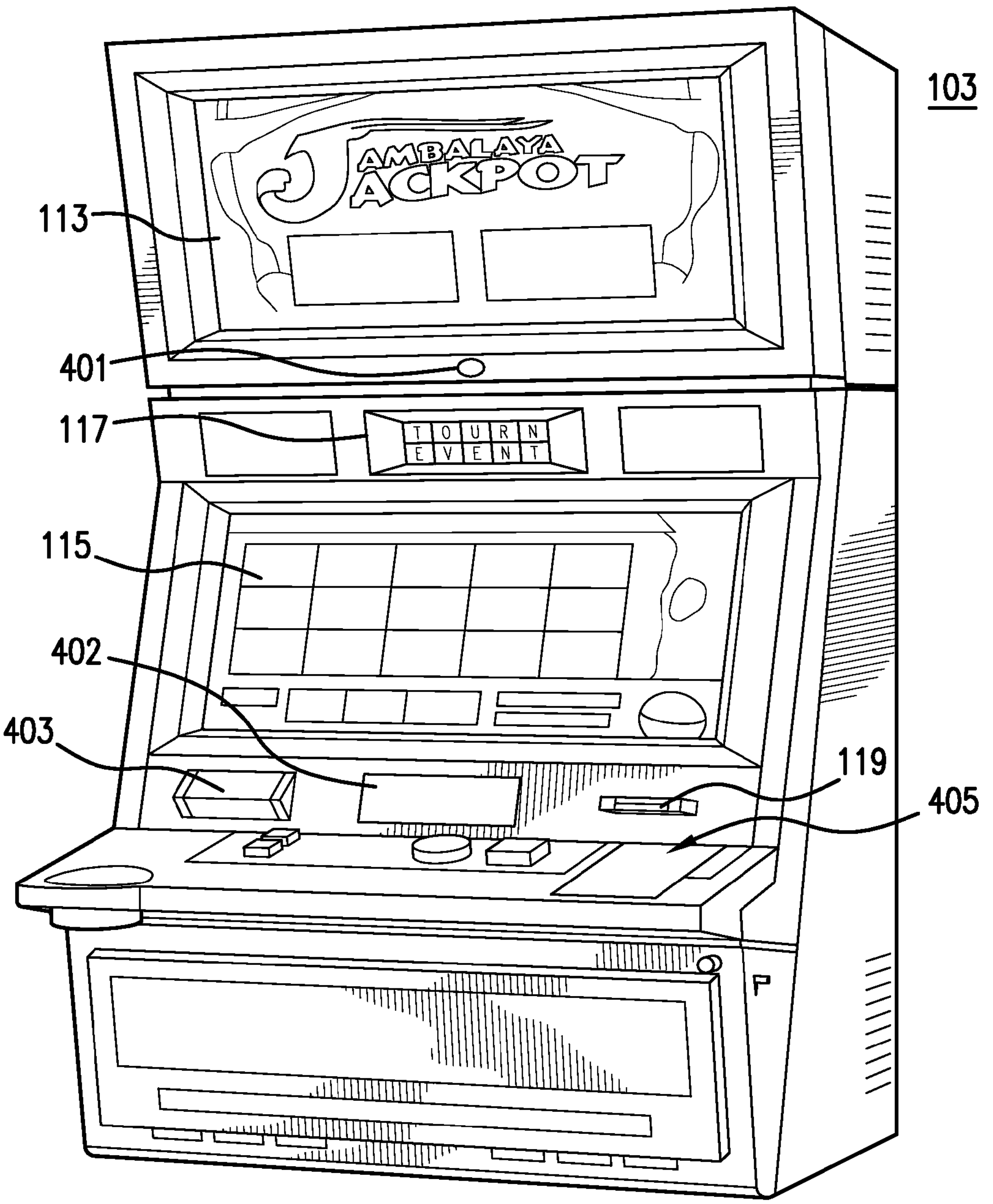
FIG. 4 illustrates an example front view of a convertible gaming machine with a camera and a secondary display with an example tournament advertising banner in accordance with one or more embodiments.

Referring to FIG. 4, an example front view of convertible gaming machine 103 is shown with embedded camera 401, e.g. a conventional IP-video camera, operable to capture video feed of a player at the gaming machine and transfer the video feed to an area of one or more gaming machine displays, such as display 113, 115, or 117, one or more other gaming machines' displays and/or overhead display 111. In the example, display 117 is shown with an example tournament advertising banner in accordance with one or more embodiments.

Referring to FIG. 4, example gaming machine 103 is shown including top glass display 113, middle display 117, primary display 115, and lower display 402 and user interface 405 (including button deck, printer 403, and card reader 119) wherein an in-revenue or out-of-revenue wagering game may be initiated by a player (such as by pressing the 'Play' button or by making a wager (selecting a number of lines and credits/line) and pressing the 'Play' button), a game processor may obtain a random or pseudo-random game outcome (such as by operating a random number generator (RNG) or by requesting a game outcome from server, e.g. central determination or game, which may use an RNG to make a determination and forward to the game processor). The game processor for gaming machine 103 may instruct one or more displays to display a game presentation (such as spinning the reels in a reel-based game) in accordance with the game outcome, and the processor may pay winning game outcomes by incrementing the credit meter in accordance with the paytable (plus increment any additional amounts in the event of triggering a mystery bonus or other feature bonus).

Top glass display 113 may comprise a programmable portion of or a separate display (such as an LCD, LED, TFT, etc. display) or glass painted, etched, etc. presenting information related to the primary game or theme, such as a display of the paytable associated with the primary game and indicating the awards payable on the various winning primary game outcomes. Display 117 (such as an LCD, LED, TFT, etc. display) may be used to display alternative games (such as a bingo, lottery, card, mini-reel or other wagering game) or other feeds presented through the network, such as advertisements, where the alternative games may or may not require separate wagers or consideration, such as player points accumulated in a player account by a player.

Primary display 115 may display a primary game, such as the displayed Jambalaya Jackpot® reel game, and further display additional information such as lines wagered upon ("Lines"), bet per line ("Bet per Line"), total bet ("Total Bet"), credits on the gaming machine ("Credits"), and any winnings paid following a game play (which may include primary, feature, and community game play) ("Paid"). Display 402 may comprise a portion of display 115 or a separate display (such as an LCD, LED, TFT, etc. display) and display information, such as the player's status, player points, and/or enrollment in any group play (e.g. tournaments or competitions). User interface 405 generally includes a button deck for entering the selected number of lines the player wishes to wager upon, the number of credits per line plus a side bet, and to initiate play of the primary game. User interface may also include card reader 119 for receiving a player card and transmitting player information over a network, and, may include bill acceptor and printer 403 for receiving currency including tickets and printing tickets when a player desires to cash out from the gaming machine.

Referring to FIG. 4, gaming machine 103, such as a Multimedia Games Jambalaya Jackpot® gaming machine, is shown which may by example be connectable as shown in FIGS. 1-3 and have a set of mechanical or video reels displayed by display 115; video camera 401; player interface 405; and, an internally connected game processor. The gaming machine 103 may further include memory with a set of pre-loaded games (e.g. at least one primary in-revenue game for individual play such as the Jambalaya Jackpot® game and at least one group play game such as a tournament or competition game, and perhaps one or more interactive or non-interactive bonus games such as those described below with reference to FIGS. 28, 29B, 30, and 31) comprising program coding executable by the game processor. The game process may be mounted on a printed circuit board with ports connecting to various sub-assemblies housed in or about the gaming machine cabinet in accordance with one or more embodiments of the invention. While gaming machine 103 is shown as an upright gaming machine cabinet style, various cabinet styles may be utilized including a slant top cabinet style and a bar top cabinet style (where the cabinet may be part of a bar/table top and/or housed therein).

Each reel displayed by or through display 115 includes a series of symbols visible in a display area; for example, in the case of mechanical reels, a portion of each reel is visible in a display area through a window or panel. With the reels in a stationary position, the symbols visible in the display are may be viewed as an array of symbols. During a wagering game, such as may be initiated by a player, the reels may be spun about an axle or simulated to spin under the control of a game processor which may randomly or pseudo-randomly determine the game outcome (or obtain the game outcome from a central determination or game server) and cause the reels to stop in accordance with the determined game outcome. Alternatively, the game processor may cause the reels to stop at random or pseudo-random stop positions and then analyze the displayed symbols to identify the outcome for the play.

One or more paylines, combinations, or patterns of the symbols including those visible through the display area may be correlated to a game result payable in accordance with a paytable, such as may be displayed on display 113. The reel display area may thereby be used to display the game result to one or more patrons standing in front of gaming machine 103. While example gaming machine 103 includes a set of five reels, various numbers of reels may be selected or utilized in an implementation of one or more embodiments, such as one, two, three, four, five, six, seven reels, and so forth. In fact, the wagering game may not include reels, and may alternatively display, for example, a video card game (e.g. poker, blackjack), bingo, keno, or roulette. Panel dividers or frames may be painted, etched, virtualized, etc. onto the display area to provide a separate viewable area or window for each reel. The windows may serve to focus attention to the visible portion of the reels and, in the case of mechanical reels, to overlay reel dividers and/or the space between reels.

Alternatively to painting, etching, etc. onto the display area of the window or panel, display 115 may include a panel, such as a flat panel LCD or LED display, which may overlay the display area and be programmed to display an opaque frame image except over the display area (which may be transparent or translucent) during an operating mode when either the primary or group play game are operational, depending upon the selected design. In such case, the panel may be instructed by the game processor to display a bonus or feature game that may be triggered randomly or pseudo-randomly through an RNG, by a threshold count, by a countdown, or by the appearance of one or more special symbols (any of which may be triggers operable through programming executed by the game processor or a network-connected external server), and, may be programmed to enable player interactivity, such as requiring a player to select a displayed button or press an area of a touch sensitive panel overlaying an item, in order to cause the game to perform additional steps and provide one or more bonus or feature game outcomes and awards to the player.

Additionally, in one or more embodiments, the reels may be implemented using flexible reel strips, such as FOLED (flexible organic LED) reel strips, wherein one or more symbols may be programmed dynamically to vary the symbol and/or its appearance, either within a game or enabling conversion from a first game to a second game (i.e. in-revenue individual game to group play game and vice-a-versa. Additionally one or more display panels may be implemented to present each reel virtually. In the case of virtual displays of the reels, the symbols may be fixed or animated on each of the simulated reels. Also, overlapping display panels may be implemented to generate video or display effects over reels; for example, display 115 may be implemented to include transmissive (e.g. Aruze or WMS transmissive display panels) or transparent (e.g. a Bally® transparent display panels) panels configured to display visual effects together with a set of reels (mechanical or virtual) under the control of the game processor during the operation of an in-revenue or out-of-revenue wagering game. In the case of virtual reels, the virtual reels may be recessed a distance from the front surface of the display area and segregated by dividers similar to dividers separating mechanical reels, which may provide a spatial characteristic (e.g. a PureDepth® display panel).

In one or more embodiments, the game processor operating the wagering game and controlling game lighting and effects in many instances is implemented as a microprocessor, such as an Intel Pentium® or Core® microprocessor, on a printed circuit board including one or more memory devices positioned within gaming machine 103. In alternative implementations, the game processor may be remote from gaming machine 103, such as on a server network connected to gaming machine 103 (e.g. gaming network 100, FIG. 1 or 3700, FIG. 37), in which case the game operation as described herein may be accomplished through network communications to control the display of the game on gaming machine 103 including the audio, visual, and game effects. It should be noted here that any terms indicating relative position used in this disclosure and the accompanying claims such as "front," "rear," "lateral," "back," and "top," for example, are used with reference to the operating position of gaming machine 103 shown in FIG. 4.

Figure 4A:
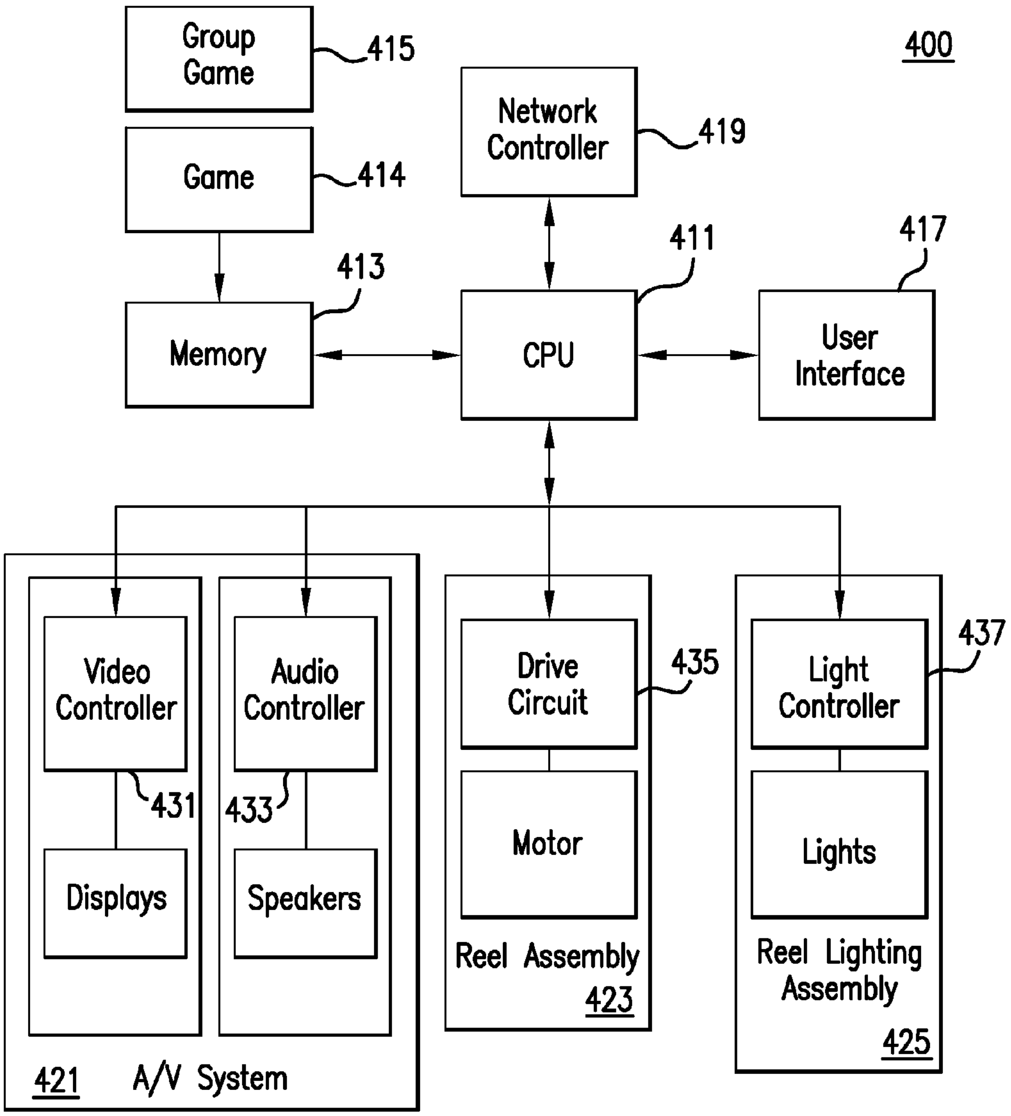
FIG. 4A illustrates an example logical layout of a convertible gaming machine in accordance with one or more embodiments.

Referring to FIG. 4A, an example control structure 400 of gaming machine 103 is shown in accordance with one or more embodiments of the present invention. Game processor (CPU) 411 may comprise a conventional microprocessor, such as an Intel Pentium® or Core® microprocessor, mounted on a printed circuit board with supporting ports, drivers, memory, and coding to communicate with and control gaming machine operations, such as through the execution of coding stored in memory 413 including one or more individual wagering games 414 and one or more group play games (e.g. tournaments, competitions) 415. Game processor 411 connects to user interface 417 such that a player may enter input information and game processor 411 may respond according to its programming, such as to apply a wager and initiate execution of a game. Game processor 411 also may connect to a network, such as casino server network 3700 (FIG. 37) which may be implemented over one or more site locations) which may include host, remote game play, central determination, progressive, player tracking, and accounting server functionality (see generally, FIG. 37), through network controller 419 to enable network monitoring and sharing of data and information between respective of the servers in the network and gaming machine 103. Game processor 411 may also connect to various devices within and about the gaming machine including A/V system 421, reel assembly 423, and reel lighting assembly 425 through respective controllers, such as one or more video controllers 431, audio controllers 433, motor drive circuit controller 435, and light controller 437. In the case where the reels are implemented using a video display, reel assembly 423 and reel lighting assembly 425 may be modified or eliminated depending upon the desired configuration; for example, in one or more embodiments, it may be desirable to use reel lighting assembly 425 to amplify or provide various light effects in conjunction with a video reel display during game play, alternatively this functionality may be absorbed into the video display coding and presentation.

Generally, activity at gaming machine 103 may be initiated by a player inserting currency and/or a player card into a bill acceptor and card reader, respectively. Upon insertion, a signal is sent to game processor 411. In the case of the insertion of a player card, the card reader transmits card information which is directed through network controller 417 to a player tracking server connected to the network. Player data is transmitted to gaming machine 103, and, responsive to the data, game processor 411 may execute coding causing player data and a display (and possibly an audio) command to be transmitted to one of the video and/or audio controllers instructing the controllers to display player information on a respective display and possibly issue an audio greeting through one or more respective speakers. Concurrently, the bill acceptor sends a signal to game processor 411 which may include an identification of the currency that has been read, and game processor 411 in accordance with its coding may convert the currency amount to credits and transmit a store and display signal to a credit meter and its associated display ("Credits"). Once credits have been associated with the credit meter, the player may (for a reel-type game) select the number of paylines and credits per line that the player wishes to wager, whereupon game processor 411, in accordance with its coding, receives the wager information from user interface 417, transmits accounting and display information to the payline ("Lines"), credits per payline ("Bet per Line"), and total bet ("Total Bet") meters and displays, transmits an update to the credit meter and display ("Credits") deducting the amount of the total bet, and initiates the wagering game.

In the case of Class III gaming devices, when a game is initiated, a random number generator (RNG) is operated by game processor 411 to determine the game outcome. Commonly, game processor 411 is positioned within gaming machine 103 and configured to manage the operation of the gaming machine components, such as shown in FIG. 4A; however, the game processor may be either onboard or external to a gaming device (such as an electronic tablet (e.g. Apple iPad or gaming specific tablet), personal data assistant (PDA), cellular telephone (e.g. Blackberry or Apple iPhone), surface table (e.g. Microsoft/IGT touch sensitive gaming surface table)) played by a player. Therefore, when the player places a wager and initiates play of the game through user interface 417 of the gaming device, the game processor may be onboard or remotely located such as within a network gaming server. In the latter case, an onboard microprocessor, controller, or digital signal processor may execute coding to transmit the wager and game request information through the network and the remote game processor may operate an RNG to determine the game outcome. In one or more embodiments, coding may be implemented and stored in memory 413, 414, and 415, executable by game processor 411 to control the primary and feature game execution and to control associated electro-mechanical devices, such as reel lighting, speakers, and reels through respective video, audio, reel drive motor controllers, and lighting controllers 431, 433, 435, 437.

Program coding may be stored to execute and/or integrate gaming device operation with a tournament or competition, such as described herein, where a selected gaming machine 103 from a bank may be designated as control center server 101. For example, each gaming machine 103 of a bank may include coding executable by the designated host game processor to initiate and operate a tournament or competition game and also include coding to respond as a client gaming machine on the bank responsive to a primary controller. One of the gaming devices 103 may be designated as the primary controller responsible for converting operating modes of the selected banks of gaming machines 103, operating tournaments or competitions, and controlling content display on one or more displays, such as overhead display 111 and/or respective displays 113. In the case that the primary controller becomes unavailable, a second gaming machine may be designated as the backup primary controller and a rule of succession may be coded into each of gaming machines 103 of a respective bank. Each of the gaming devices may include monitoring coding executable on an ongoing periodic basis to ascertain which gaming device is the active primary controller during a given time period. Alternatively, the primary controller may be responsible to execute periodic polling of each of gaming machines 103 of the respective bank; and, in the event that the backup primary controller does not receive a poll within a designated period, the backup primary controller may commence operation as primary controller, commence polling operations, and commence execution of coding to randomly determine when to initiate the associated tournament game.

In one or more alternate embodiments, gaming machine 103 may have multiple games pre-loaded including a primary game (generally operational for in-revenue individual play) and a group play (tournament or competition) game, wherein either game may be operable by the game processor (depending on the setting or operating mode as may be controlled by control center server 101 through network commands) by executing respective of the game codes stored in memory. By example, the primary game may initially be operable for in-revenue individual play; the group play game may be initiated by a command from control center server 101 whereby gaming machine 103 may be converted from in-revenue individual play to group play (which may be in-revenue or out-of-revenue depending on the game rules and associated programming).

Once initiated, the group play game may be displayed on one of the displays operable by gaming machine 103, such as display 113 or 115 (reel display area), where a video representation of the group play game may be presented by either replacing or overlaying primary game display content. For example, if display 115 includes mechanical reels, display 115 may also include an overlaying panel (such as a flat panel display) which may be changed from a transparent mode during primary (or alternatively, group play) game operation to an opaque mode during group play (or alternatively, primary) game operation by instructions from the game processor instructing display 115 to mask the mechanical reels and display a video game associated with the group play (such as a reel-based game, video card game (e.g. poker or blackjack), bingo, keno, roulette or other wagering-type game). In the case where display 115 comprises two or more displays with or without mechanical reels, one or both displays may be used separately or together to display video content for the primary game and the group play game (for example, special effects or symbols may be rendered through an overlaying display while the underlying display displays the reels of the primary game or the field (or surface) of the group play game, depending upon which game is being shown or played).

Figure 5:
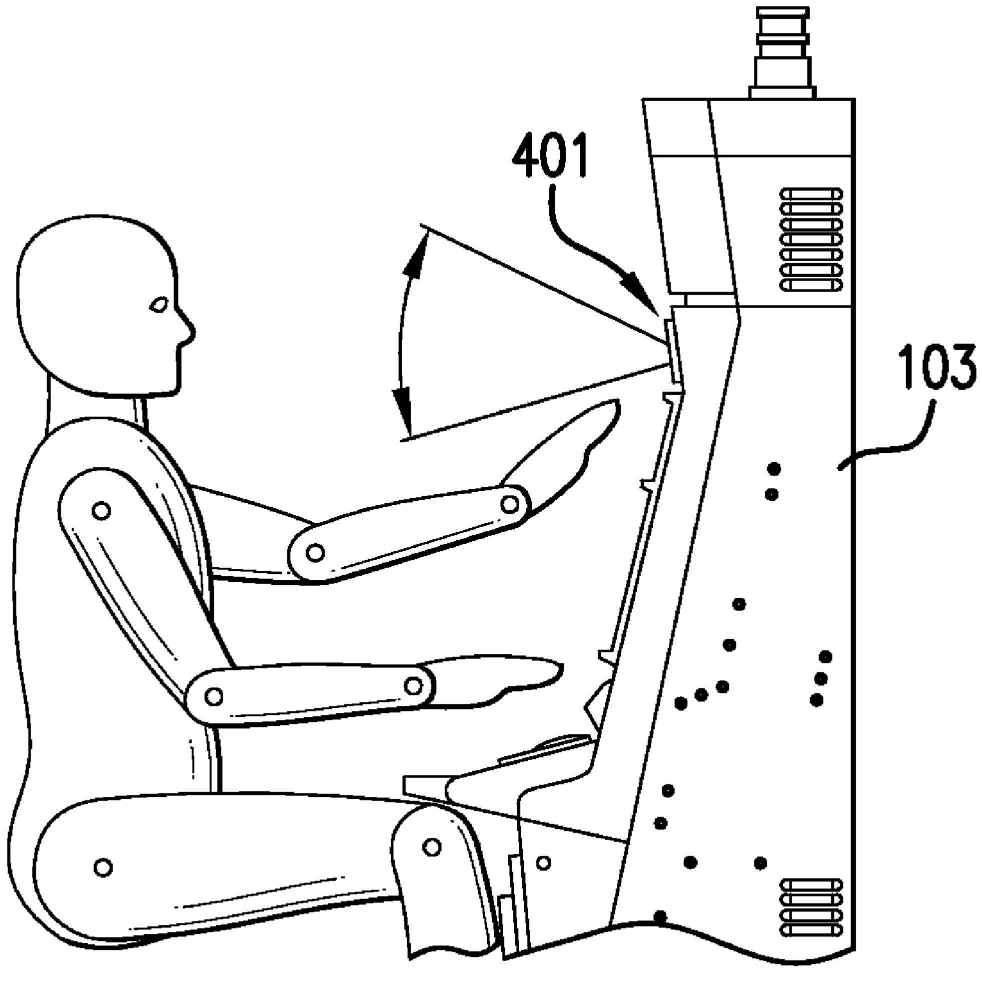
FIG. 5 illustrates an example side view of a player and gaming machine with a camera and associated camera angle in accordance with one or more embodiments.

Referring to FIG. 5, an example side view is shown of a player and gaming machine 103 with camera 401 and associated camera angle in accordance with one or more embodiments. When activated, camera 401 may capture real-time images of the player which may be transmitted directly (or indirectly through an intermediate processing device) to one or more displays in accordance with programming executed by the game processor and requests by control center server 101 (or another gaming machine 103 or remote device operating as the control center server).

Figure 6:
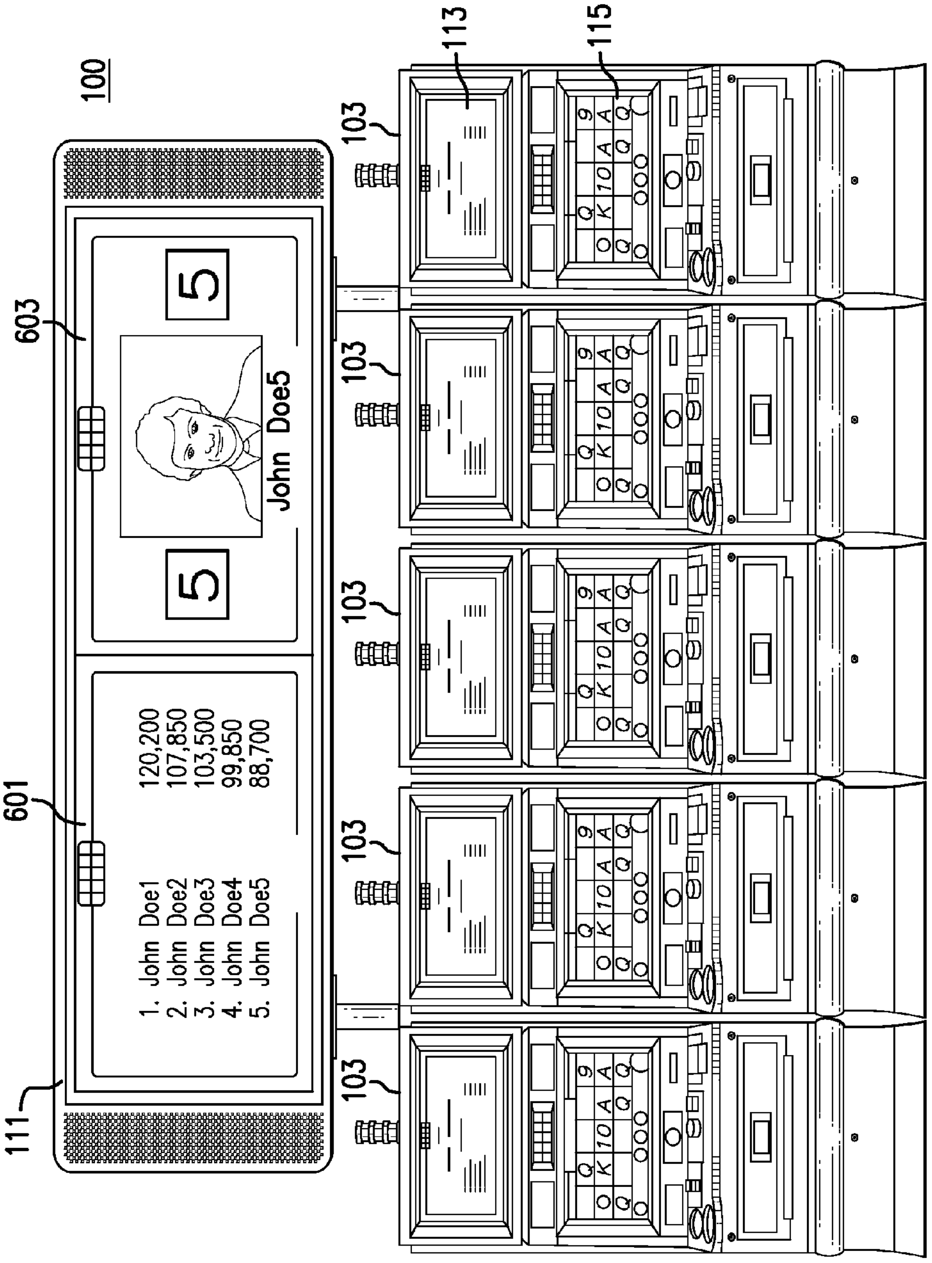
FIG. 6 illustrates an example bank of gaming machines in out-of-revenue mode and with an overhead display showing an example real-time tournament or community game leader board and player video feed in accordance with one or more embodiments.

Referring to FIG. 6, an example embodiment of convertible in-revenue and out-of-revenue game system 100 is shown with a bank of gaming machines 103 in a tournament mode (which may be operable either in out-of-revenue or in-revenue modes) and with overhead display 111 showing an example real-time leader board 601 and player video feed 603 in accordance with one or more embodiments wherein players at each of the gaming machines 103 compete by playing their respective gaming machine 103 and accumulating a total award based on their play. In the example, each of gaming machines 103 are operating the same game as shown on display 115 and leader board 601 is displayed on display 113 as well as on overhead display 111. Overhead display 111 also displays player video feed 603 which includes the image of one of the players; in the example shown, the video image displays the player, the player's name, and the player's position in the competition (5th place as reflected by the '5' displayed adjacent the player's image). Leader board 601 includes the first five player's position, name, and accumulated point total. Leader board 601 may be updated in real-time to show current positions and accumulated point totals of the respective players. Additionally, leader board 601 may sequentially display standings of each of the players, such as by cycling through all the player positions from first through the total number of participating players. On each of gaming machines 103, display 115 may be personalized to show the top player's positions while also showing the name of the player playing the respective gaming machine displayed as a header and the player's name, position and accumulated points highlighted on the leader board. In the example, the name of the respective player, position, and points may be circled on the respective display 113 so that the player at that gaming machine 103 may readily identify their ranking. In the case where the respective player is not in the top five, then the player's name, position, and accumulated points may be appended to the bottom of the displayed leader board on display 113 of that player's gaming machine 103.

In one or more embodiments, video feed may be delivered to each of displays 113 during an event to show video feeds of each of the participating players, such as by cycling every five seconds to rotate real-time or quasi-real-time images of the players, and/or to show a video feed of the respective player during the course of the event.

In one or more embodiments, the player video feeds and the leader board may be broadcast to wireless devices, such as cellular phones. For example, a gaming facility or operator may maintain a website server and website, enabling individuals to dial- or log-in to the website to receive audio-visual broadcasts of events occurring within the facility. The website server may receive updates through the network of various events that may be occurring simultaneously and update web pages associated with the website, enabling visitors to the website to view streaming and fixed content. The website may be maintained through a controlled-access intranet or broadly accessible internet service. In the case of controlled-access, each patron of a gaming facility may be provided a temporary username and password, such as may be provided during a patron's stay at a resort associated with the gaming facility. Patrons may thereby use their remote wireless device to enroll in a gaming event and pay an entry fee, monitor their time to attend the gaming event, and monitor their position within a gaming event in the case where there is more than one session or round associated with the gaming event.

Additionally, players enrolled in events may receive notifications, such as an automated phone call or text message, to advise the player of the time to attend the event, to advise the player of a player's position change within the event, or to advise the player of a delay in the event. Players may, for example, request notification at the time of enrollment or thereafter by using an identifying process, such as entering a username and password, to connect to a server and database with event and player information. Such notifications may also occur through a display and/or speaker at a gaming machine 103 being operated by a player. For example, if the player has requested a notification concerning an event and the player has a player card inserted in a gaming machine, the event server or the website server may query the player tracking server if the player's card is identified connected to a gaming machine 103, identify the gaming machine 103, and transmit an instruction to the gaming machine 103 to display the notification on one of the associated displays. In another alternative, player cards with embedded identifiers (and enrolled cellular phones) may be identified through positioning systems within a gaming facility, such as GPS or related systems or proximity detection systems. Once an enrolled player is detected, a notification may be transmitted to a nearby display and/or speaker.

Similar features may be provided through an internet portal enabling visitors or patrons to access a website and similar restrictions may be implemented, if desired. For example, different levels of access may be provided to general visitors to the site versus current or past patrons to the gaming facility and/or associated resort.

In an alternate embodiment, patrons or visitors may dial-in to an audio-visual broadcast that may be accessed through their respective wireless or network connected devices, such as cellular phones or personal computing devices (e.g. personal computers, electronic pads, personal organizers, etc.). The content may be provided similar to a television broadcast wherein a schedule of events may be provided along with broadcast times. The broadcast network may be implemented as a closed circuit broadcast providing restricted access or may be implemented as an open broadcast.

At the completion of the tournament event, a celebratory event may be displayed on overhead 111 to name the winner and present fanfare. The celebratory event may be displayed on one or more of displays 113, for example at the winner's gaming machine 103. In one or more embodiments, the streaming videos of the event may be recorded along with the leader board updates for the duration of the event, such that each of the participating players may be provided a personalized copy of the event, such as a DVD. In other alternatives, the event may be re-broadcast or accessible on-demand, such as through the gaming facility's website as described above.

Figure 7:
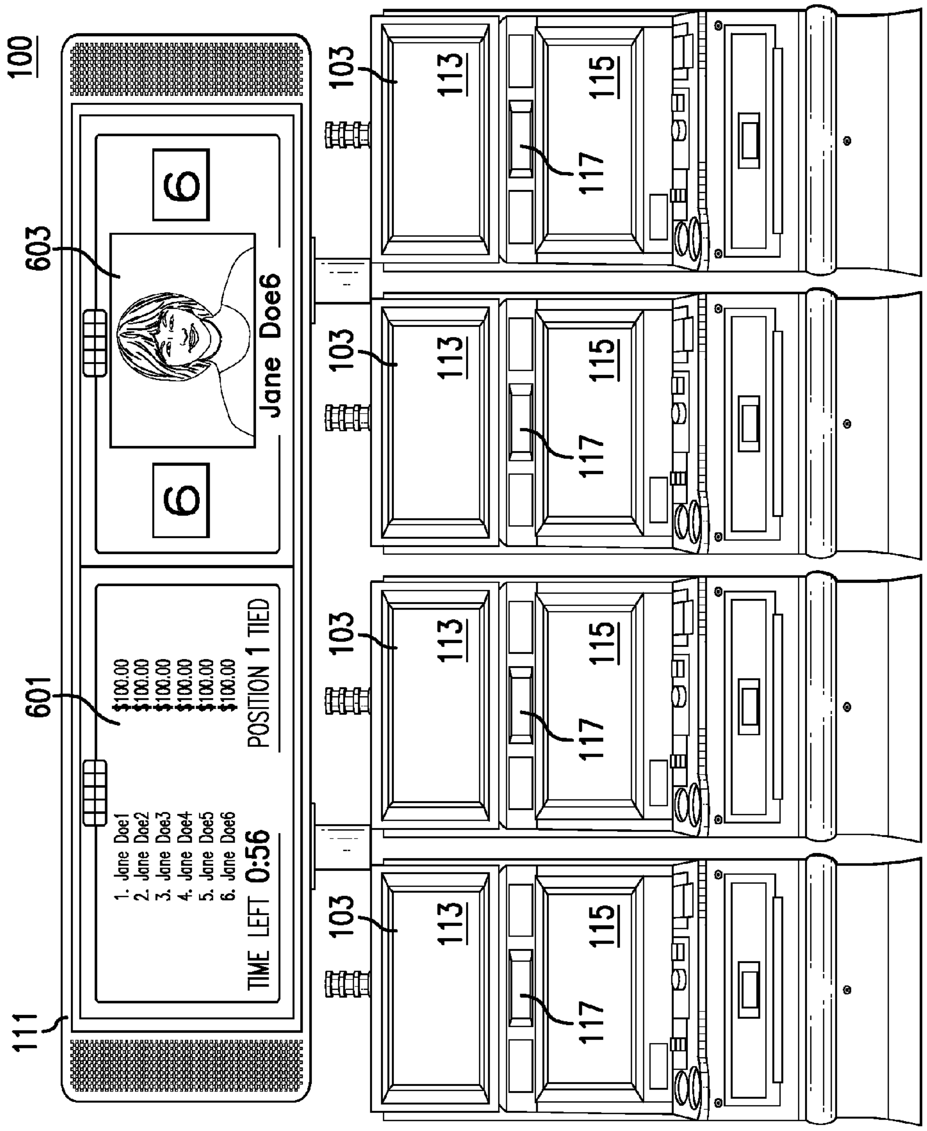
FIG. 7 illustrates another example bank of gaming machines with an overhead display showing an example real-time tournament or community game leader board and player video feed in accordance with one or more embodiments.

Referring to FIG. 7, an embodiment of convertible in-revenue and out-of-revenue game system 100 is shown with a bank of gaming machines 103 and overhead display 111. Overhead display 111 shows an example real-time leader board 601 and player video feed 603 in accordance with one or more embodiments. Additionally shown with leader board 601 is a "Time Left" countdown. Instead of accumulated points, the player's accumulated dollars are displayed.

Figure 8:
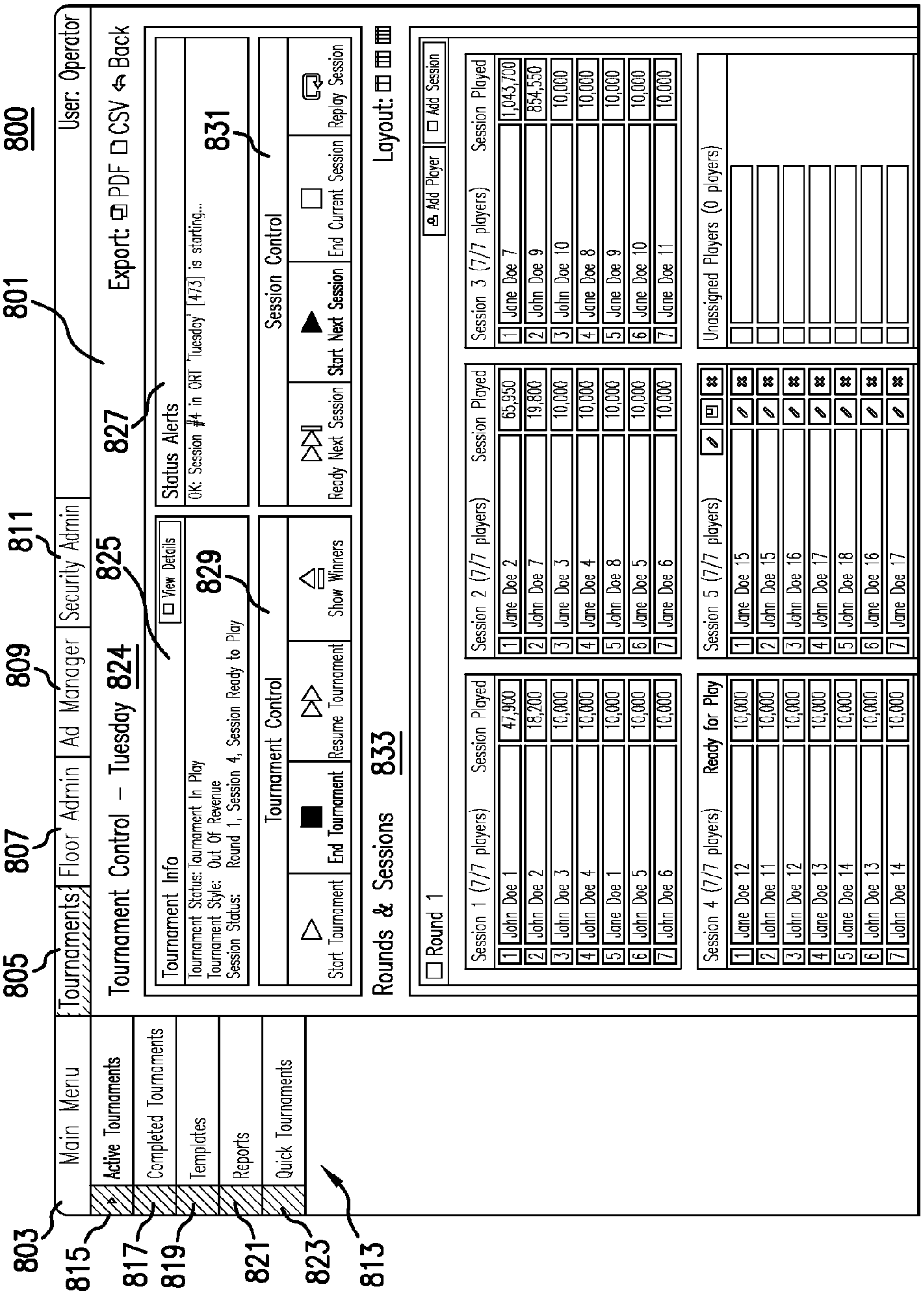
FIG. 8 illustrates an example tournament control screenshot displayable at a user interface console of a control center server controlling one or more banks of gaming machines in accordance with one or more embodiments.

Referring to FIG. 8, screenshot 800 of active tournaments control page 801 is shown which may, for example, be displayed at a user interface console of control center server 101 controlling one or more banks of gaming machines 103 in accordance with one or more embodiments. In the example, several drop-down menus and associated pages may be viewable to an operator on display 109 (FIG. 1) and accessible either through a touch screen, keyboard, mouse, or combinations thereof. The menus may include main menu 803, tournaments 805, floor admin 807, ad manager 809, and security admin 811. In the example screenshot, tournaments menu 805 has been selected and is highlighted and drop-down tournament sub-menu 813 is displayed. As shown, tournament sub-menu 813 may include a selection of available pages accessible through icons including active tournaments icon 815, completed tournaments icon 817, templates icon 819, reports icon 821, and quick tournament icon 823. In the example, active tournament icon 815 has been selected as indicated by an arrow to the left of the icon and corresponding active tournaments control page 801 is displayed.

With reference to active tournaments control page 801, various fields are visible including: Tournament Control Header field 824, Tournament Info field 825, Status Alerts field 827, Tournament Control field 829, Session Control field 831, Rounds & Sessions field 833. Tournament Control Header field 824 includes the currently active tournament title, which in the example is the 'Tuesday' tournament. Tournament Info field 825 may display Tournament Status, Tournament Style, and Session Status headers and corresponding data or information accessed from memory (which may be automated to update periodically or in real-time through the server processor). For example, Tournament Status shows the currently programmed tournament is in play mode, Tournament Style shows that the current tournament is an out-of-revenue event, and Sessions Status shows that Round 1, Session 4 is ready to be played. Tournament Info field 825 also may include a selectable View Details icon which when selected causes the details of the Rounds & Sessions to be shown (current view) including the players enrolled for each session of the current round. Status Alerts field 827 displays the active tournament status, and in the example shows that the tournament is operating normally (OK) and that Session #4 for the Tuesday out-of-revenue tournament (ORT) is beginning play. Additionally, Status Alerts field 827 may display problems with any gaming machines 103 transitioning from in-revenue to out-of-revenue and vice-versa.

Tournament Control field 829 shows selectable control icons which may include Start Tournament, End Tournament, Resume Tournament, and Show Winners icons; in the example, only the End Tournament icon is active and selectable since the current tournament is in progress. In the event that the End Tournament icon is selected, the tournament would be stopped, the End Tournament icon would become inactive and the Start Tournament, Resume Tournament, and Show Winners icons would become active. If the Start Tournament icon was then selected, the current results of each session would be removed, and the tournament would begin play of Session 1. If, instead, the Resume Tournament icon were selected, the tournament would retain the results of the completed sessions and begin play of Session 4 which was the session that was indicated as beginning play in the Status Alerts field. Alternatively, if the Show Winners icon were selected, then the results of the completed sessions would be used to determine the winners and the winners would be displayed, such as on overhead display 111 and/or displays 113, along with any celebratory presentations.

Session Control field 831 shows selectable control icons which may include Ready Next Session, Start Next Session, End Current Session, and Replay Session icons; in the example, only the Start Next Session icon is active and selectable since Session 4 is ready to begin play. After the Start Next Session icon is selected, the End Current Session would become active. After the Current Session ends, then the Ready Next Session and Replay Session icons may become active to give an operator an option to replay the previous session, for example if one of the gaming machines 103 went down during play, or have the system prepare the next session for play.

Referring to Rounds & Sessions field 833, each of the sessions of a round may be displayed including the players' names. In the example, Round 1 has five sessions, and each session has seven players. Sessions may be added by selecting the Add Session icon and players may be added by selecting the Add Player icon. Additionally, the number of player slots (or gaming machines 103) per session may be specified, such as by selecting/de-selecting a bank from the floor or selecting/de-selecting gaming machines from the live floor display (e.g. FIG. 14). For example, a user may initially select eight gaming machines per session and populate the players that have signed up (for example, twenty-four players) into three sessions; then the user may de-select two gaming machines, so that six gaming machines may be used per session, then the programming may re-populate the players into four sessions. In the event that a player session board is displayed, each of the player sessions may be displayed with the players in their respective sessions. Additionally, tentative times for the beginning of each session may be displayed, enabling the players to view the sessions and the session times to plan their time. In other alternative embodiments, the convertible system may transmit the session information through a transmitter, such that players may receive their respective session assignments and session times through receivers, such as cell phones, receiving SMS or voicemail, or, through a display at a gaming machine (in which case the transmission may be sent through a player tracking server or by using information provided by a player tracking server).

An option may be incorporated in Rounds & Sessions field 833, wherein each of the sessions may be color-coded through programming to enable a user to easily identify sessions that have been played, are ready to play, and are waiting to play. In the example, the display areas associated with: Sessions 1-3 (played) may be shaded a blue color, Session 4 (ready for play) may be shaded yellow, and Session 5 (waiting to play) may be shaded green. In the example, Sessions 1-3 of Round 1 have been played and may be color-coded blue, while Session 4 is ready for play and may be color-coded yellow. In the header of Sessions 1-3, the session number, number of players/number of player stations, and 'Session Played' are shown. Below the header, a listing of the players and their final scores are shown for completed sessions only. In the header of Session 4, the number of players and player slots are shown as well as an indication that the session is ready for play. Below the header, each player's name is shown along with an initial (starting) score (e.g. 10,000 points or credits). In the header of Session 5, seven players are shown as signed up for seven slots. Additionally, selectable edit (pencil) and cancel (x) icons are provided enabling an operator to modify or cancel the session. Furthermore, an edit (pencil) and cancel (x) icon are provided beside each player's name enabling an operator to remove a player or replace a player. Additionally, each player in a session that has not yet been played can be dragged (by selecting a player name, dragging the name, and dropping) from one session to another session, or may be unassigned in instances where the player is no longer participating in the session or tournament.

In one or more embodiments the number of gaming machines 103 eligible for play in a tournament may be modified by accessing Floor Admin menu 807. For example, the number of eligible gaming machines 103 may be modified from seven (as shown) to eight. Also, the eligible gaming machines 103 on one or more banks may be individually selected using a selectable graphical interface virtually displaying one or more banks linked to convertible server 101. For example, if there are two banks of six gaming machines 103, the operator may select the inner four gaming machines 103 on each bank to participate in the Tuesday tournament. Once eight gaming machines 103 have been selected by the operator, convertible server may assign a number from one to eight to each gaming machine 103. As shown, Session 1 has gaming machines one through seven; once modified, an eighth gaming machine 103 may be shown available during each session. Prior to the tournament, as each player signs up for the tournament, they may be assigned to a session and a gaming machine. When the session is ready to play, control center server 101 may transmit an instruction to each of the eligible gaming machines with an assigned player and instruct the respective gaming machines to display a respective player's name on display 113. Alternatively, after the tournament has sent a message to the eligible gaming machines to display the assigned player, an additional message may be sent to instruct the gaming machine to change the name of the player based on actions that may be taken by a user such as by modifying the session players on the user display as in FIG. 8 and executing in accordance with the shown and described tournament control process and apparatus.

Figure 9:
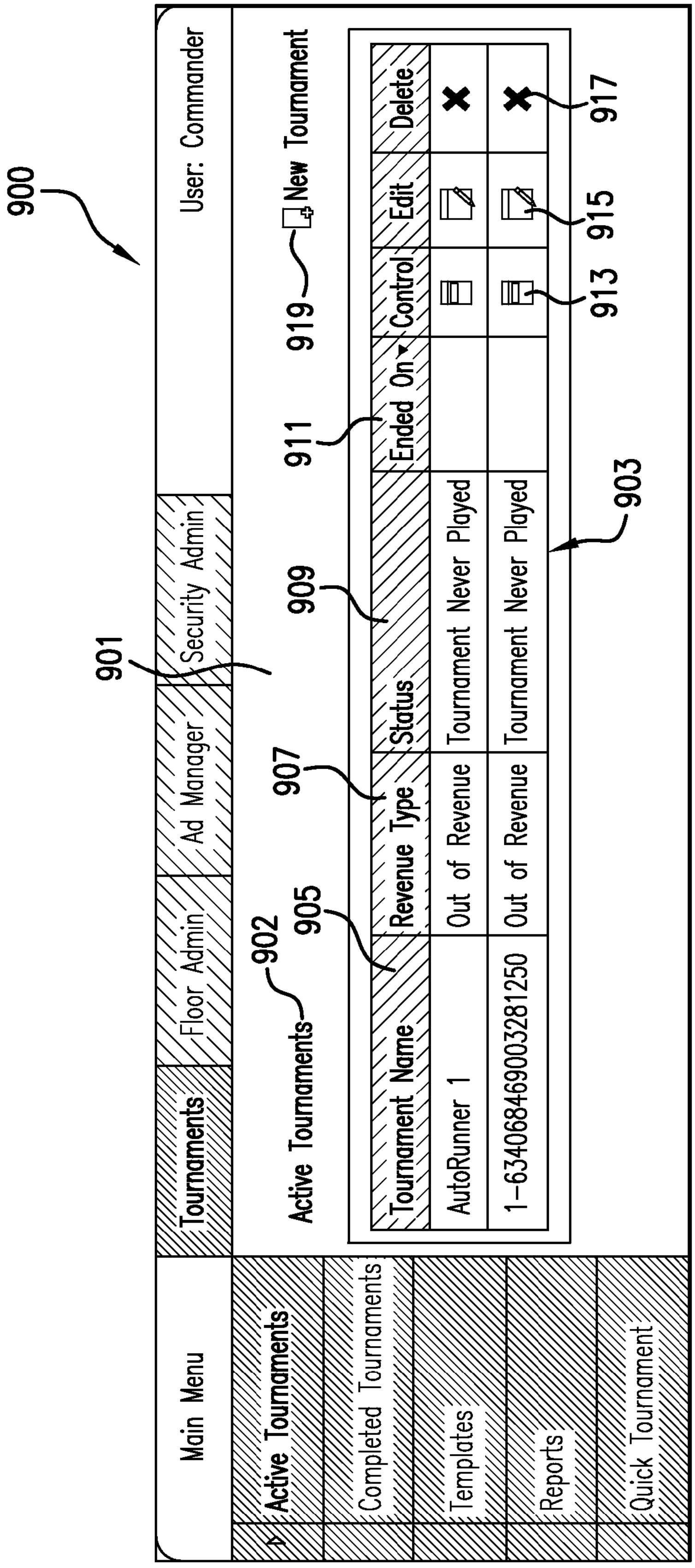
FIG. 9 illustrates an example active tournaments control screenshot displayable at a user interface console of a control center server controlling one or more banks of gaming machines in accordance with one or more embodiments.

Referring to FIG. 9, screenshot 900 of active tournaments page 901 is shown which may, for example, be displayed at the user interface console of control center server 101 (shown in FIG. 1) following an authorized user successfully logging on. Active tournaments page 901 may display header 902 and tournament list 903 including all tournaments currently active on the system. The list may provide a field for tournament name 905, revenue type 907, status 909, and end time 911. Each listing also includes an associated selectable icon: control 913, edit 915, and delete 917. Additionally, active tournaments page 901 may include new tournament selectable icon 919. Selection of control icon 913 may take the user to the display screenshot shown in FIG. 8, thereby giving the user the ability to manage and control one or more tournaments at a time.

Figure 10:
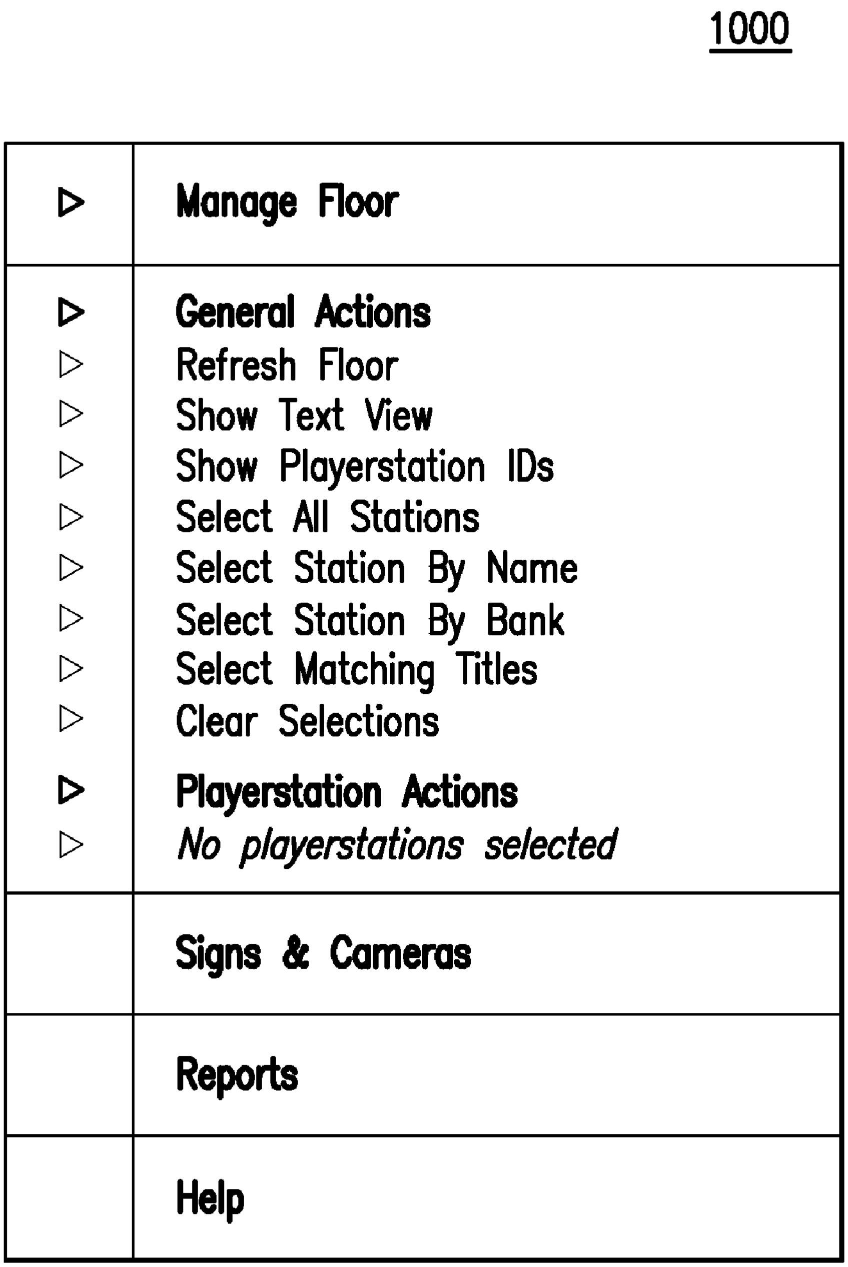
FIG. 10 illustrates an example manage floor menu displayable at a user interface console of a control center server controlling one or more banks of gaming machines in accordance with one or more embodiments.
Figure 11:
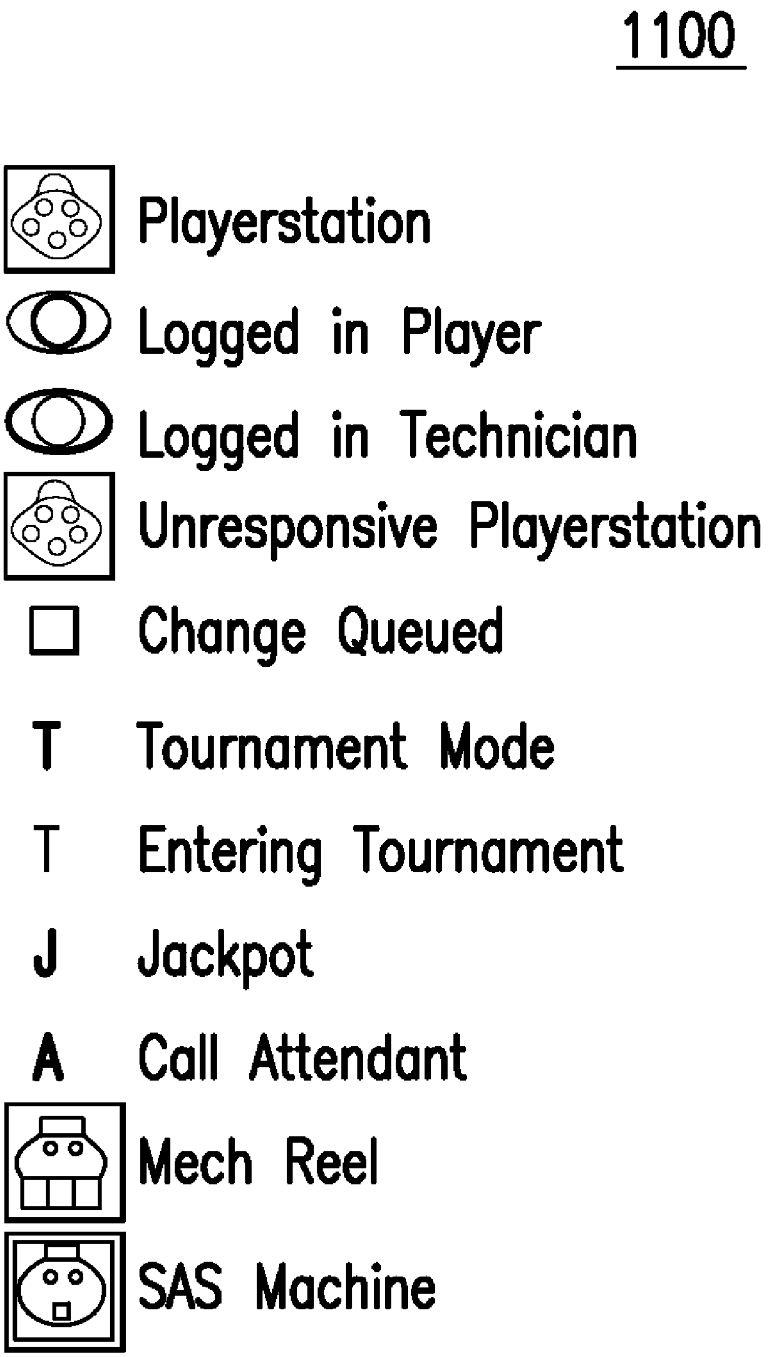
FIG. 11 illustrates an example glossary displayable at a user interface console of a control center server controlling one or more banks of gaming machines in accordance with one or more embodiments.
Figure 12:
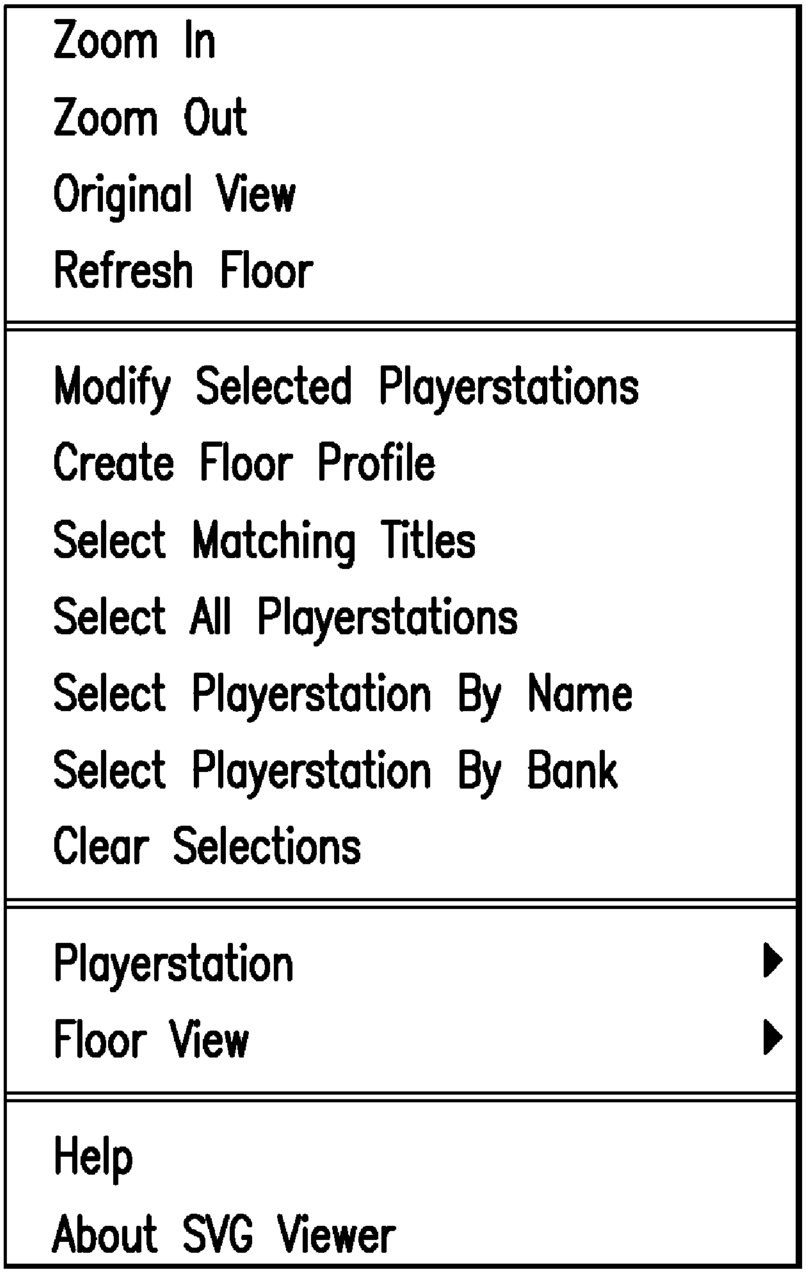
FIG. 12 illustrates an example floor menu displayable at a user interface console of a control center server controlling one or more banks of gaming machines in accordance with one or more embodiments.
Figure 13:
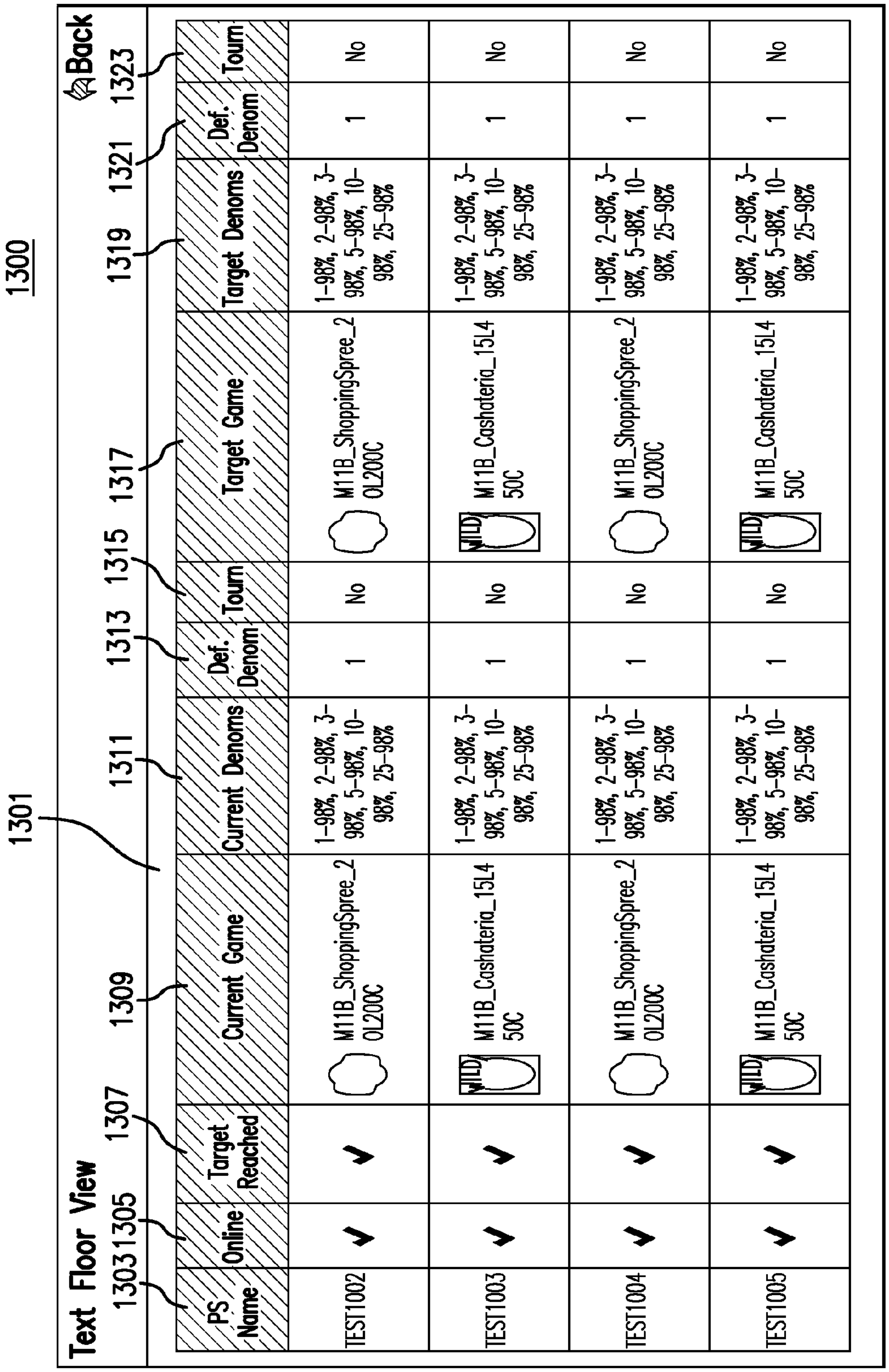
FIG. 13 illustrates an example text floor view screenshot displayable at a user interface console of a control center server controlling one or more banks of gaming machines in accordance with one or more embodiments.
Figure 14:
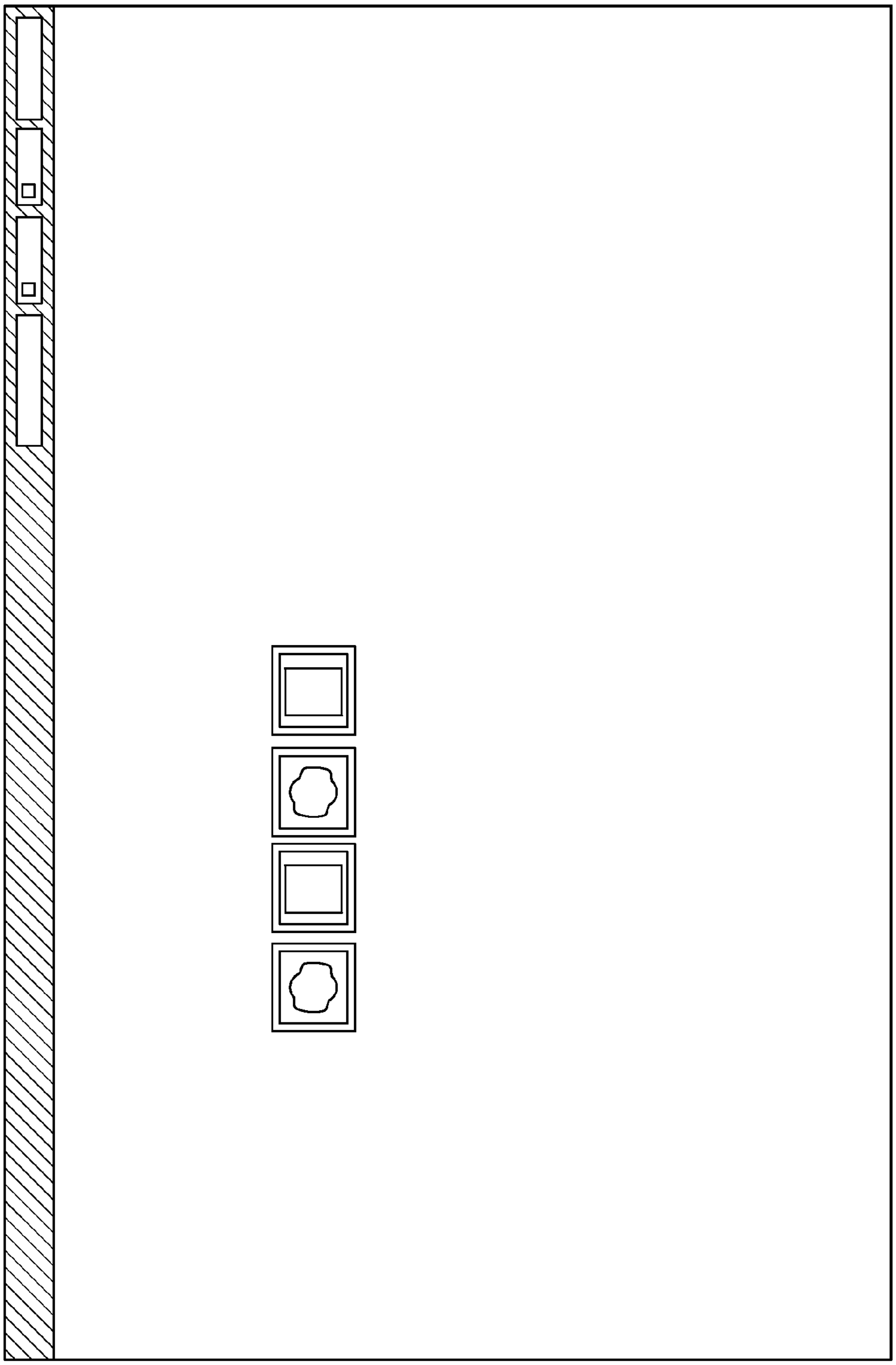
FIG. 14 illustrates an example live floor screenshot displayable at a user interface console of a control center server controlling one or more banks of gaming machines in accordance with one or more embodiments.

Referring to FIG. 10, floor menu 1000 is shown which may be displayed on the console of control center server 101 (FIG. 1) after selecting floor admin menu 807 in FIG. 8 along with a floor view (not shown) of gaming machines 103 and various other devices and structures. Various icons as shown in icon menu 1100 of FIG. 11 may be displayed with the floor view to indicate various gaming machines and/or modes (player stations, mechanical reel, SAS-enabled, unresponsive, tournament mode, logged in player, logged in technician, change queued, entering tournament mode, jackpot, call attendant). By example, icon menu 1100 may be displayed by selecting the 'help' icon on one of the displayed screens. Floor menu 1000 may include selectable icons such as Refresh Floor, Show Text View, Show Player station IDs, Select All Stations, Select Station By Name, Select Station By Bank, Select Matching Titles, and Clear Selections; such that when selected ones of the stations (e.g. gaming machines 103) may be grouped or identified. Similarly, context menu 1200 of FIG. 12 may be accessed through floor admin menu 807, such as by selecting a live floor setting on the console to select or identify various gaming machines 103. Example text floor view 1300 is shown in FIG. 13 which may be displayed after selecting Show Text View icon from menu 1000 in FIG. 10 to provide floor listing 1301 of gaming machines 103. An Edit Floor option may also be provided to enable gaming machines 103 to be dragged and dropped to user selected locations on the floor. For example, FIG. 14 shows graphical floor view 1400 of gaming machines 103 identified as TEST 1002, TEST 1003, TEST 1004, and TEST 1005 in floor listing 1301. A user may select one of the icons on graphical floor view 1400 to toggle between graphical floor view 1400 and test floor view 1300 along with editing menus.

Referring to FIG. 13, floor listing 1301 may include headers and associated fields for identified gaming machines (player stations, PS) 103, such as PS Name 1303, Online status 1305, Target Reached status 1307, Current Game 1309, Current Denominations 1311, Default Denomination 1313, Tournament 1315, Target Game 1317, Target Denominations 1319, Target Default Denomination 1321, and Target Tournament 1323. Target values may refer to user initiated selections and Target Reached 1307 may indicate whether the user initiated selections have been implemented on respective of gaming machines 103. For example, the first listing identifies gaming machine 103 as TEST 1002. A green check mark under Online 1305 indicates TEST 1002 is online. A green check mark under Target Reached 1307 indicates that all player initiated target features (identified changes at the gaming machine) have been achieved (or implemented). The current game being provided by TEST 1002 is identified as M11B_ShoppingSpree__20L200C. Current denominations are indicated as 1, 2, 3, 5, 10, 25 currency denominations and the statistical payout for each denomination is indicated as 98%. The default denomination is indicated as '1'. TEST 1002 is identified as not in tournament (for example, out-of-revenue) mode. The target settings correspond to the current settings indicating that all user initiated selections have been implemented on TEST 1002. An example process for modifying a live floor view may include:

| Task | Procedure |
|---|---|
| enlarge an object on the floor view | 1 Move the cursor to the object.<br>2 From the context menu, select Zoom In. |
| shrink an object on the floor view | 1 Move the cursor to the object.<br>2 From the context menu, select Zoom Out. |
| restore the live floor view | From the context menu, select Original View. |
| update the live floor view and display changes that were made since the last update | From the main menu or context menu, select Refresh Floor. |
| move player station symbols | 1 From the main menu, select Edit Floor.<br>2 Select the player station symbol.<br>3 Choose from the following actions:<br>Drag the blue circle to move the symbol.<br>Drag the red circle to pivot the symbol.<br>Type new coordinates in the Current Selection boxes.<br>Click the arrow keys on the menu.<br>Click the pivot boxes on the menu.<br>Press the arrow and navigation keys on the keyboard.<br>4 Click Save Changes. |

Following changes, a user may view the status of the floor after the targeted changes are applied by using commands available through the floor view section of the main menu. To cancel a targeted game change, the user may select applicable gaming machine 103 and select the Clear Target option.

An example of steps for managing gaming machines 103 may include:

| Task | Procedure |
|---|---|
| select individual player stations | Select each player station individually. |
| select all player stations | From the Actions menu, select Select all player stations. |
| select a player station by name | 1 From the Actions menu, select Select station by name.<br>2 In the user prompt window, type the players tation ID.<br>3 Click OK. |
| select a player station by bank name | 1 From the Actions menu, select Select player station by bank.<br>2 In the user prompt window, type the bank ID.<br>3 Click OK. |
| select all player stations in a bank | 1 From the main menu, select Banks.<br>2 Click the arrow in the Select player stations in bank box to display the bank names.<br>3 Select the bank name. |
| unselect individual player stations | Click each player station again. |
| unselect all player stations | From the Actions menu, select Clear selections. |

By selecting Banks from the main menu, a user may group gaming machines 103 into a new or saved organizing unit, referred to as a bank, to conveniently modify gaming machines 103 as a group, e.g. set up an out-of-revenue event. Gaming machines 103 may easily be removed from a group, such as by selecting a respective gaming machine in a graphical view and selecting Remove selected PS from bank in the Banks menu.

Figure 15:
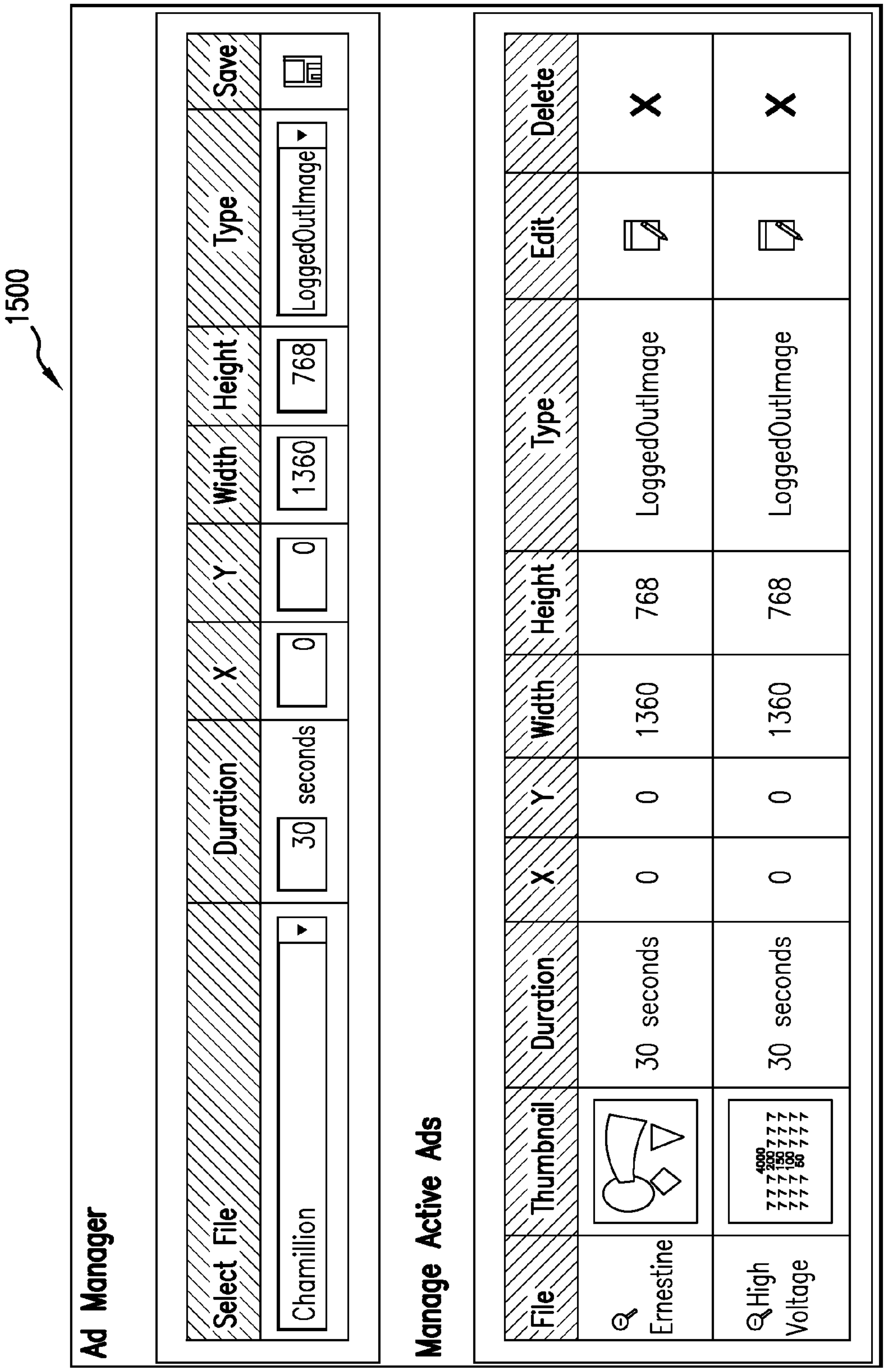
FIG. 15 illustrates an example advertisement manager screenshot displayable at a user interface console of a control center server controlling one or more banks of gaming machines in accordance with one or more embodiments.
Figure 16:
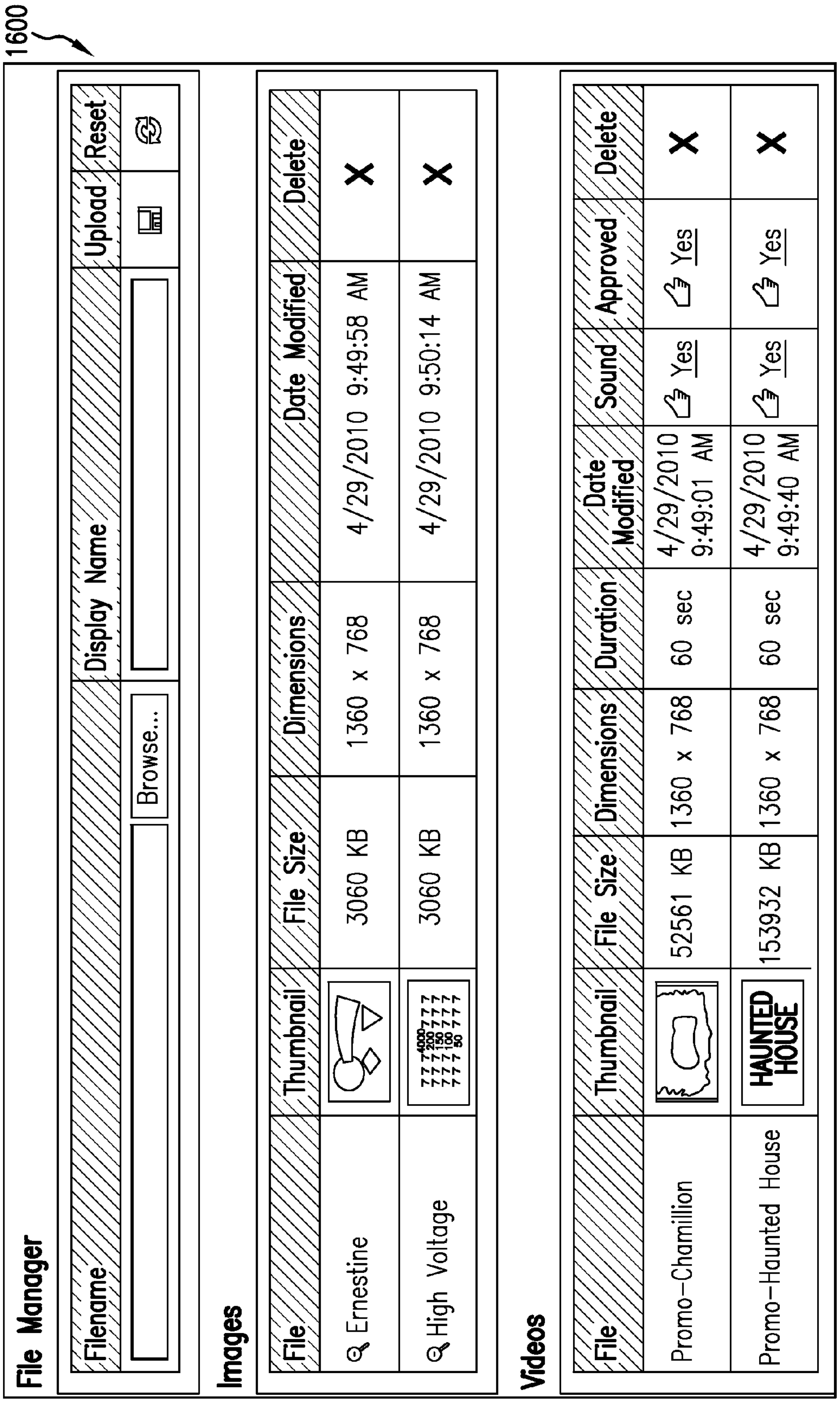
FIG. 16 illustrates an example file manager screenshot displayable at a user interface console of a control center server controlling one or more banks of gaming machines in accordance with one or more embodiments.

Referring to FIGS. 15 and 16, example advertisement manager and file manager screens 1500, 1600 are shown. By selecting Ad Manager from the main menu, a user may display screen 1500 in order to manage and display ads on one or more selected displays, such as display 111 and displays 113 of an associated bank of gaming machines 103. For example, an ad may be identified by a user from a set of uploaded advertisement files and set for display on overhead display 111 (e.g. FIG. 2). In the event, an advertisement is desired that has not been uploaded, a user may access a file available through a storage location on the network or from an alternate storage location, such as a conventional USB, lockable USB, or CD storage device, by selecting File Manager from the main menu, locating the file, defining a name, and uploading the file for accessing through the Ad Manager menu.

For example, advertisements on networked displays may be managed to add a new advertisement as follows:

1 Click Ad Manager, located at the top of whatever view is current (next to Floor Admin, Reports, Tournaments, and Security Admin icons). The Ad Manager: New Ad page displays.

2 From the menu displayed in the left column, click File Manager. The File Manager is the mechanism to load ads into TournEvent® system from an external source.

3 Click Browse and select the file you wish to upload into TournEvent® system.

4 Click Upload on the right side of the File Manager: Upload File page. File details and the uploaded image display.

5 Repeat steps 3 and 4 until all desired ads have been uploaded into TournEvent® system.

6 Click Manage Ads in the left column of the File Manager display.

7 Click the Select File dropdown in the Ad Manager: New Ad section and select the image to display.

8 Select the duration, and x/y offsets (default=0 is usually OK) and the width/height (usually the same as the monitor resolution). From the Type dropdown, select logged out image. This is so that the ads will not run on the top display when players are logged into the player stations. Once these parameters are defined, click Save.

9 The newly saved ad displays in the Ad Manager: Manage Active Ads portion of the Ad Manager page.

10 Enable the Ad Manager service from the TournEvent® management terminal and the ads will soon start displaying.

Figure 17A:
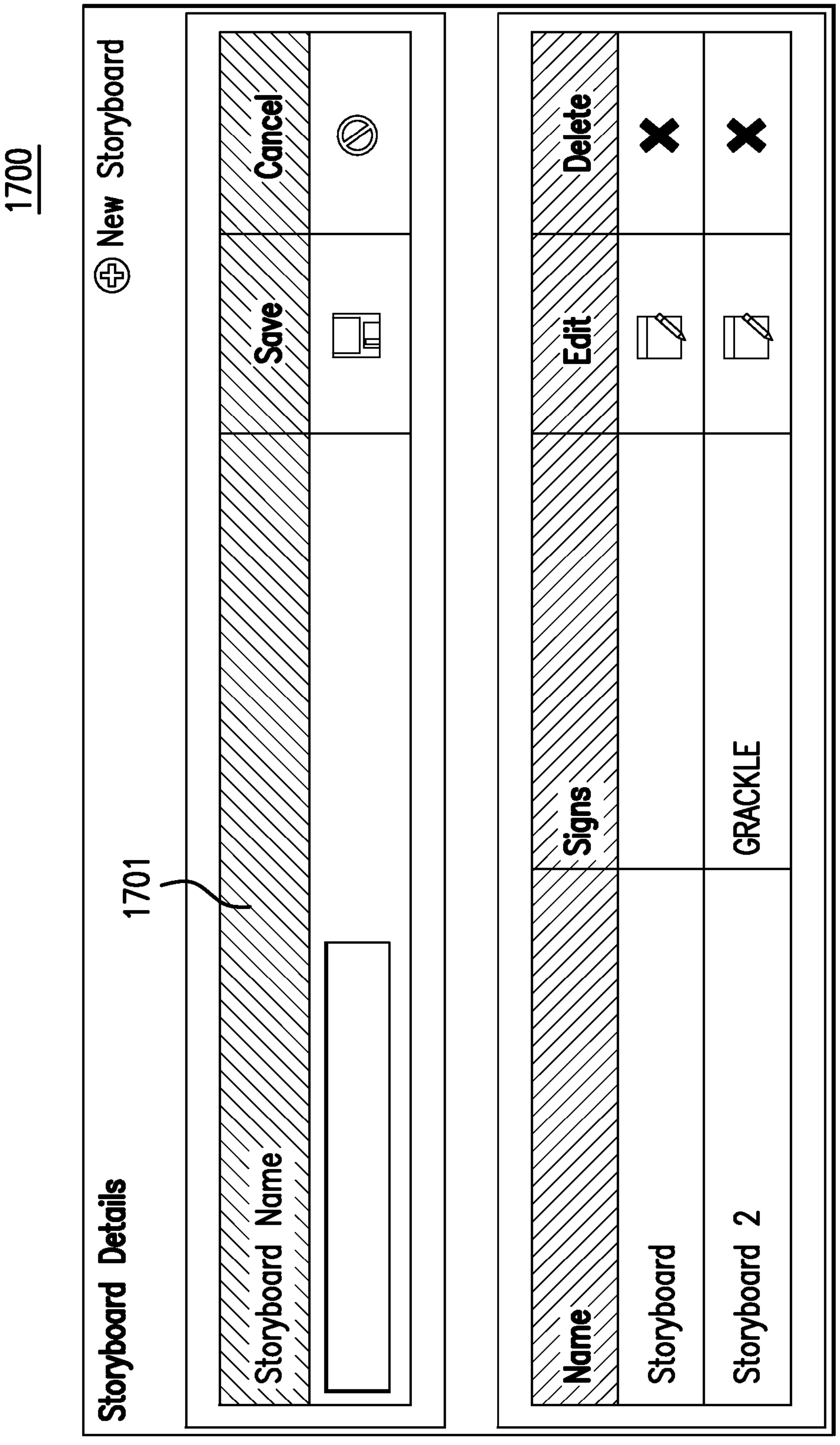
FIG. 17A illustrates an example storyboard manager screenshot displayable at a user interface console of a control center server controlling one or more banks of gaming machines in accordance with one or more embodiments.
Figure 17B:
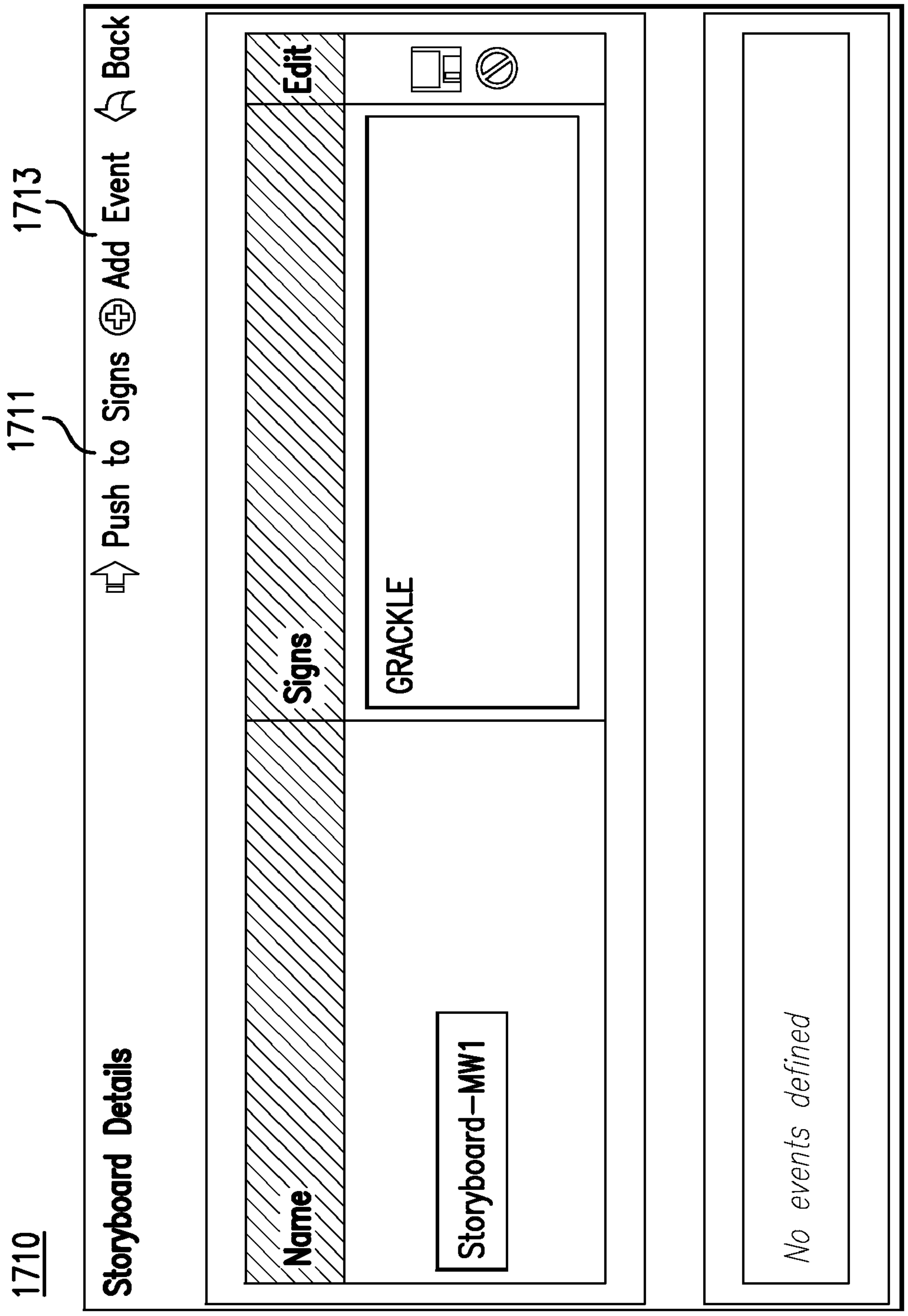
FIG. 17B illustrates an example storyboard details screenshot displayable at a user interface console of a control center server controlling one or more banks of gaming machines in accordance with one or more embodiments.
Figure 17C:
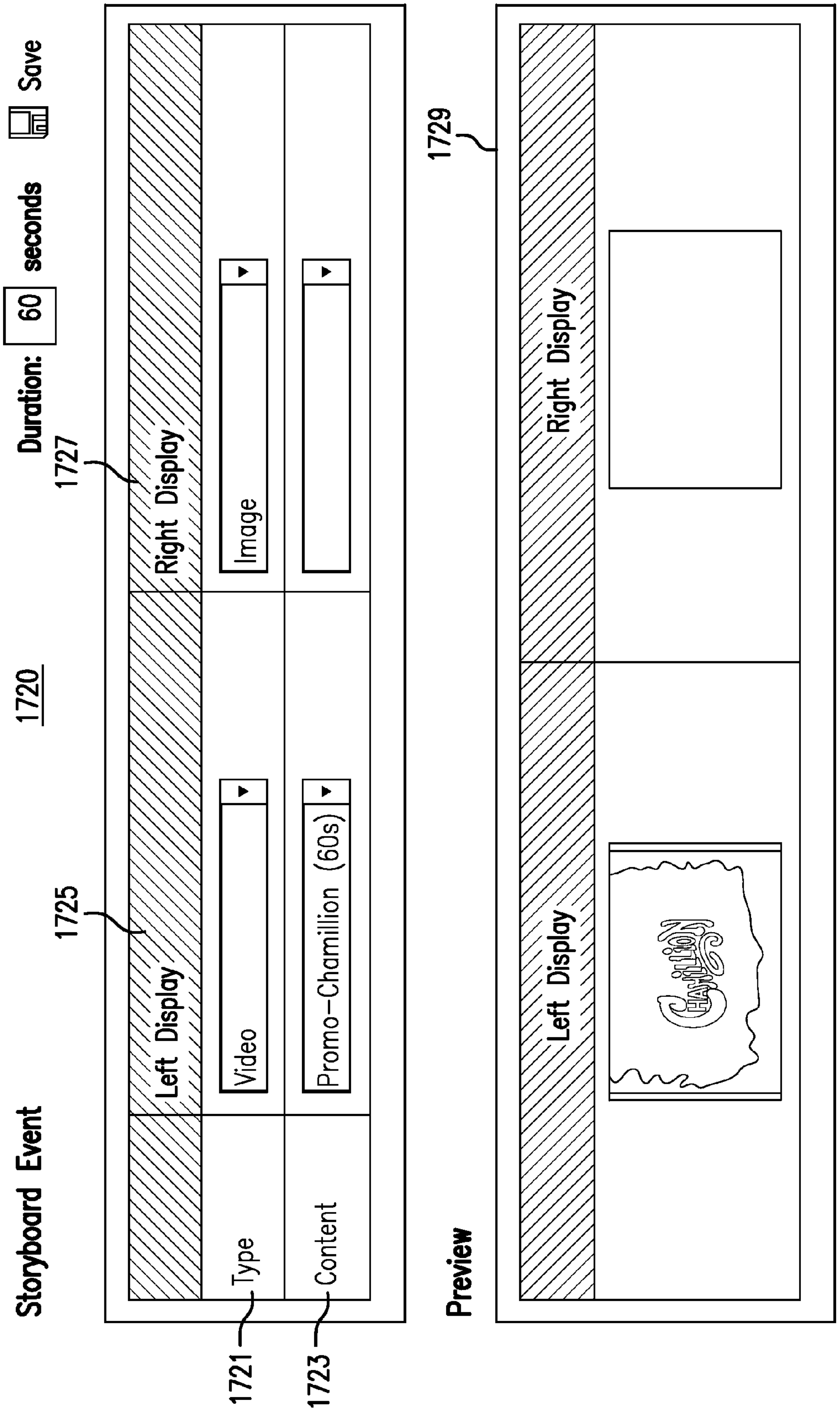
FIG. 17C illustrates an example storyboard event screenshot displayable at a user interface console of a control center server controlling one or more banks of gaming machines in accordance with one or more embodiments.
Figure 17D:
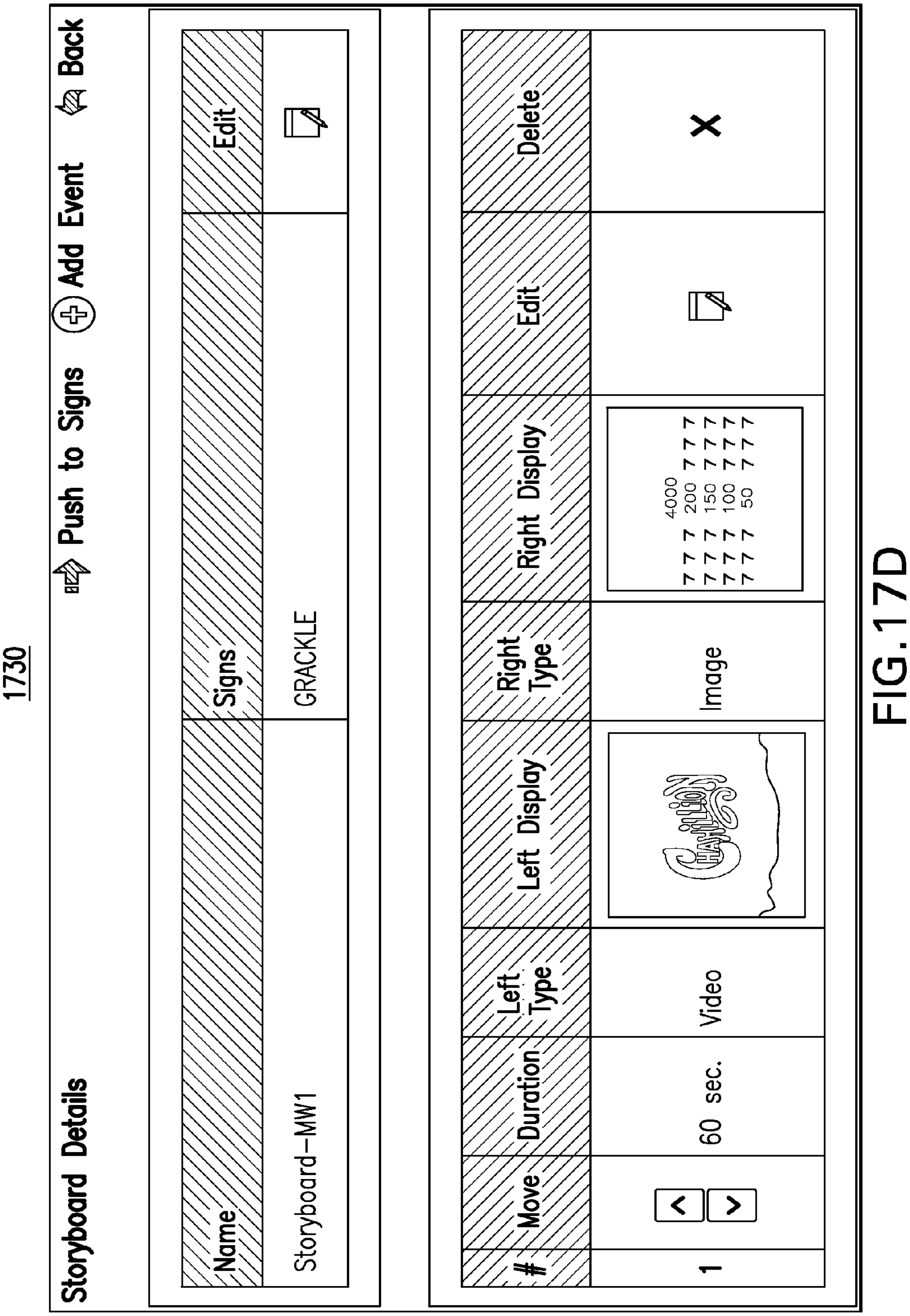
FIG. 17D illustrates an example updated storyboard details screenshot displayable at a user interface console of a control center server controlling one or more banks of gaming machines in accordance with one or more embodiments.

Referring to FIG. 17A, 17B, 17C, 17D, storyboard manager screen, storyboard details, storyboard event, and updated storyboard details screens 1700, 1710, 1720, 1730 are shown which may be displayed by a user selecting Ad Manager from the main menu shown in FIG. 8 and Storyboard Manager from the Ad Manager submenu. The storyboard may be a panel or series of panels outlining the scene sequence which a user (operator) is able to define manually. Additionally, the storyboard may be dynamically generated by combining elements from the manual creation and automated download of content (static or video) from the game. For example, a user may manage storyboards by adding, editing, and deleting using the following procedures:

To add a new storyboard to display on TournEvent® signs (e.g. overhead display 111, displays 113 of selected gaming machines 103):

1 Click Ad Manager, then click Storyboard Manager. The Storyboard Manager screen displays (FIG. 17A).

2 Click New Storyboard. The Storyboard fields display (1701).

3 Enter the Storyboard Name and click. The Storyboard Details screen displays (1710).

4 Click Push to Signs (1711) to assign the storyboard to specific TournEvent® Signs. Press CTRL and click to select multiple signs. Click to save the sign assignment.

5 Click Add Event (1713). The Event Edit window displays (1720).

6 Select the event Type and the Content file (1721, 1723) for the Left Display (1725) and Right Display (1727). Previews of the selected events display in the Preview area (1729).

7 Click to save the event. The updated Storyboard Details screen displays (1730), showing the new event.

8 Repeat steps 5 through 7 as needed, to add more events to the storyboard.

9 Use the Move buttons to adjust the order of events on the storyboard as needed.

10 Click Push to Signs to push the storyboard out to the selected signs.

11 Click Back to return to the Storyboard Manager screen.

To edit a storyboard:

1 Click Ad Manager, then click Storyboard Manager. The Storyboard Manager screen displays.

2 Click for the storyboard you wish to edit. The Storyboard Details screen displays.

3 Edit the events and signs as necessary, then click Back to return to the Storyboard Manager screen.

To delete a storyboard:

1 Click Ad Manager, then click Storyboard Manager. The Storyboard Manager screen displays.

2 Click for the storyboard you wish to delete. The system prompts you to confirm that you wish to delete the storyboard.

3 Click Yes

Figure 18:
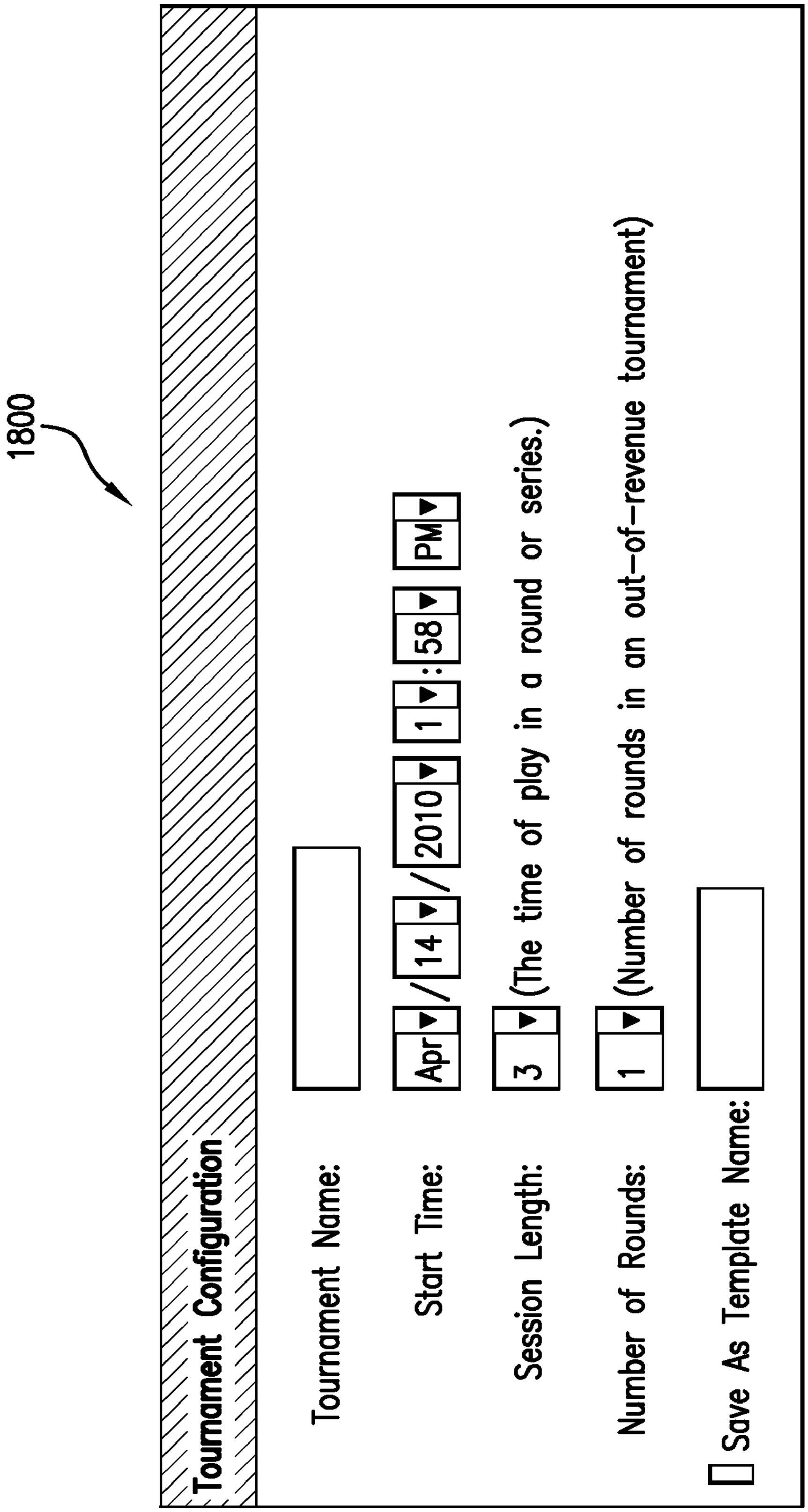
FIG. 18 illustrates an example tournament configuration screenshot displayable at a user interface console of a control center server controlling one or more banks of gaming machines in accordance with one or more embodiments.
Figure 19:
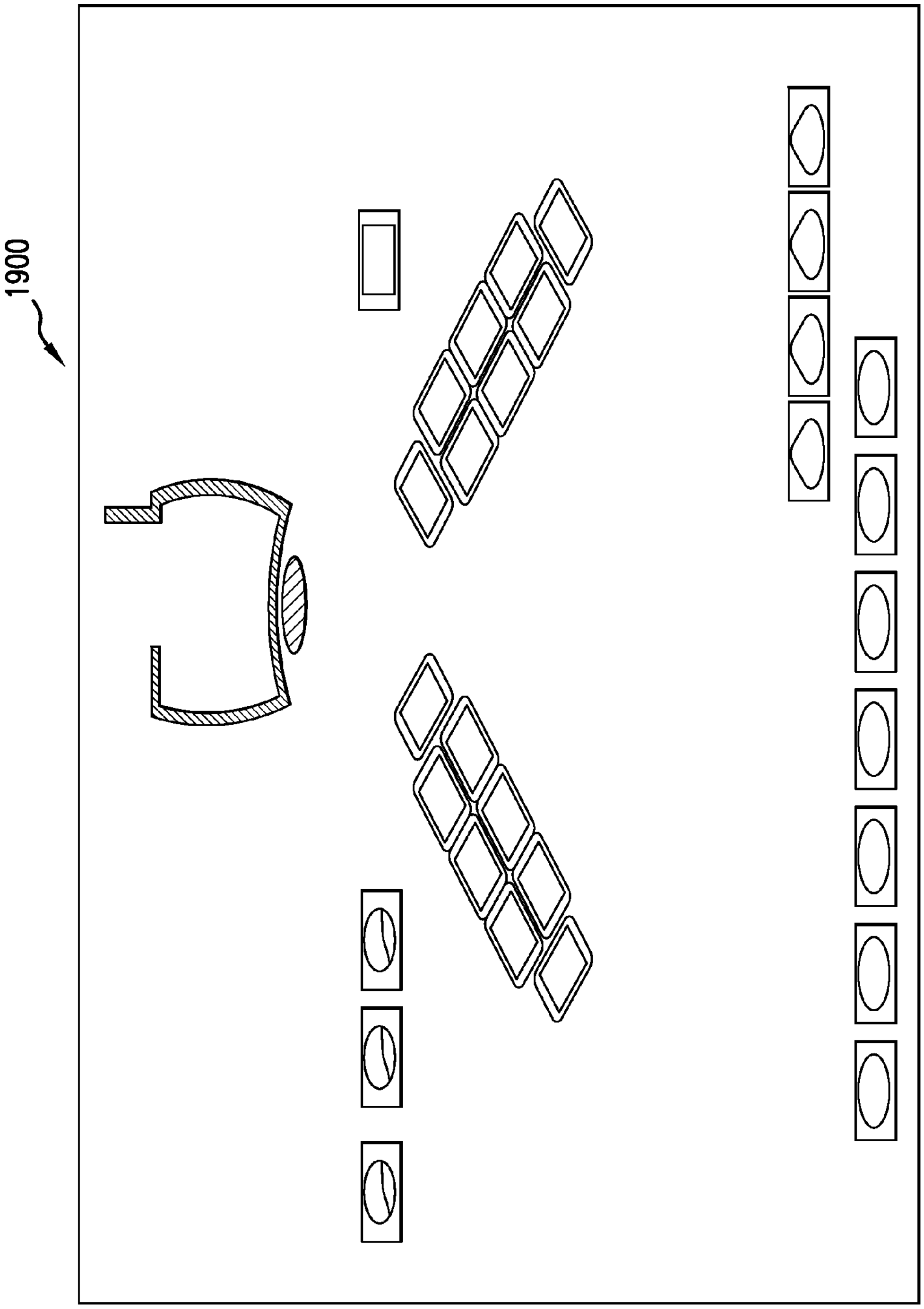
FIG. 19 illustrates an example graphic floor view screenshot displayable at a user interface console of a control center server controlling one or more banks of gaming machines in accordance with one or more embodiments.
Figure 20:
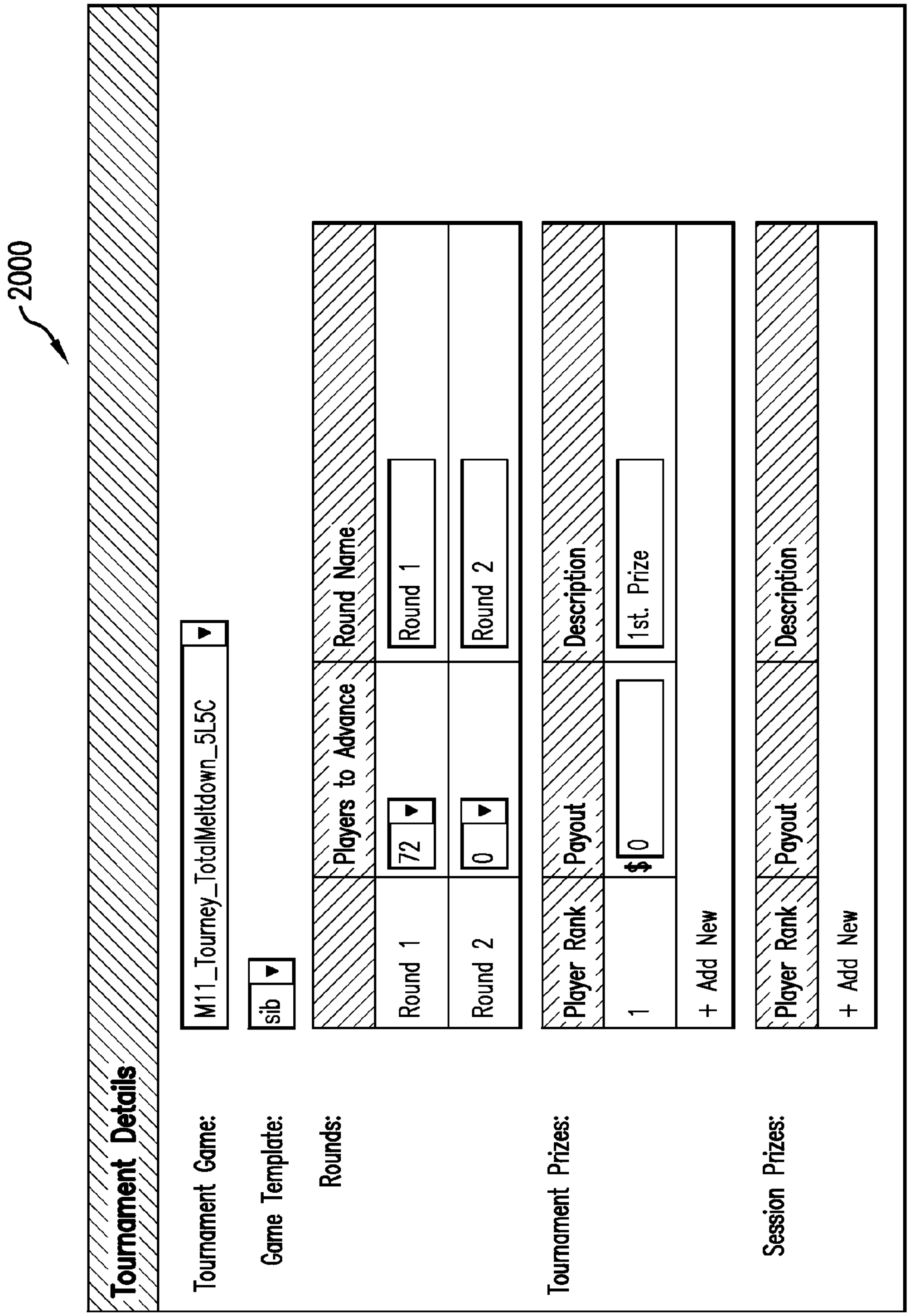
FIG. 20 illustrates an example tournament details screenshot displayable at a user interface console of a control center server controlling one or more banks of gaming machines in accordance with one or more embodiments.

Referring to FIGS. 18-20, tournament configuration, tournament graphical display, and tournament details screens 1800, 1900, and 2000, respectively, are shown that may be accessed by selecting Tournaments from the main menu shown in FIG. 8. For example, a user may create a tournament (or an out-of-revenue event) without a template as follows:

1 From the application bar, select Tournaments.

2 On the Active Tournaments screen, click New Tournament.

3 At the Load from Template prompt, select No.

4 In the Tournament Configuration box, complete the options.

5 In the Tournament Name box, type a unique name to identify the tournament. You can use a maximum of 12 letters, numbers, and spaces.

6 Click the arrows in the Start Time boxes to specify the start date and time.

7 Click the arrow in the Session Length box to select the duration of the tournament in minutes.

8 Click the arrow in the Number of Rounds box to specify more than one round for the tournament.

9 To save these specifications for use with another tournament, complete the following steps:

10 Select Save As Template.

11 In the Name box, type a unique name to identify the template.

12 Add player stations to the tournament by selecting them from the floor map.

13 In the Tournament Details box, select the Tournament Game, then the Game Template.

14 In the Rounds box, complete the options.

If you selected one round in the Tournament Configuration Number of Rounds box, type an optional name for the round in the Round Name column. If you selected more than one round in the Tournament Configuration Number of Rounds box, multiple rounds display in the Tournament Details Rounds box. Click the arrows in the Players to Advance column to select the number of winners from each round to move to the next round. In the Round Name column, type an optional unique name to identify each round.

15 To create additional award levels, in the Tournament Prizes box, click+Add New.

16 In the Payout boxes, type the prize amounts.

17 In the Description boxes, type the award names.

18 Repeat the previous two steps for Session Prizes, if necessary.

19 Click Add Tournament. The Add Player to Tournament window displays.

20 Enter part of a player's name in the Player Name field and click Search, or select a name from the Player Name drop-down menu. Alternately, select from the All Existing Players list. Click Create New Player to add a new player.

21 Click Save Player Selections. The Tournament Control screen displays details about the tournament.

22 Touch Back to return to the Active Tournaments screen.

Figure 21:
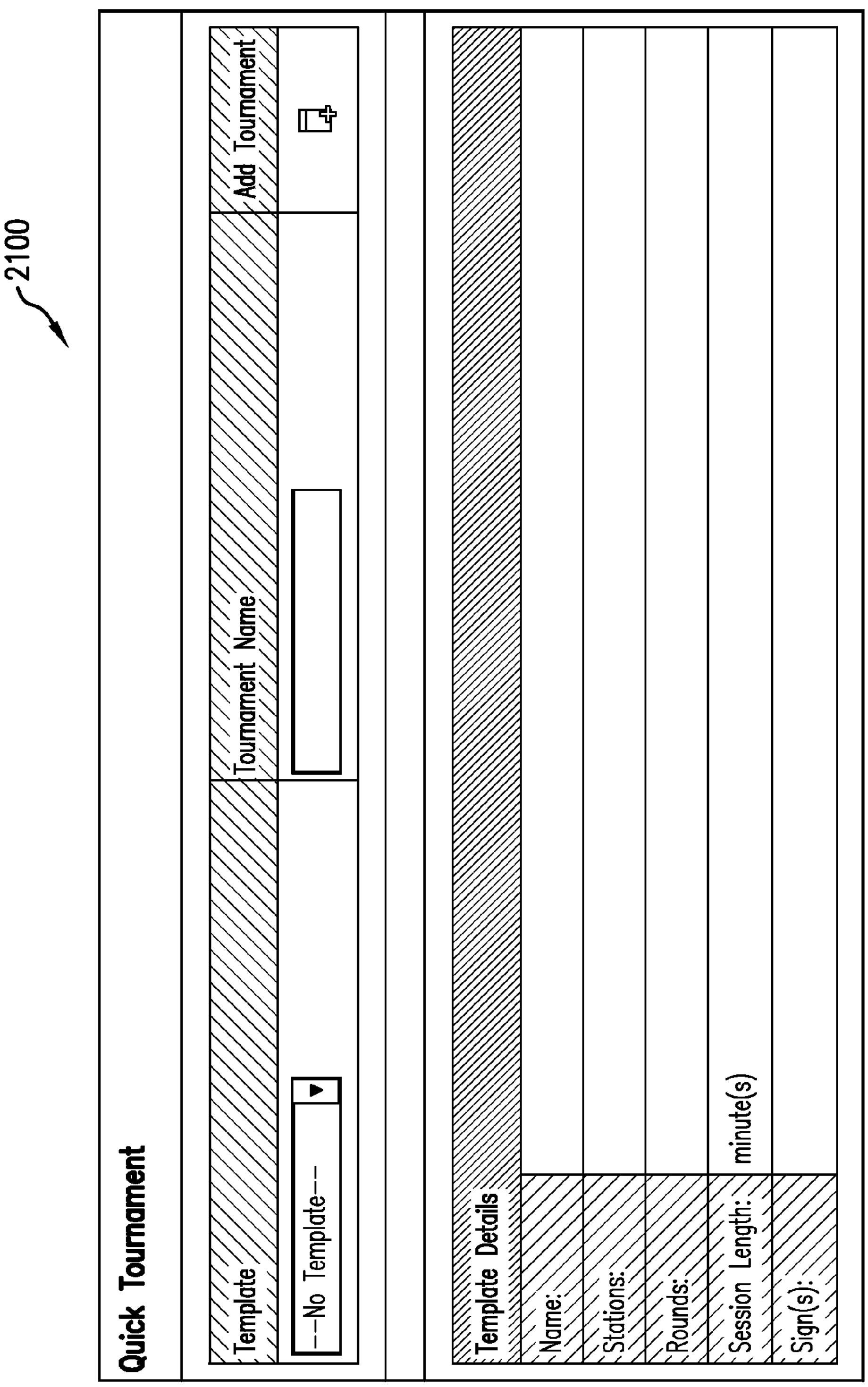
FIG. 21 illustrates an example quick tournament screenshot displayable at a user interface console of a control center server controlling one or more banks of gaming machines in accordance with one or more embodiments.
Figure 22:
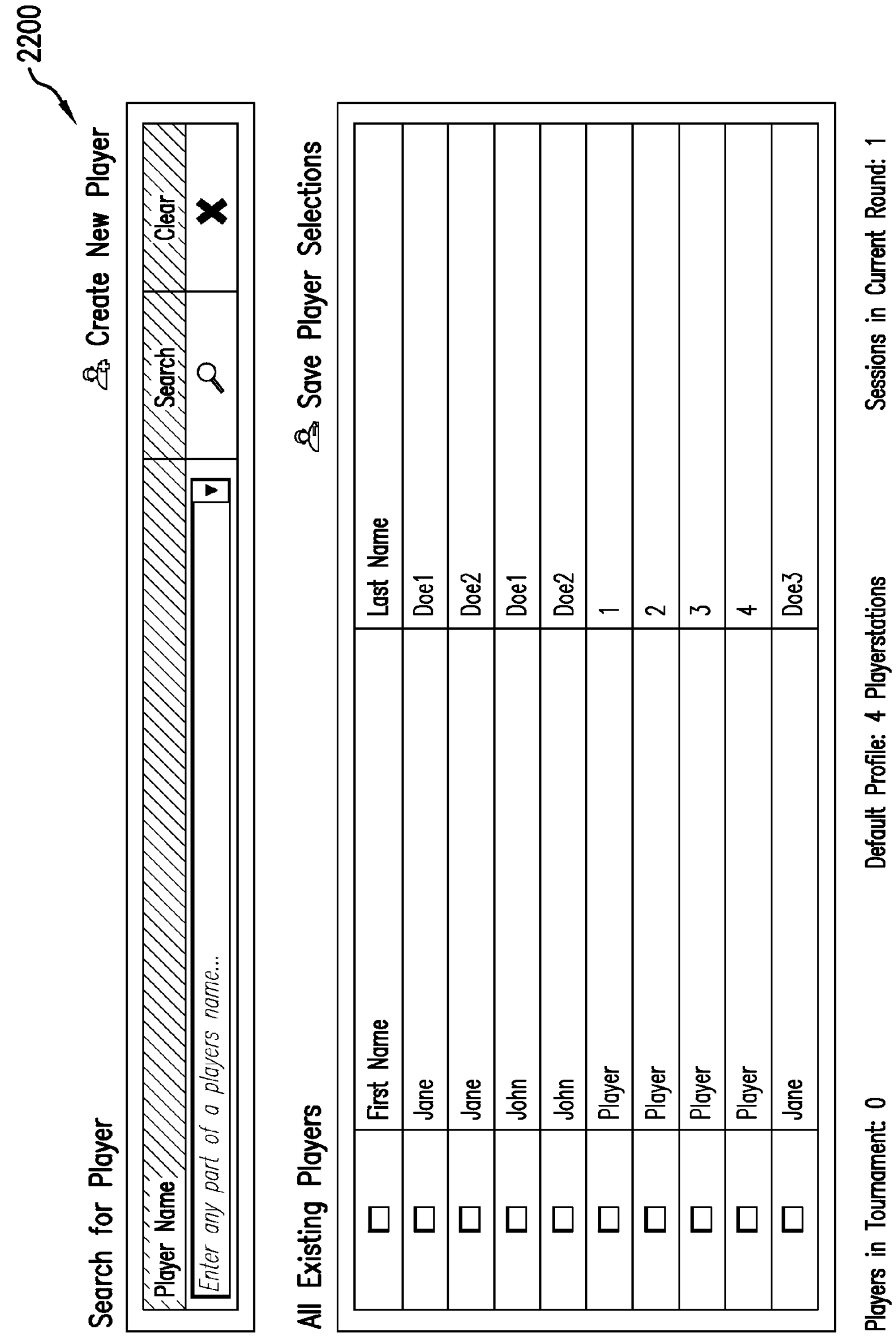
FIG. 22 illustrates an example player search screenshot displayable at a user interface console of a control center server controlling one or more banks of gaming machines in accordance with one or more embodiments.

Referring to FIGS. 21-22, quick tournament and search for player screens 2100, 2200 are shown that may be accessed by selecting Tournaments from the main menu shown in FIG. 8. For example, a user may quickly create a tournament (or an out-of-revenue event) without a template as follows:

1 Click Tournaments, then click Quick Tournament. The Quick Tournament screen displays.

2 Select the Template this tournament will be based on, then enter a Tournament Name.

3 Click Add Tournament. The Add Player to Tournament window displays.

4 Add players to the tournament:

Enter part of a player's name in the Player Name field and click Search, or select a name from the Player Name drop-down menu.

Alternately, select from the All Existing Players list.

Click Create New Player to add a new player.

5 Click Save Player Selections. The Tournament Control screen displays.

6 Run the tournament

Referring again to FIGS. 8 and 22, a user may enroll players and manage gaming machine 103 assignments after creating a tournament specification as follows:

1 From the application bar, select Tournaments.

2 From the list of active tournaments, click beside the appropriate tournament.

3 Click Add Player. The Search for Player screen displays.

Enter part of a player's name in the Player Name field and click Search, or select a name from the Player Name drop-down menu.

Alternately, select from the All Existing Players list.

Click Create New Player to add a new player.

4 Click Save Player Selections.

Figure 23:
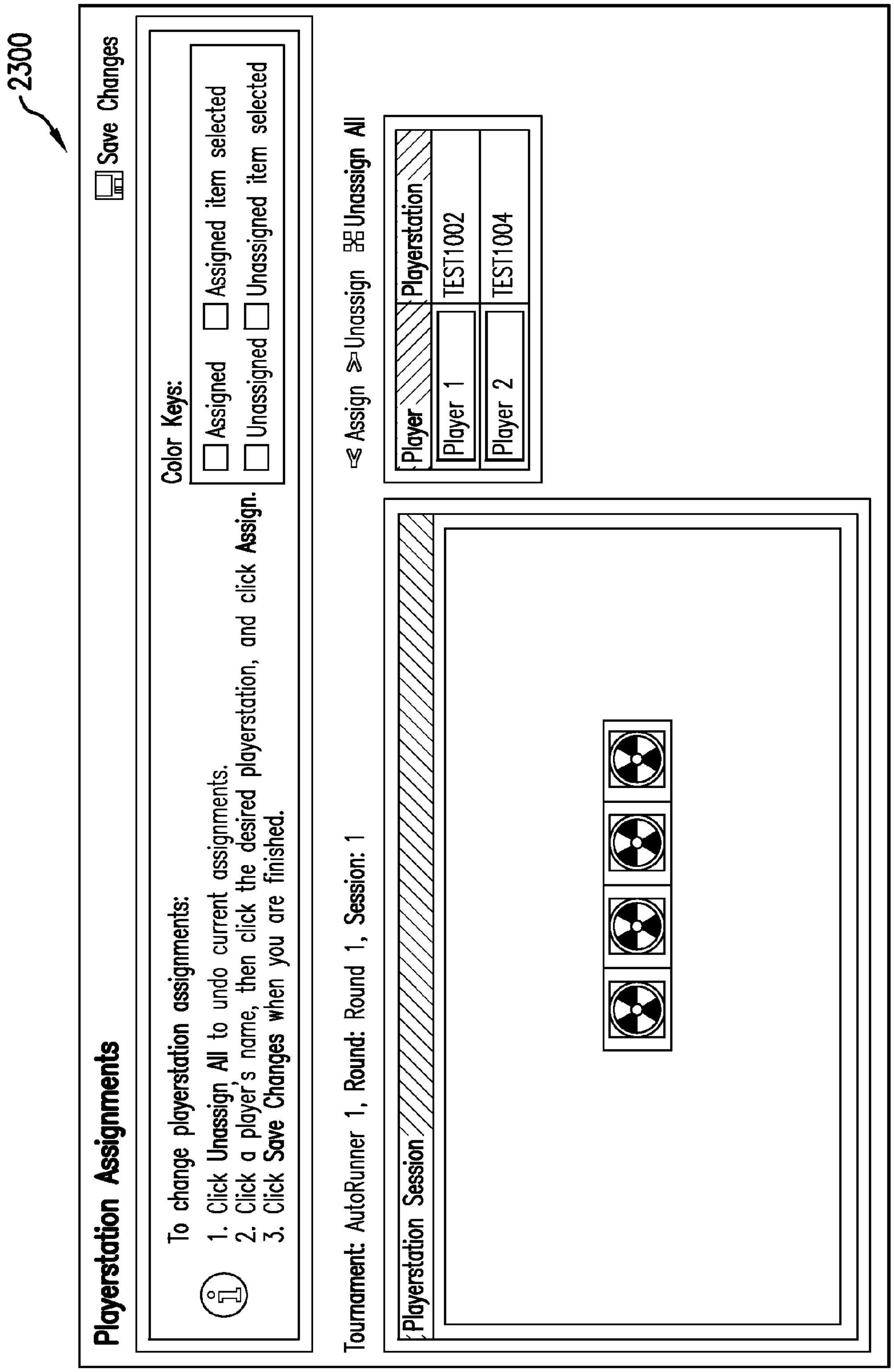
FIG. 23 illustrates an example player station assignments screenshot displayable at a user interface console of a control center server controlling one or more banks of gaming machines in accordance with one or more embodiments.

Referring again to FIG. 8 and also FIG. 23 showing a player station assignment screenshot 2300, a user may change gaming machine 103 assignments as follows:

1 From the list of active tournaments, click on the appropriate row. The Tournament Control screen displays.

2 Under Rounds & Sessions, click. The Playerstation Assignments window displays.

3 Click Unassign All to undo all player station assignments. To change a player's player station assignment, click the player, click Unassign, then select the desired player station and click Assign. If another player is already assigned to the desired player station, that player will need to be unassigned first.

4 Click Save Changes to save the new player station assignments and return to the Tournament Control window.

5 To move a player from one session to another, click the player's name and drag it to the desired session.

6 To add or remove player stations to or from a session, click in the session heading, then make the necessary changes in the Edit Session Profile window.

7 To edit a player's name and/or to activate or deactivate the camera on his/her player station, click next to his/her name, then make the necessary changes in the Edit Tournament Player window.

Referring again to FIG. 8, a user may operate a tournament as follows:

1 From the list of Active Tournaments, click on the appropriate row.

2 Verify that the specifications on the Tournament Detail screen are correct. If the information needs editing, click Edit Tournament.

3 When the tournament specifications are correct, click Start Tournament.

4 Before you continue, verify that the screen displays the following message: OK: Successfully started Tournament 'Tournament Name' The screen might also display the following message: It may take a minute for the player stations to be ready to play before you can Ready Next Session.

5 Click Ready Next Session. The player stations display a welcome message to each player.

6 At the player stations, verify that the tournament game has registered and the System Locked notification displays.

7 Click Start Next Session. The player stations display a countdown, after which players can begin play.

8 For a multiple session round, at the player stations, verify that the tournament game has registered and the System Locked notification is displayed.

9 Click Ready Next Session. The player stations display a welcome message to each active player.

10 Click Start Next Session. The player stations display a countdown, after which players can begin play.

11 If a session must be replayed for any reason (such as a player station rebooting, for example), click Replay Session to replay the previous session without having to recreate it.

At the end of the tournament, the player stations display the message TEMPORARILY UNAVAILABLE while the system records the results.

12 Click End Tournament.

Figure 24:
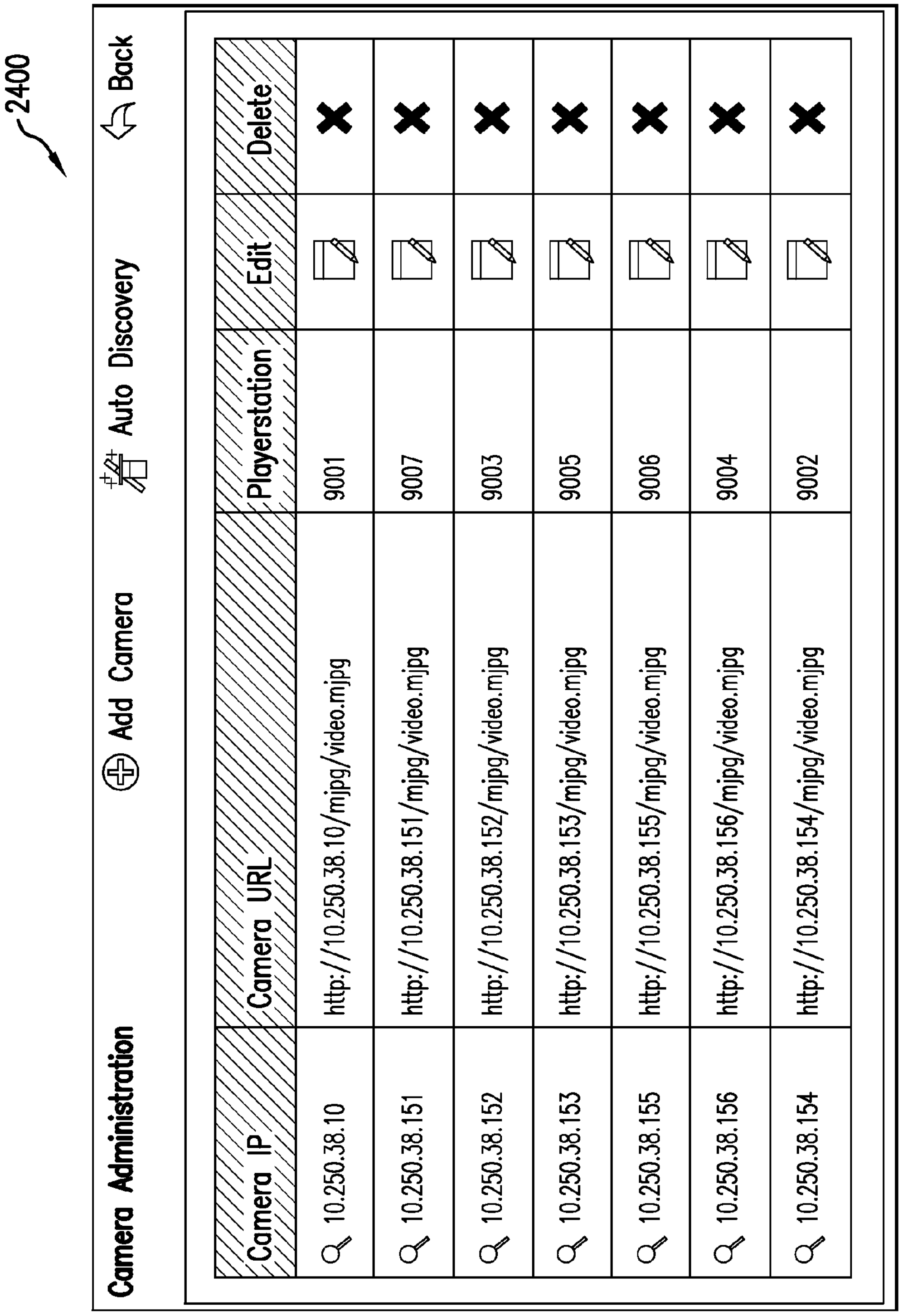
FIG. 24 illustrates an example camera administration screenshot displayable at a user interface console of a control center server controlling one or more banks of gaming machines in accordance with one or more embodiments.
Figure 25:
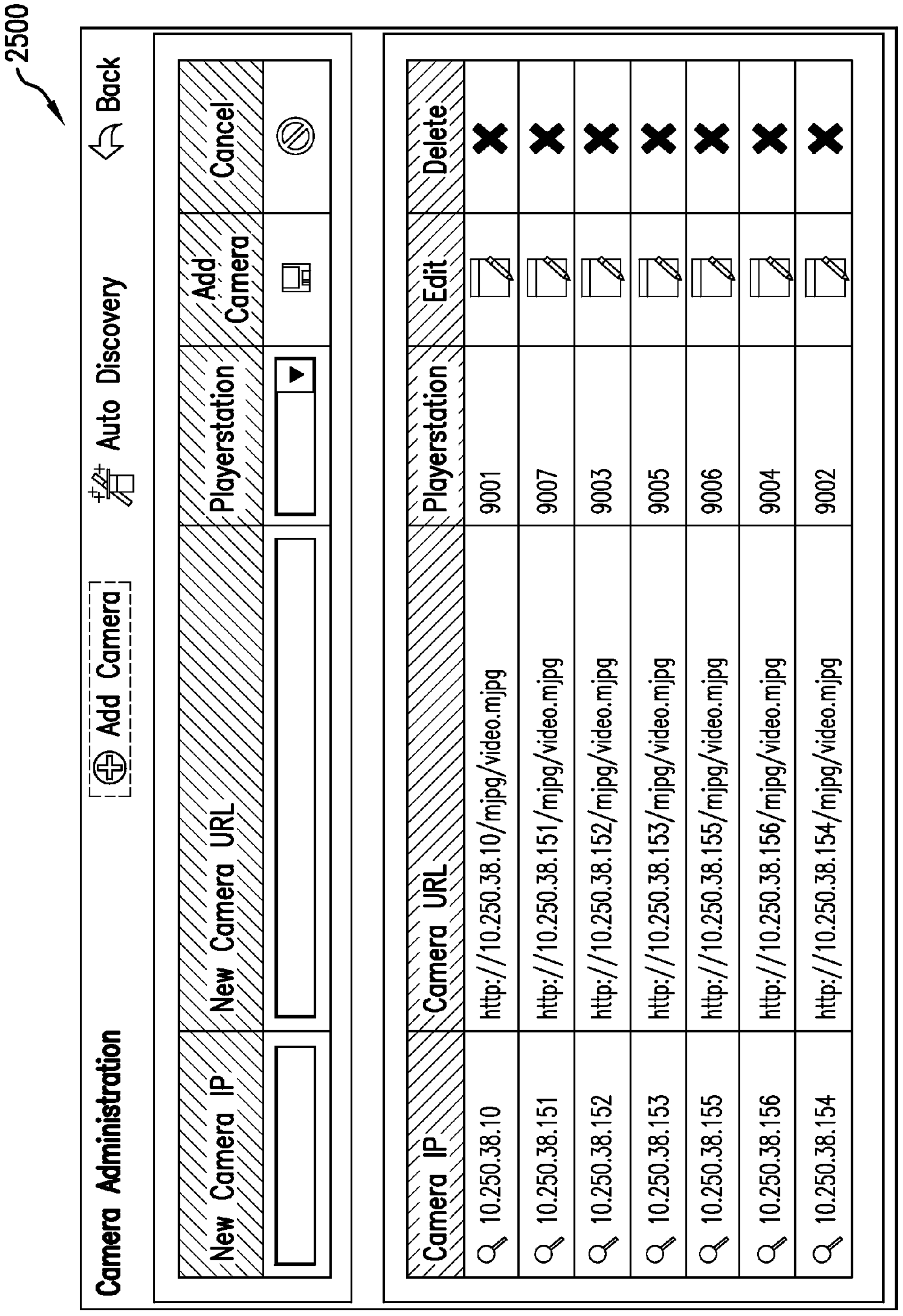
FIG. 25 illustrates an example camera administration screenshot with editor fields for new camera entry, displayable at a user interface console of a control center server controlling one or more banks of gaming machines in accordance with one or more embodiments.
Figure 26:
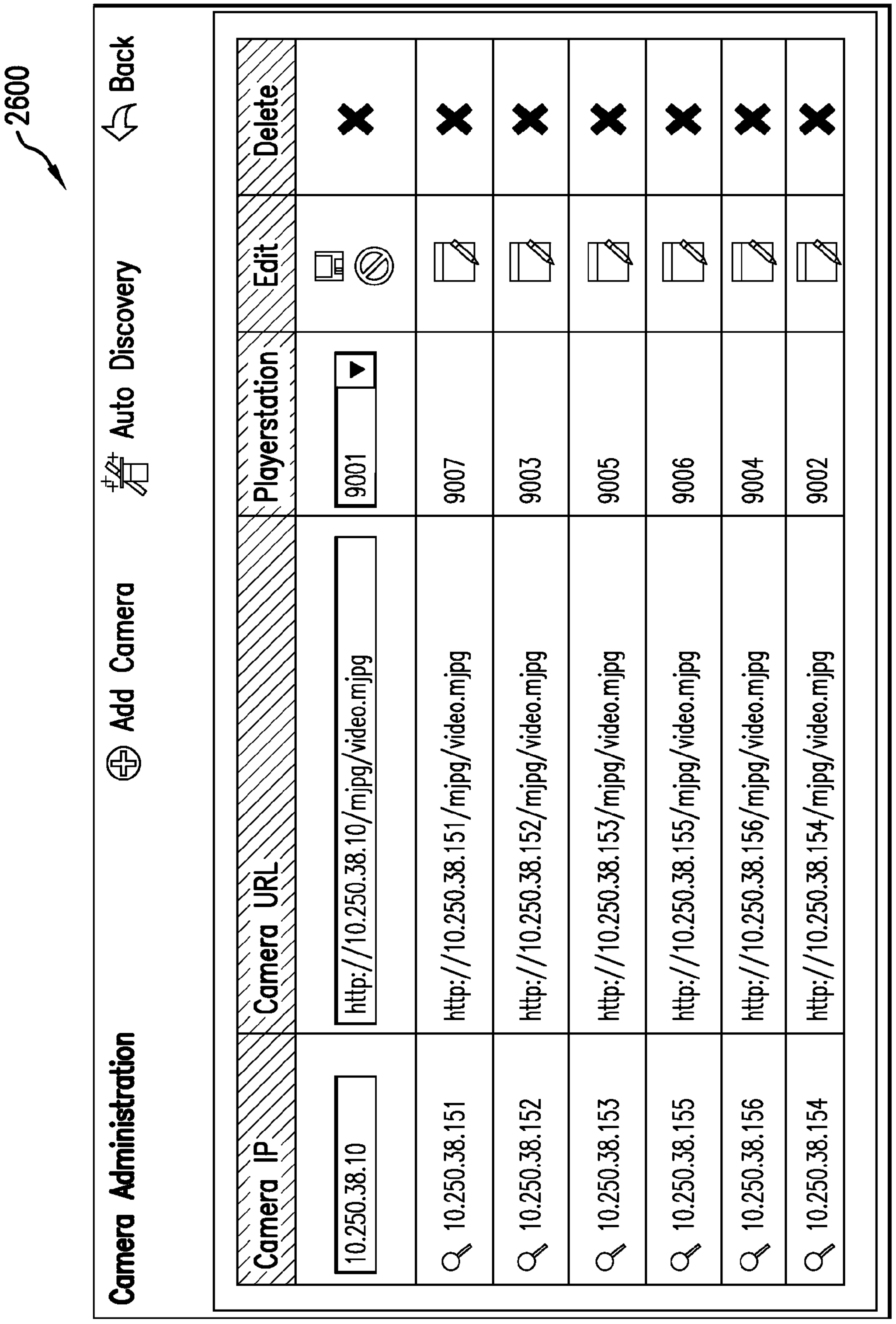
FIG. 26 illustrates an example camera administration screenshot with a selected camera detail fields, displayable at a user interface console of a control center server controlling one or more banks of gaming machines in accordance with one or more embodiments.

Referring to FIG. 24, 25, 26, example camera administration screens 2400, 2500, 2600 are shown which may be displayed after a user selects Floor Admin options from the main menu shown in FIG. 8 and then Signs and Cameras from the Floor Admin submenu. For example, by accessing the camera administration pages, a user may add or delete one or more cameras, or edit camera properties as follows:

To add a camera to the TournEvent® system:

1 Click Floor Admin, then under Signs & Cameras, click Cameras. The Camera Administration screen displays, listing all cameras in the system.

2 Click Add Camera. The Add Camera fields displays.

3 Enter the New Camera IP, the New Camera URL, and select the Playerstation where the new camera is located.

4 Click. The new camera displays in the list.

Note: A user may click on a Camera IP to activate a window that shows the camera's view.

To edit the properties of a camera record:

1 Click Floor Admin, then under Signs & Cameras, click Cameras. The Camera Administration screen displays, listing all cameras in the system.

2 Click for the camera record you wish to modify. The camera fields activate.

3 Make any necessary changes to the Camera IP, Camera URL, or Playerstation.

4 Click to save your changes.

To delete a camera record from the TournEvent® system:

1 Click Floor Admin, then under Signs & Cameras, click Cameras. The Camera Administration screen displays, listing all cameras in the system.

2 Click for the camera record you wish to delete. The system prompts you to confirm that you wish to delete the camera record.

3 Click Yes to delete the camera record.

Figure 27:
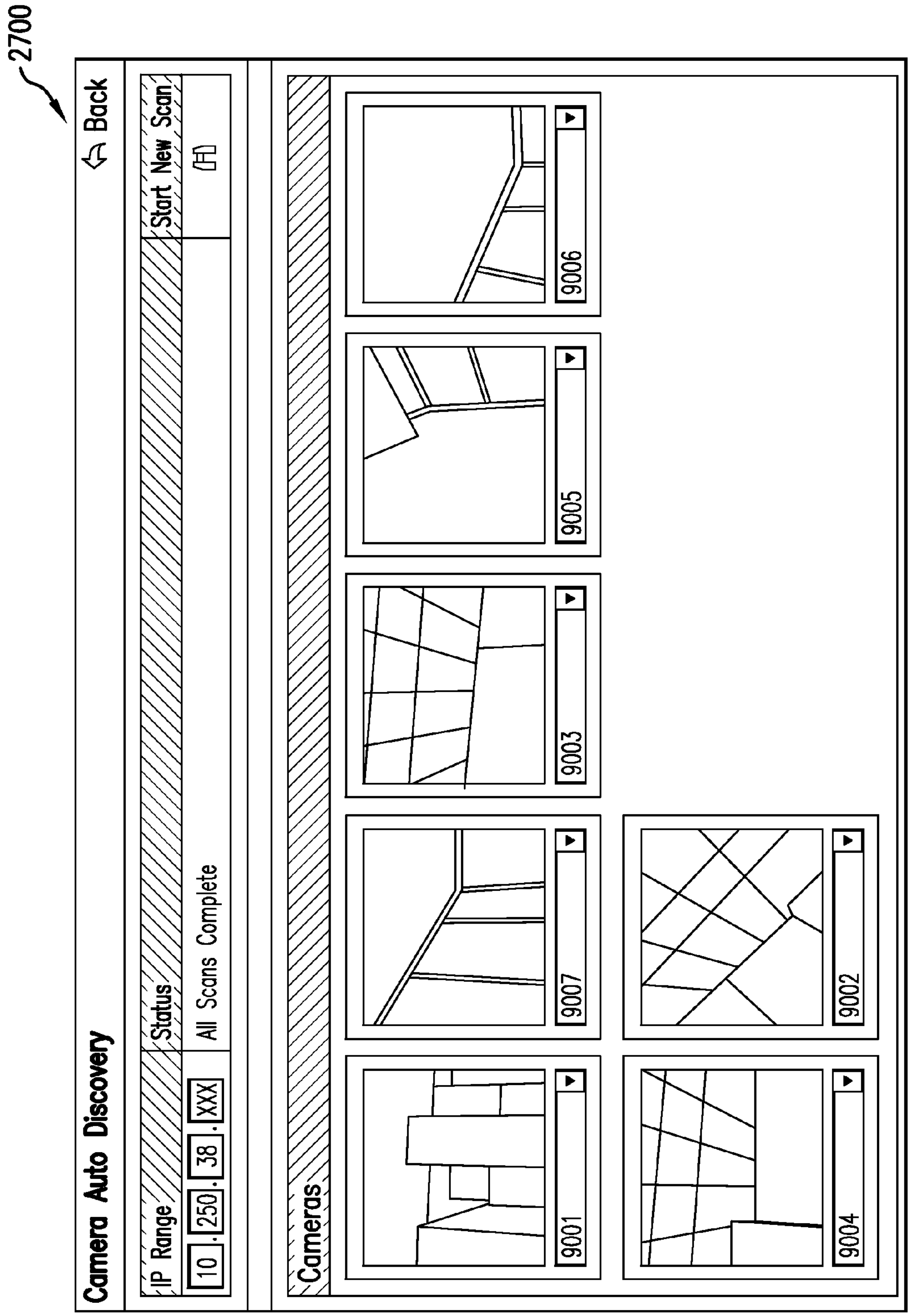
FIG. 27 illustrates an example camera automatic discovery screenshot displayable at a user interface console of a control center server controlling one or more banks of gaming machines in accordance with one or more embodiments.

Referring to FIG. 27, camera auto detection screen 2700 is shown which may be accessed by a user selection of Floor Admin from the main menu shown in FIG. 8 and Signs and Cameras from the resulting submenu. In order to reduce the amount of time and manual setup, by selecting an Auto Discovery option, a user may detect, display and configure information about one or more cameras on the network as follows:

1 Click Floor Admin, then under Signs & Cameras, click Cameras. The Camera Administration screen displays, listing all cameras in the system.

2 Click Auto Discovery. The Camera Auto Discovery screen displays, showing the view from every camera in the network and the player stations to which they are assigned. Any camera listed as Unassigned has not yet been associated with its player station in the TournEvent® system.

3 To scan the network for new cameras, click Start New Scan. The TournEvent® system scans its network for all cameras (the IP Range is set to a standard default setting and should not be changed).

4 To associate a camera with its player station, select the correct player station name from the drop-down menu under the camera view.

Referring to FIG. 28, gaming machine 103 is shown including interactive game feature 2801 and player dashboard 2803 in accordance with one or more embodiments. In the example embodiment, interactive game feature 2801 includes a randomly or pseudo-randomly initiated virtual balloon (that is, an interactive game graphic) displayed on primary display 115 in overlaying relation to a portion of the displayed primary game (the primary game in this case being a tournament game presentation) and a "POPIT!" message displayed along the lower portion of primary display 115. Responsive to the appearance of the virtual balloon, a player may press the area associated with the virtual balloon (in the case in which primary display 115 includes a pressure-sensitive display surface), and obtain bonus credits (or points) which may be displayed on a paid meter located on or about primary display 115, and added to a credit meter also located on or about primary display 115. Display 113 includes a display of the player's name and the leader board for the associated tournament (or competition), the time remaining for the event (which may be one of one or more heats associated with the tournament), and the player's position in the tournament (which may be highlighted on the leader board, e.g. as shown). Player dashboard 2803 may include a personalized display updated in real-time of the player's position, time remaining in the event, the player's score, and a picture-in-picture (PIP) 2804 of the player's video stream as captured by camera 401 (see FIGS. 4-5) at the player's gaming machine 103.

Alternatively to a pressure-sensitive display surface, a button on the button deck may be activated when the virtual balloon appears and the button may be illuminated to direct the player's attention to the button to press in order to obtain the additional credits. The button may additionally include a "POPIT!" inscription readable by the player.

During competitive play, such as during a tournament as depicted herein, a player is provided a predetermined amount of time to accumulate credits (or points) by playing the competition game as rapidly as the player is able, such as by repetitively pressing the "PLAY" button. The player that obtains the most credits wins first place, the player with the next most points wins second place, and so forth. Prizes or awards may be provided to the winning players according to their placement. Some competitive play may be provided in heats in which one or more winning players from each heat advance to a next heat and so forth until a final heat is conducted with the qualifying players.

Credits may be conventionally awarded according to a paytable; additionally, bonus credits may be accrued by the random appearance of interactive game feature 2801, such as the display of one or more virtual balloons with which the player may interact by 'popping' the balloons while the balloons are displayed. The 'popping' interaction may occur by the player pressing a pressure-sensitive display in the area of the displayed balloon or pressing an activated "POPIT!" button on the player's button deck.

In one or more examples, a balloon may initially appear in one area of primary display and appear to float to another area and/or grow from one size to another size. Additionally, while the credit value for popping the balloon may be a fixed amount for each balloon, the amount payable for popping the balloon may vary depending upon the balloon. For example, one balloon may have a value of ten credits, while another balloon may have a value of twenty credits. When popped the value of the balloon may be credited to the player's credit meter at the gaming machine 103. In one or more embodiments, the award amount for a balloon may be a pre-determined amount which may be reduced from the time the balloon appears until the balloon is ultimately 'popped' by the player. For example, an initial award associated with the appearance of a balloon may be ten credits, and the award amount may drop by one credit each second until either popped (e.g. if the balloon is popped after one second passes and prior to two seconds passing, the award to the player may be nine credits) or after ten seconds the balloon disappears from view if not popped (in which case, the balloon may either appear to float out of the display area or vanish from the display). In one or more cases, multiple balloons may be displayed simultaneously and each balloon may appear for different periods of time as well as have different associated award values.

In one or more embodiments, one or more bonus games may be randomly or pseudo-randomly triggered, such as by an RNG executed by the game processor or by the appearance of one or more bonus-activating symbols during play of the primary game (which may be a tournament game). In some embodiments the trigger may be generated at a location remote from the given gaming machine (such as at a tournament controller implemented through control center server 101 in FIG. 1 for example) and communicated to one or more gaming machines in the gaming system. Example bonus games may be a reel-based or table-style game. During tournament or competitive play, the bonus game may: a) be displayed, such as on a side panel of primary display 115 or top box display 113, b) play one or more game sequences simultaneously with continued play of the primary (tournament) game by the player, and c) award bonus credits in accordance with a bonus game paytable and in addition to primary (tournament) game awards. The bonus game may or may not include player interactive features 2801, such as described above with the virtual balloon interactive bonus feature. Also, the bonus game, either interactive or non-interactive, may award credits separately from credits awarded for play of the tournament game. Thus the credits awarded for a bonus game may not affect the player's score for a given tournament during which the bonus game was conducted.

Other examples of interactive or non-interactive bonus game features may include the display of an animated wheel. The wheel may include various awards that may potentially be awarded depending upon the location of the wheel and a selector or indicator when stopped. In a non-interactive wheel-based bonus game, the wheel may be spun and stopped by the game processor in accordance with an RNG. In the case of a wheel-based bonus game provided as an interactive game feature, the player may either press the wheel to cause it to stop or press a designated button on the player's button deck. In the interactive case, the award may be skill-based. In the event that it is desired to reduce or eliminate skill as a variable in obtaining an award, then the award obtained through the wheel may be increased, such as with a surprise bonus award (e.g. a special exploding balloon or package bonus) which when totaled with the wheel-based award achieves a value pre-determined by an RNG or within a pre-determined percentage of the RNG-based value. The pre-determined percentage being the percentage variability permitted based on skill, for example, ten percent.

Another example bonus game may include the display of an animated character or object which represents an interactive game graphic (e.g. a person, animal, or item); for example, a frog or rabbit which may hop across the primary display and which the player may select (or capture) as by pressing the area of the pressure-sensitive display where the animated character is displayed or by pressing an activated button associated with the animated character. By selecting the animated character, the player may obtain bonus credits in addition to any award obtained based on the primary game.

In one or more alternative embodiments, competitive play may be conducted through individually timed trials, heats, or entries wherein each player may play at different times and post a score to compete against other players who may be provided the opportunity to play during a selected period of time, such as over the course of a morning, afternoon, evening, day, weekend, week, month, etcetera. Such competitive play may be conducted in-revenue or out-of-revenue, and may be initiated such as by a player electing to play a tournament that may be offered on a display menu. In the case of an in-revenue competition, there may or may not be an additional entry fee required. Once a competition is selected by a player at gaming machine 103, the leader board may be displayed on display 113 and player dashboard 2803 may be displayed on display 115.

One or more example embodiments may enable a player to qualify for a tournament at any time. For instance:

Step one: player is playing an in-revenue spinning reels games.

Step two: the player is prompted to participate in a slot tournament or the player can select a button on the machine to indicate they want to participate. Prompting may occur from a network server (e.g. tournament server or controller, such as described herein) programmed to receive game play information and to send a message to be displayed at respective gaming machines according to one or more criterion (such as, player card inserted, game play activity identified or player tracking information). Alternatively, each participating gaming machine may include programming executed by a processor (such as the game processor or player tracking controller, e.g. Bally iView™ controller or display manager) to display a menu (such as, when a player card is inserted or when gaming activity occurs) including a tournament option that when selected by a player initiates a request from the gaming machine to a tournament controller which may respond as to the availability of and information about one or more tournaments in which the player may participate.

Step Three: a pop-up message shows up on the primary game where the player sees the tournament rules, how much it costs to play, and the prizes, and has to "accept" in order to play.

Step Four: The player pays $5 worth of credits to participate and then the game goes out of revenue into the tournament play.

Step Five: The player plays as many games as they can and wins as much as they can in 2 minutes.

Step Six: If the player wins a certain number of points during the tournament they win an instant cash prize.

Step Seven: If the player gets enough points they qualify for a "live" tournament at the end of the day or week or month.

Another embodiment includes enabling the player to be paid based on what place they finish and there are fixed prizes for what place they finish in. For example, the player is playing on their own and they get 100,000 points in tournament play which is equal to $9^{th}$ place and pays $25. First place could be a progressive. Thus the player is playing against established positions versus other players. For example, a player with a player card may play and earn a place in the tournament; after the tournament concludes, credits may be applied to the player account which may be accessed when the player returns to play or goes to a cage at the casino, provides identification and requests the credits to be cashed out. In some tournaments or competitions, the credits may be non-cashable so the player may only be able to obtain a non-cashable credit coupon. In the non-cashable credit coupon case, the credits may only be available for play on a gaming machine or possibly for other purchases or table wagering within the casino operator's premises.

The payments for any of the tournament or competition embodiments may be made from a percentage of coin-in from all the games or gaming machines (or all the eligible games or gaming machines eligible to participate in the tournament, competition, or qualifying) on the system. Alternatively, a casino operator or competition/tournament sponsor may fully fund a winnings pool from which winners may be paid; in which case, if entry fees are collected, they may be used to defray a tournament cost or potentially make the tournament profitable. Another alternative, the operator or sponsor may seed a pool (e.g. $10,000) and entry fees may be used to increase the pool from which winners may be paid; or the pool may simply be built with entry fees and/or a percentage or function of coin-in, coin-out or handle.

At any time during respective competition periods, tournament (or competition) leader boards may be posted for respective tournaments on one or more overhead displays or display panels which may be positioned at various locations, such as against a wall or near a player service center at one or more gaming facilities. Other locations where leader boards may be posted may include commercial websites, such as a gaming facility's website (e.g. Harrah's, Boyd Gaming, MGM, Wynn) or social network websites (e.g. Facebook®, Twitter®, You Tube®). Gaming operators may set up web pages on its website for its players or for the general public, may enter tournament information and updates, may enable tournament information (such as leader boards, remaining time for tournament participation, beginning times for upcoming tournaments, etc.) to be accessed by registered players and/or the general public, and may enable users (e.g. players or visitors) to establish user accounts and to use their accounts for various purposes (such as: to sign up for a tournament, to play a game or tournament online, to reserve a designated gaming machine at a facility at a specified time, or to receive tournament updates by voicemail, text and/or email to a telephone (e.g. a cell phone or land line), a personal computer, or, a voicemail, email, or text (e.g. SMS) account).

In cases when a player elects to sign up for a tournament, play a game or tournament online, or reserve a designated gaming machine, a fee may or may not be required to be paid. In cases when a fee is required, a user may use a credit card or player account to pay the associated fee. For example, a player may accrue player points in a player account that may be redeemable to use to pay a tournament fee. In the case when a player reserves a designated gaming machine at a pre-specified time, the operator may enable its server network to transmit information to the designated gaming machine that may disable the gaming machine until the player's card is entered into the card reader on the designated gaming machine or until a predetermined amount of time has passed, such as fifteen minutes. At the end of the predetermined time, the gaming machine may be re-enabled and the player may or may not forfeit a reservation fee. If the player enters the player's card into the card reader within the predetermined time period, a reservation fee paid at the time of making the reservation may or may not be credited to the credit meter or player account. If the reservation fee or a portion thereof is either added to the credit meter or the player's account, the credits may be redeemable for cash or may be used for play only.

In one or more embodiments, competitive play may be initiated on a conventionally provided primary game or a game specific to the competition (depending upon the competition rules), which may be stored onboard or remote to, executed by, and/or transmitted to gaming machine 103 in a similar manner as described herein.

Figure 29A:
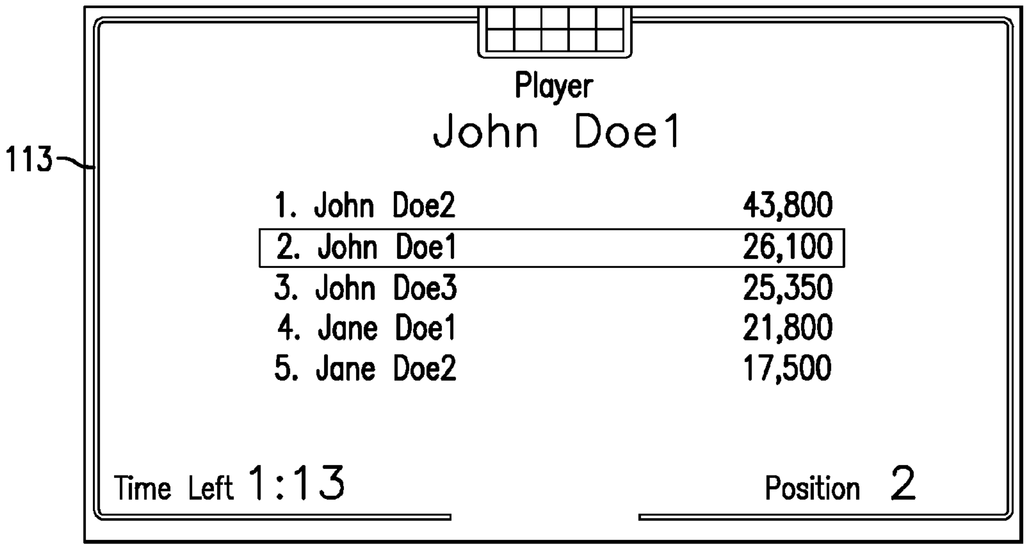
FIG. 29A illustrates the front view of a top box display of the gaming machine of FIG. 28 in tournament (in-revenue or out-of-revenue) mode in accordance with one or more embodiments.

FIG. 29A shows a close-up view of display 113 of gaming machine 103 in tournament (in-revenue or out-of-revenue) mode in accordance with one or more embodiments. As shown, display 113 includes a display of the player's name, the leader board for the event, the time remaining in the event, and the player's position.

Figure 29B:
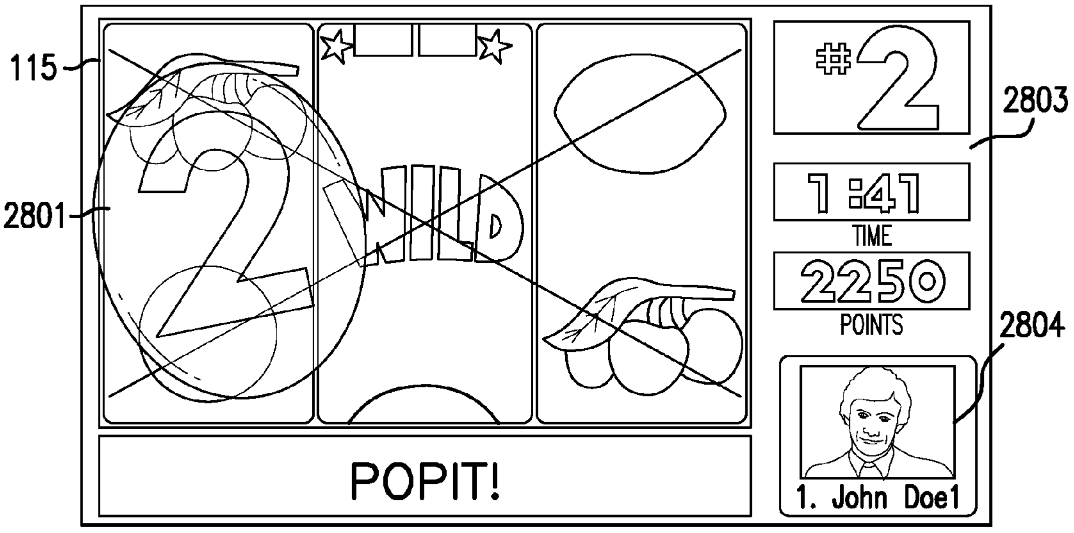
FIG. 29B illustrates the front view of a primary game display of the gaming machine of FIG. 28 including a player dashboard and interactive game feature in accordance with one or more embodiments.

FIG. 29B shows a close-up view of display 115 of gaming machine 103 in tournament (in-revenue or out-of-revenue) mode in accordance with one or more embodiments. As shown, display 115 may include a display of player dashboard 2803 and interactive game feature 2801 as well as the primary game. As shown, player dashboard 2803 may include a display of the player's position, the time remaining for the event, the player's score, and a PIP 2804 of the player as captured by camera 401 of the player's gaming machine 103. In the event that the tournament includes other players playing simultaneously, the PIP 2804 may be programmed to rotate through and present the captured video images of each of the other players; in which case, the video streams of the respective players may be transmitted over the network connecting the respective gaming machines 103 participating in the tournament and each of the game processors may be programmed to periodically rotate its own video feed and the video feed from each of the respective gaming machines 103, so that real-time video feed of each participating players is periodically displayed on each player dashboard 2803. If desired, the programming may be set so that at a given gaming machine 103, the video feed displayed on the PIP 2804 is limited to a rotation of the video feed of the respective player and that of the players on the leader board.

Player dashboard 2803 may also include a message area wherein special wins (or prizes) and system communications to the player may be displayed, e.g. notification of player position changes or a message for the player to take some action. Player dashboard 2803 may be modifiable to display one or more custom designs associated with one or more tournament game themes. In addition during tournament mode, reels on display 115 may be enlarged and on-screen buttons which don't pertain to tournaments may be removed (i.e. select lines, bet per line, help, etc.). Additionally, the background color of player dashboard 2803 and top box 113 may change colors throughout the tournament when a player's position changes. For example, the following background colors and positions may be associated as follows: $1^{st}$ place is red, $2^{nd}$ place is green, $3^{rd}$ place is purple and all other positions are blue. As background colors change in real-time, participants and spectators may easily note position changes. The color associated with a respective player and the player's gaming machine may also be displayed on overhead display 111 together with the player's image, fixed or video, and position in a given tournament; for example the position and/or image may be displayed on overhead display 111 with the same background color as is displayed at one or more locations of the player's gaming machine 103.

In some implementations, gaming machine 103 may be configured to give the player certain control over the graphics displayed on display 115, and/or top box display 113. For example, gaming machine 103 may be configured so that the player may resize player dashboard 2803 and/or the game presentation area to the left showing the three reel facsimiles. In one implementation, display 115 is a touch sensitive display and a player may compress player dashboard 2803 to take up less area on the display by simply touching the area of the player dashboard or a designated control on the player dashboard (a designated control not shown in the figures). Alternatively, a player may compress or expand the game presentation area by touching some point in that area of display 115. It will be appreciated that any number of conventional controls may be included with gaming machine 103 to facilitate either compressing or expanding player dashboard 2803 and/or compressing or expanding the game presentation area shown to the left of player dashboard 2803 in the figures.

Figure 30:
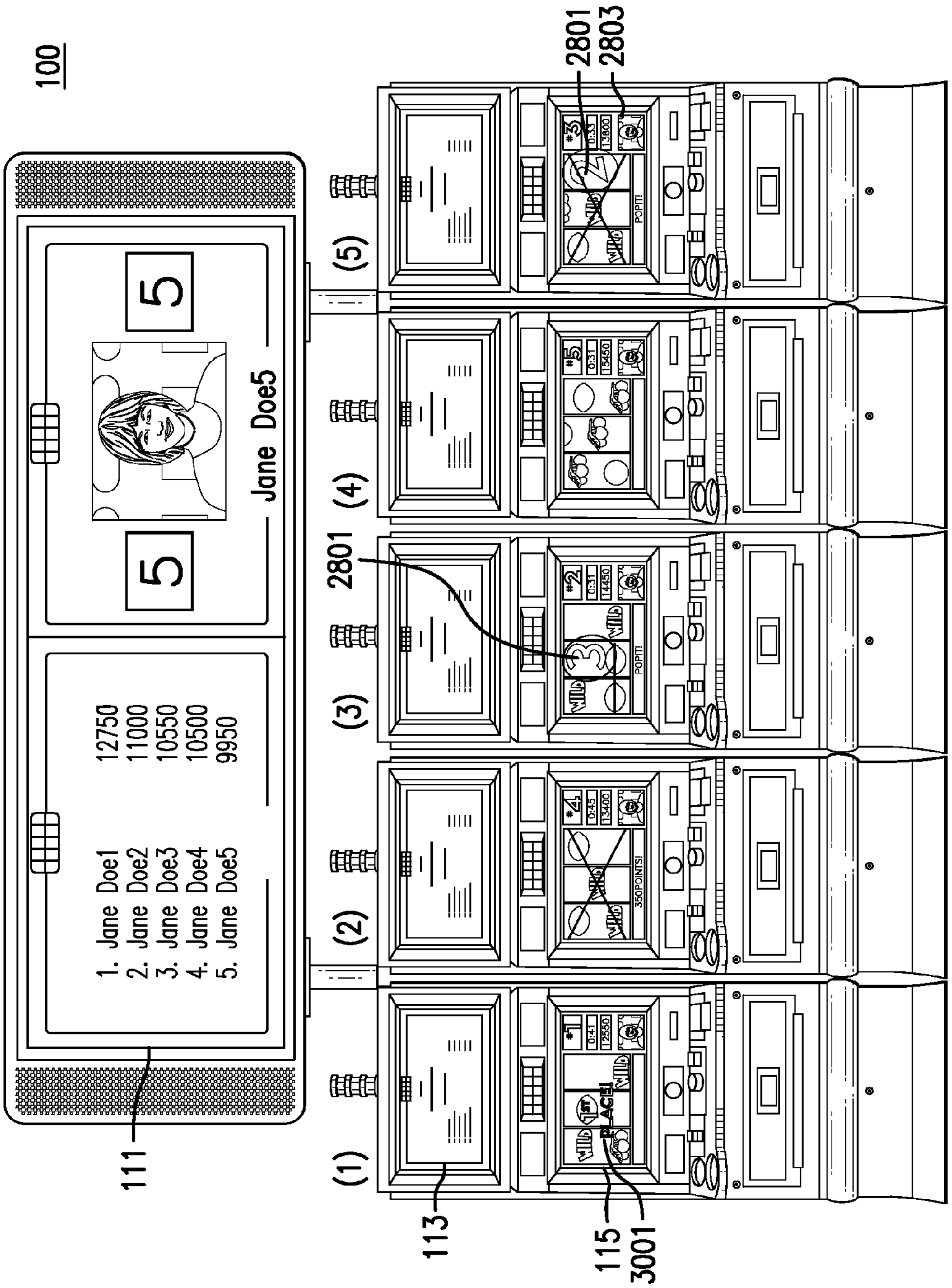
FIG. 30 illustrates a convertible gaming system including an overhead display operating in tournament (in-revenue or out-of-revenue) mode wherein player dashboards are displayed on each gaming machine in accordance with one or more embodiments. Additionally, player interactive features are shown displayed on the primary display of gaming machines (3) and (5) of the bank, and a display overlay is shown on the primary display of gaming machine (1) indicating that the respective player is atop the leader board.

Referring to FIG. 30, convertible gaming system 100 is shown with overhead display 111 and a bank of gaming machines 103 operating in tournament (in-revenue or out-of-revenue) mode wherein player dashboards 2803 are displayed on each gaming machine 103 in accordance with one or more embodiments. In the arrangement shown in FIG. 30, control center server may be implemented within one of gaming machines 103 on the bank, remotely through a server connected over a network to gaming machines 103 and overhead display 111, or as shown in FIG. 1 at reference number 101, as described above. Additionally, example player interactive features 2801 are shown displayed on primary display 115 of gaming machines 103 (third and fifth from the left) of the bank; and, display overlay 3001("1st Place!") is shown on primary display 115 of the left most gaming machine 103 indicating that the respective player is atop the leader board (displayed both on overhead display 111 and displays 113 of gaming machines 103 on the bank).

Figure 31:
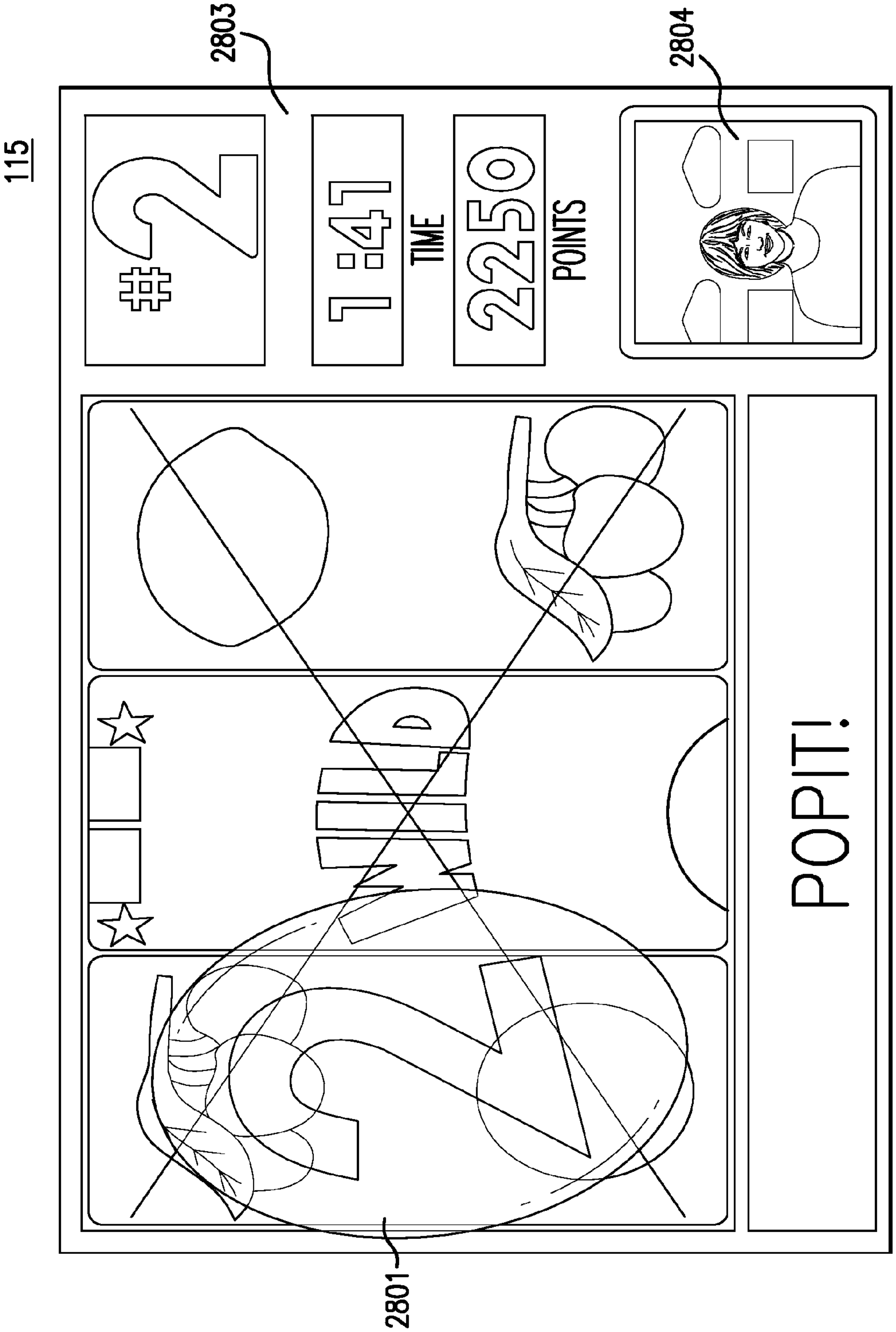
FIG. 31 illustrates a close-in view of the primary display of gaming machine (3) of the convertible gaming system shown in FIG. 30 wherein the player dashboard and player interactive feature are shown.

FIG. 31 is a close-in view of primary display 115 of the third gaming machine 103 of the convertible gaming system shown in FIG. 30 (that is, the third from the left in FIG. 30) wherein player dashboard 2803 and example player interactive feature 2801 are shown.

Figure 32:
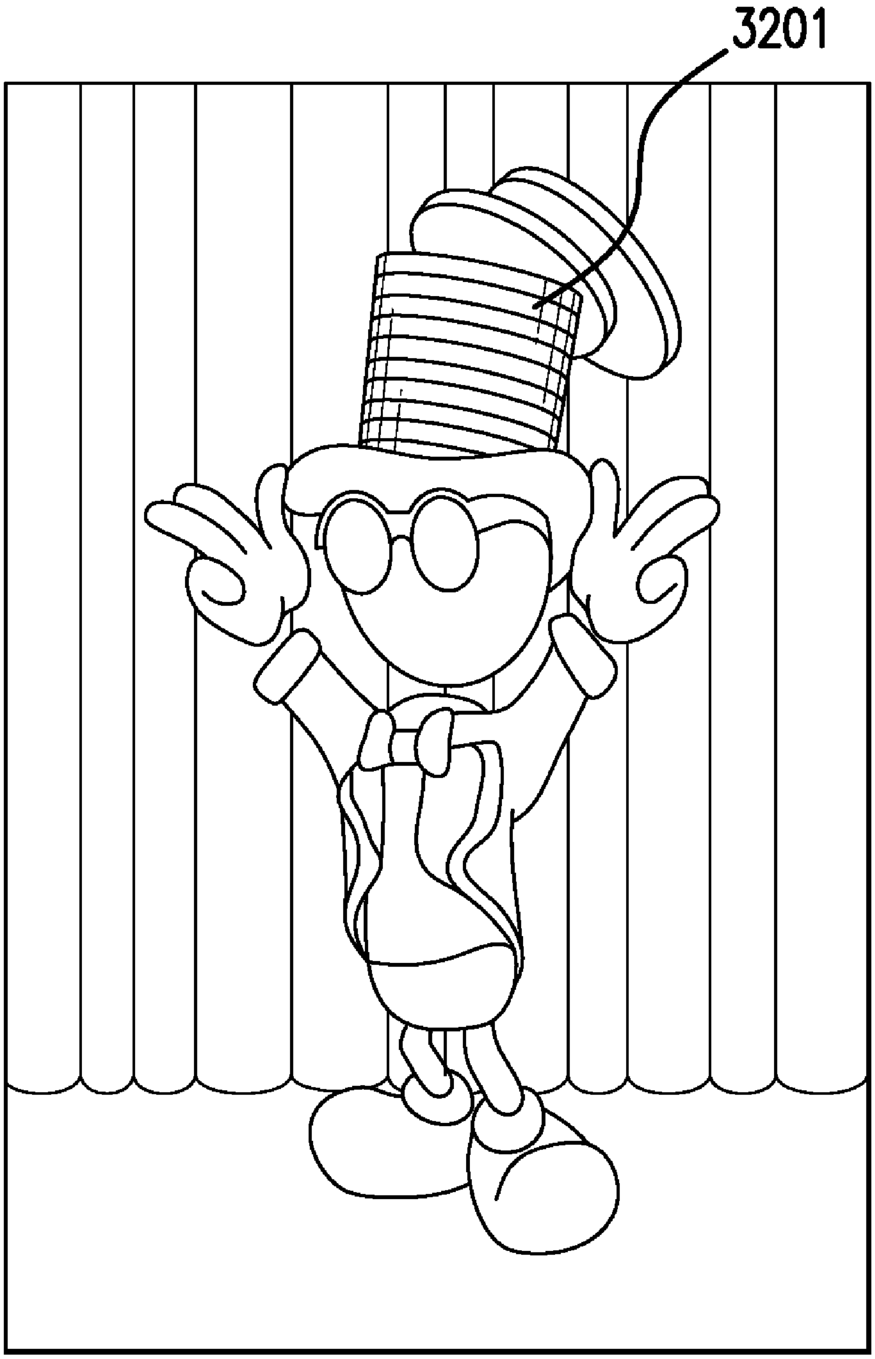
FIG. 32 illustrates a virtual emcee which may be displayed on an overhead and/or gaming machine display whereon the emcee may announce the beginning and/or end of an out-of-revenue event and/or announce the winner of the event in accordance with one or more embodiments.

Referring to FIG. 32, virtual emcee 3201 is shown which may be displayed on overhead display 111 or one or more of the displays on gaming machine 103, (such as display 113 or 115). Emcee 3201 may announce the beginning and/or end of an out-of-revenue event. Emcee 3201 may also announce the winner and participate as part of a celebration presentation on one or more displays associated with the event. Additionally, emcee 3201 may be programmed to respond and announce (through audio/visual devices, e.g. overhead display 111 including speakers) various aspects of the tournament, such as leader changes as they occur in real-time, a countdown as the tournament begins and ends, commentaries during the course of the tournament, and congratulatory announcements of the winners. For example, when Player B passes Player A and moves into first place, the server may provide the information so that emcee 3201 may announce with excitement on overhead display 111: "Player B has just passed Player A and moved into first place"; while on Player A's dashboard 2803, emcee 3201 may be programmed to give an encouraging message: "Keep trying Player A, you can do it." and on Player B's dashboard 2803, emcee 3201 may be programmed to give a congratulatory message: "Way to go Player B, keep up the good work." In the programmed messages, the names of Players A and B may be inserted into the respective messages to personalize the messages.

Figure 33A:
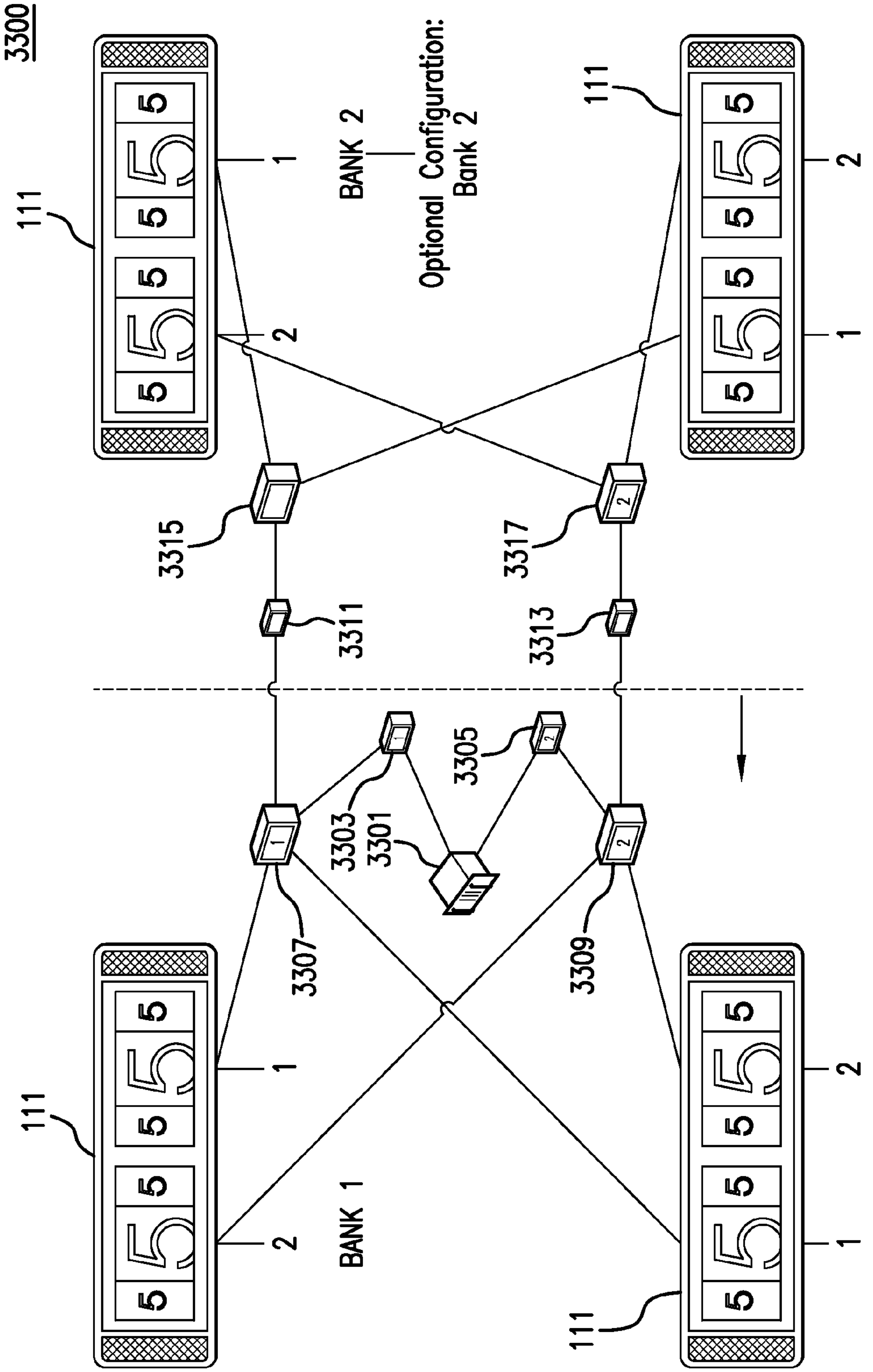
FIG. 33A illustrates an example network configuration of a convertible in-revenue/out-of-revenue server controlled system with one or more banks of gaming machines in accordance with one or more embodiments.

FIG. 33A shows an example convertible in-revenue/out-of-revenue network 3300 with SIGN server 3301 connecting to two overhead displays 111 (and optionally additional pairs of overhead displays 111) associated with one or more banks of gaming machines 103 in accordance with one or more embodiments.

As network 3300 is configured in the figure, pairs of overhead displays 111 may be installed back-to-back and fixed between a set of back-to-back gaming machines 103 (which may be referred to as a bank); for example, system 100 as shown in FIG. 3 illustrates a back-to-back bank of gaming machines 103 with a pair of back-to-back overhead displays 111 which network 3300 may control.

Each overhead display 111 includes two separate display areas (1) and (2) which may display different content. In tournament mode display area (1) may display a leader board (as shown in FIG. 30) and display area (2) may display a live player video feed with position information corresponding to the leader board. To synchronize the display of content in the display areas (1) and (2) of the respective overhead displays 111 and synchronize the display of content on both overhead displays 111, sign server 3301 may receive real-time tournament information including leader board and player video feed data and configure data for synchronized display in display areas (1), (2), and transmit the display data in parallel to both overhead displays 111. In the example approach shown in FIG. 33, to effect synchronous communication and display of dual display areas of back-to-back overhead displays 111, sign server 3301 may connect in parallel to VGA-to-HDMI converters 3303, 3305 with substantially identical connecting lines (i.e. line type and length) and simultaneously carry communications with VGA content for respective display areas (1), (2). VGA-to-HDMI converters 3303, 3305 connect to respective HDMI splitters 3307, 3309 with substantially identical connecting lines and simultaneously carry communications with HDMI content. HDMI splitters 3307, 3309 may simultaneously transfer HDMI content to respective display areas (1), (2) of both overhead displays 111 through substantially identical connecting lines.

Additional banks and overhead displays may similarly be connected and receive transmitted display content from SIGN server 3301. In the example shown, a second bank of gaming machines 103 and overhead displays 111 are connected to SIGN server 3301 enabling the second bank to participate in a given tournament with the first bank and to receive simultaneous content at the dual display areas of the associated back to back overhead displays 111. In this example configuration, HDMI splitters 3307, 3309 connect to HDMI boosters 3311, 3313, respectively, through substantially identical communication lines to carry the HDMI content simultaneously being transmitted to the first bank's overhead displays 111. HDMI boosters 3311, 3313 connect to HDMI splitters 3315, 3317 through substantially identical communication lines which in turn split the HDMI content and transfer the HDMI content through substantially identical communication lines and for display in the respective display areas (1), (2) of both overhead displays 111 associated with the second bank. In an alternate embodiment, HDMI communication may be effected by splitting additional lines from converters 3303, 3305 and through boosters 3311, 3313, splitters 3315, 3317 to respective overhead displays 111 of the second bank. In another alternate embodiment, SIGN server 3301 may incorporate a VGA-to-HDMI converter (and wireless transmitter (or transceiver) and each overhead display 111 (or at least each back-to-back pair) may include a corresponding wireless receiver (or transceiver) for receiving display content for the respective display areas (1), (2) of each overhead display. (See for example the alternative connections for network 3300 in FIGS. 33B and 33C).

Network 3300 enables control of the output, timing and content display on overhead displays 111 to be managed through server 3301, which may be implemented as part of convertible server 101 and its associated programming as described herein. Through execution of its coding, server 3301 may maintain synchronous display of content on overhead displays 111 and associated displays of gaming machines 103 during out-of-revenue or in-revenue competition or tournament operation, monitor and provide selected content during in-revenue operation, and manage transitions between in-revenue and out-of-revenue operations. The overhead displays 111 (and/or displays 113 of associated gaming machines) may have content driven from SIGN server 3301 during various states including:

a) Conventional In-Revenue state—Marketing displays of associated gaming machines including video movie detailing game features and content.

b) Tournament/Competition Transition state—Notice are displayed that a tournament is about to begin. Gaming machines are transitioned from In-Revenue to Out-of-Revenue. Player's names are displayed above respective gaming machines assigned to each player. Notices are displayed for players to take their positions.

c) Tournament Session state—
- Countdown is displayed for tournament start−10, 9, 8, 7, 6, 5, 4, 3, 2, 1, GO!
- Player leader board is real-time displayed in display area (2) while tournament is in progress.
- Player video feed is real-time displayed in display area (1) on a rotating basis for $1^{st}$ through $n^{th}$ players.
- Countdown is displayed for tournament finish—10, 9, 8, 7, 6, 5, 4, 3, 2, 1, STOP! Optional Sub-States:
  - Show session winners—Display leader board (display area (2)) after tournament session is completed and video segment of winners (display area (1)).
  - Replay session—Reset all tournament information at associated EGMs and tournament controller so that session/round can be replayed. Display notice that tournament session/round will be replayed. Re-initiate Tournament Session state.

d) Out-of-revenue transition state—Display In Revenue Marketing display describe above, EGMs transition back to in-revenue operation.

Figure 33B:
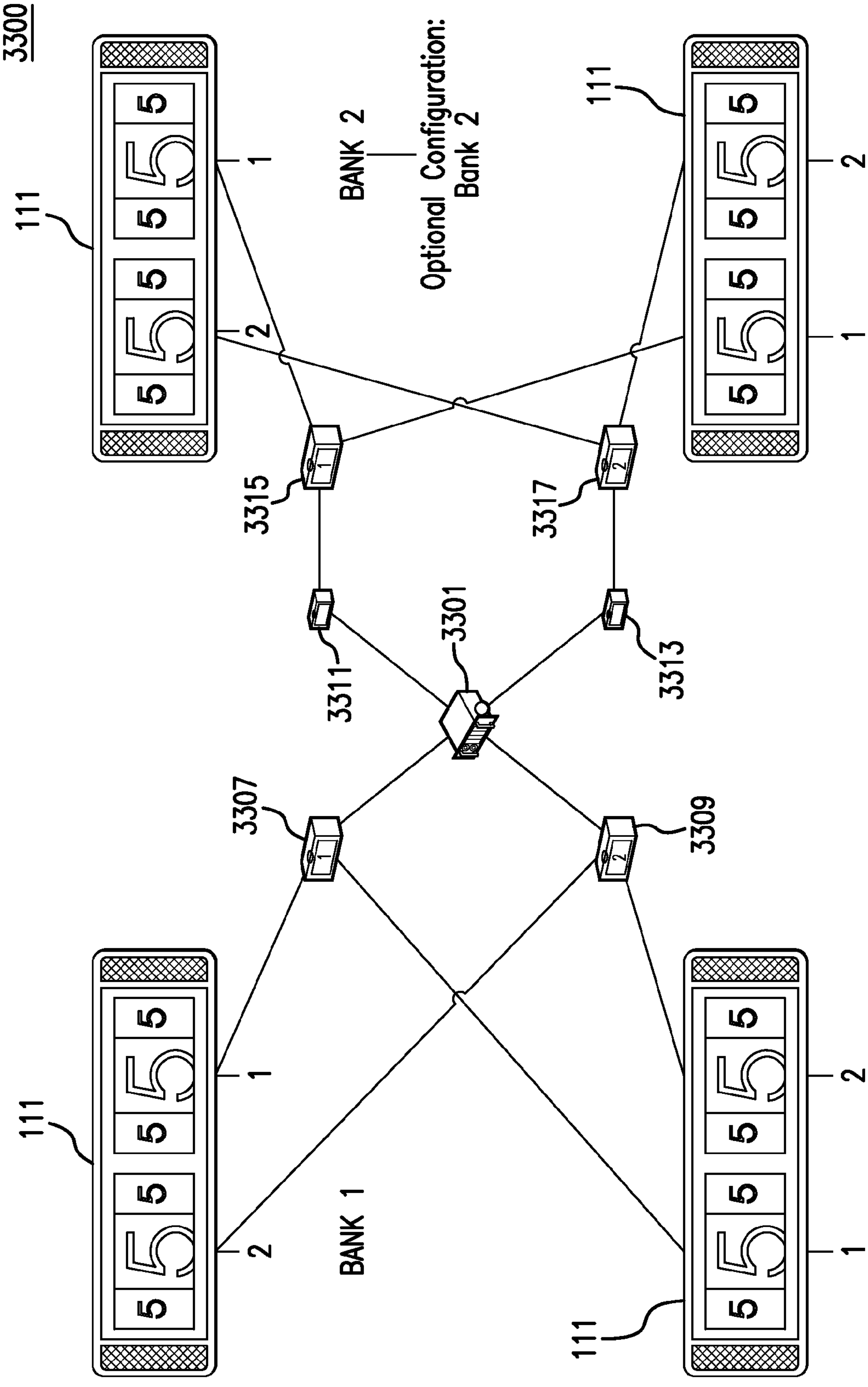
FIG. 33B illustrates another example network configuration of a convertible in-revenue/out-of-revenue server controlled system with one or more banks of gaming machines in accordance with one or more embodiments.

Referring to FIG. 33B, alternative example network configuration 3300 of convertible in-revenue/out-of-revenue server controlled system 100 with one or more banks of gaming machines 103 is shown in accordance with one or more embodiments. In this example, SIGN server 3301 may be implemented with an iBase sign server to transmit HDMI display information through HDMI splitters 3307, 3309 to overhead displays 111 as previously described. In this case, VGA-to-HDMI converter is eliminated (or its functionality essentially incorporated within SIGN server 3301. In the case of a second or more banks, HDMI boosters 3311, 3313 connect directly to SIGN server 3301 and then to splitters 3315, 3317 which in turn connect to corresponding overhead displays 111.

Figure 33C:
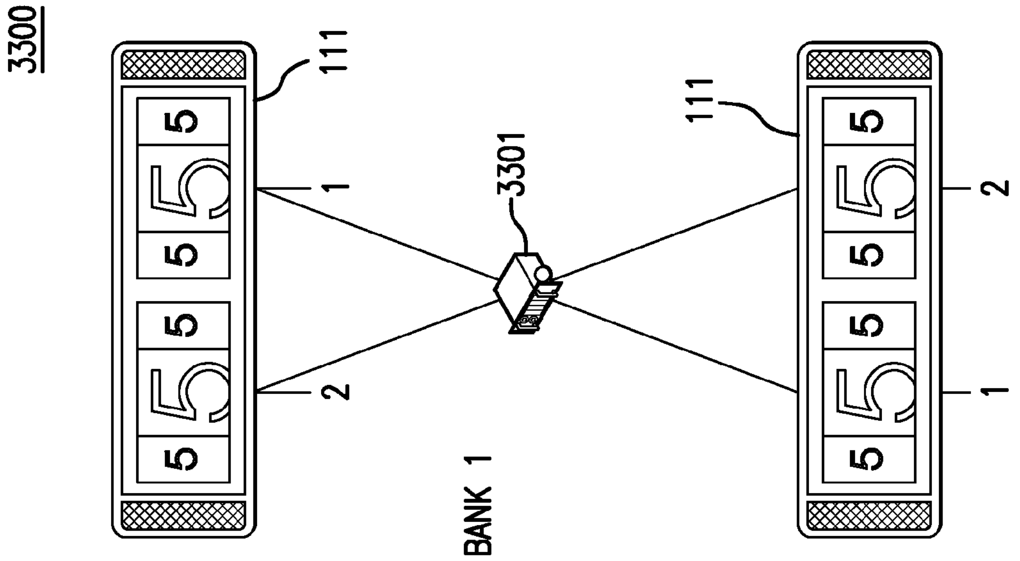
FIG. 33C illustrates another example network configuration of a convertible in-revenue/out-of-revenue server controlled system with a bank of gaming machines in accordance with one or more embodiments.

Referring to FIG. 33C, alternative example network configuration 3300 of convertible in-revenue/out-of-revenue server controlled system 100 with one bank of gaming machines 103 is shown in accordance with one or more embodiments. In this example, SIGN server 3301 may be implemented with an iBase sign server to transmit HDMI display information directly to overhead displays 111 as previously described. In this case, iBase sign server 3301 incorporates the splitting function of HDMI splitters 3307, 3309. While FIG. 33C shows only a one bank configuration, network configuration 3300 of FIG. 33C may also be configured to incorporate multiple banks of gaming machines 103 in a similar manner as shown in FIG. 33A, 33B.

As previously referenced, the hard-wire connections of SIGN server 3301 to overhead displays 111 may be eliminated by implementing wireless transceivers for communication between SIGN server 3301 and overhead displays 111. Additionally, the functionality of SIGN server 3301 may be incorporated within control center server 101 to eliminate SIGN server 3301 as a separate hardware and software component.

Figure 34A:
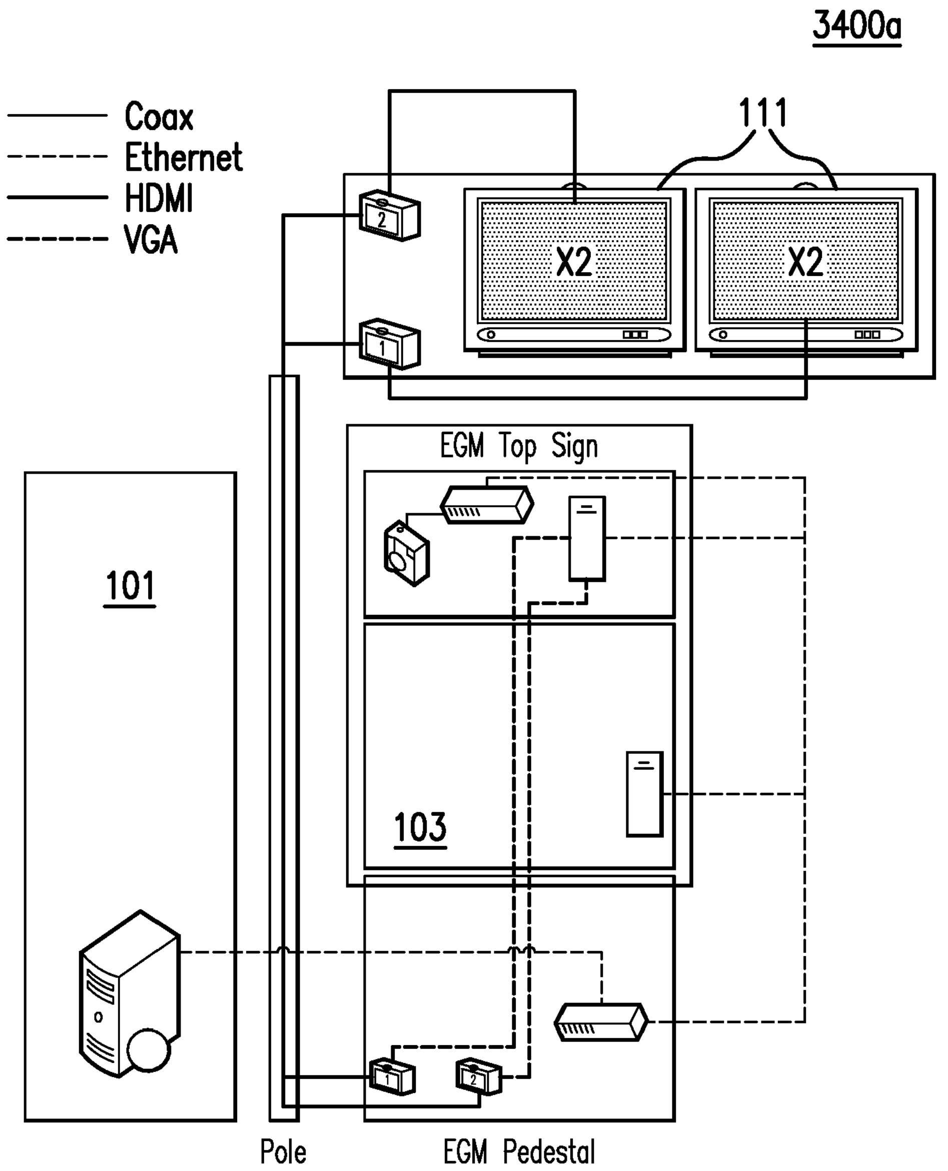
FIG. 34A illustrates an example wiring diagram of a convertible in-revenue/out-of-revenue server controlled system with one or more banks of gaming machines in accordance with one or more embodiments.
Figure 34B:
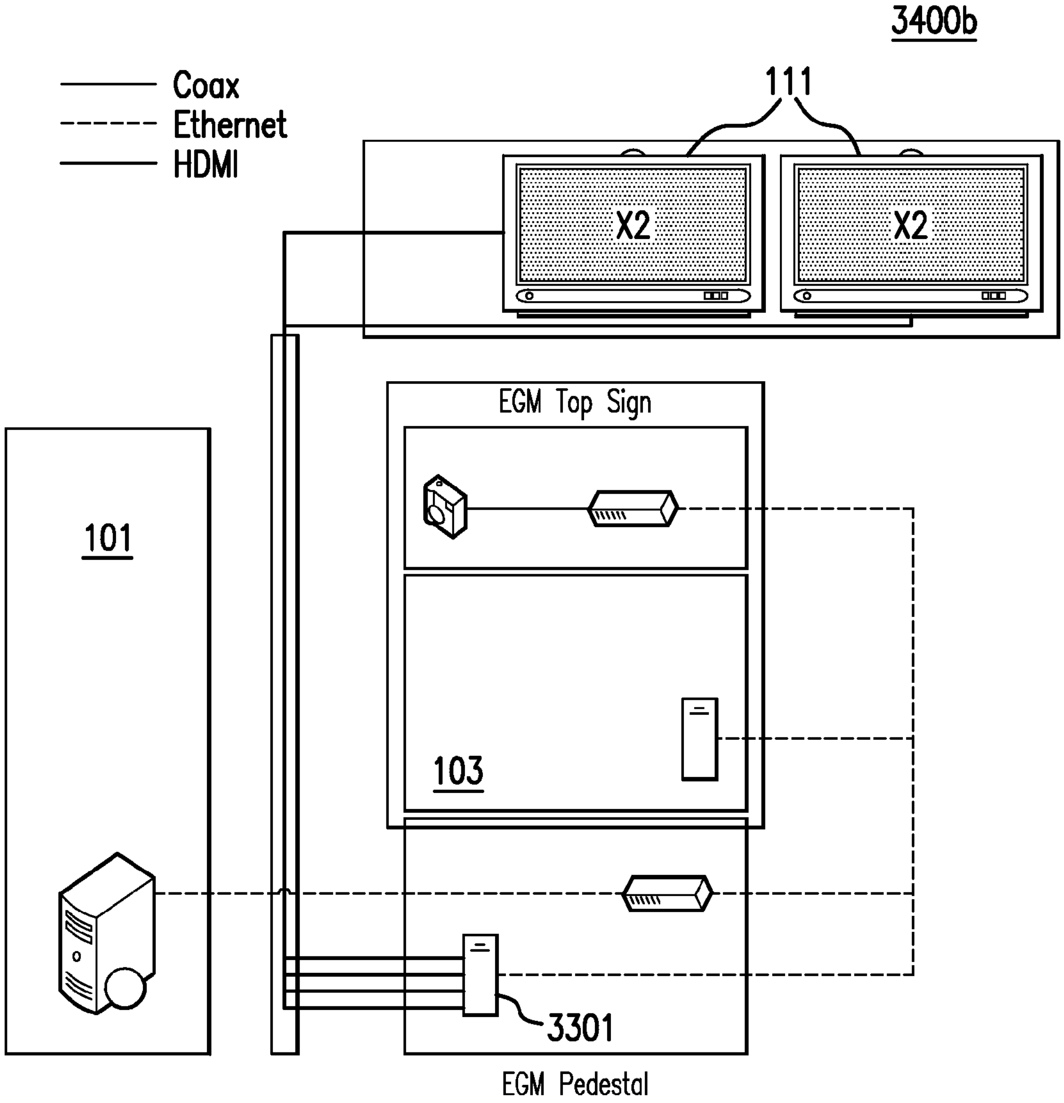
FIG. 34B illustrates another example wiring diagram of a convertible in-revenue/out-of-revenue server controlled system with one or more banks of gaming machines in accordance with one or more embodiments.

FIGS. 34A and 34B each show an example wiring diagram 3400*a* and 3400*b*, respectively, with convertible in-revenue/out-of-revenue controller ('TournEvent® Server'), that is, control center server 101 controlling the operational state of one or more banks of gaming machines 103 (one gaming machine is shown by example) and content display of overhead display 111 and respective displays ('EGM Top Sign') of gaming machines 103 in accordance with one or more embodiments. FIG. 34A illustrates a configuration corresponding to FIG. 33A. FIG. 34B illustrates a configuration corresponding to FIG. 33C for both a single bank system.

Each video feed may be generated from operation of a decentralized IP camera. By using decentralized IP cameras, each may be added to a respective gaming machine 103 without changes to the respective gaming machine software. Additionally, the IP cameras and supporting electronics may be connected to and communicate over existing/required Ethernet cabling connecting respective gaming machine 103, overhead display 111, and control center server 101, to enable live video feed transmission and display on connected displays, such as overhead display 111 or selected of displays 113, 115. Operating as the gatekeeper, control center server 101 may control the flow of information and coordinate the display of each video feed on overhead display 111 and/or respective of displays 113 or 115. Sign server 3301 as shown may also be employed to offload processing power from the control center in-revenue/out-of-revenue ('TournEvent® Server') control center server 101 by acting as the conduit for the decentralized IP cameras data flow and display driver for overhead display 111.

Figure 35:
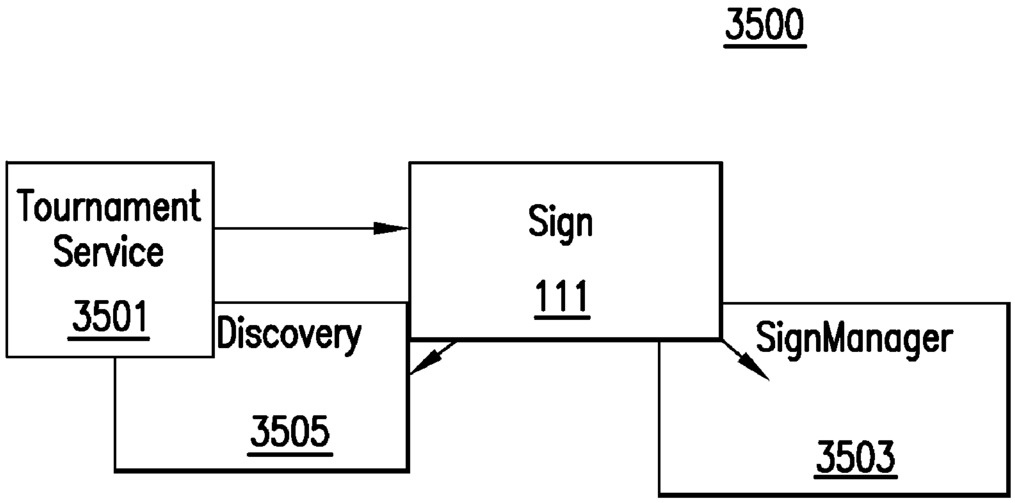
FIG. 35 illustrates an example overhead display communication network in accordance with one or more embodiments wherein one or more displays may receive communications from a tournament service, a sign (display) manager service, and a network address discovery service in accordance with one or more embodiments.
Figure 36:
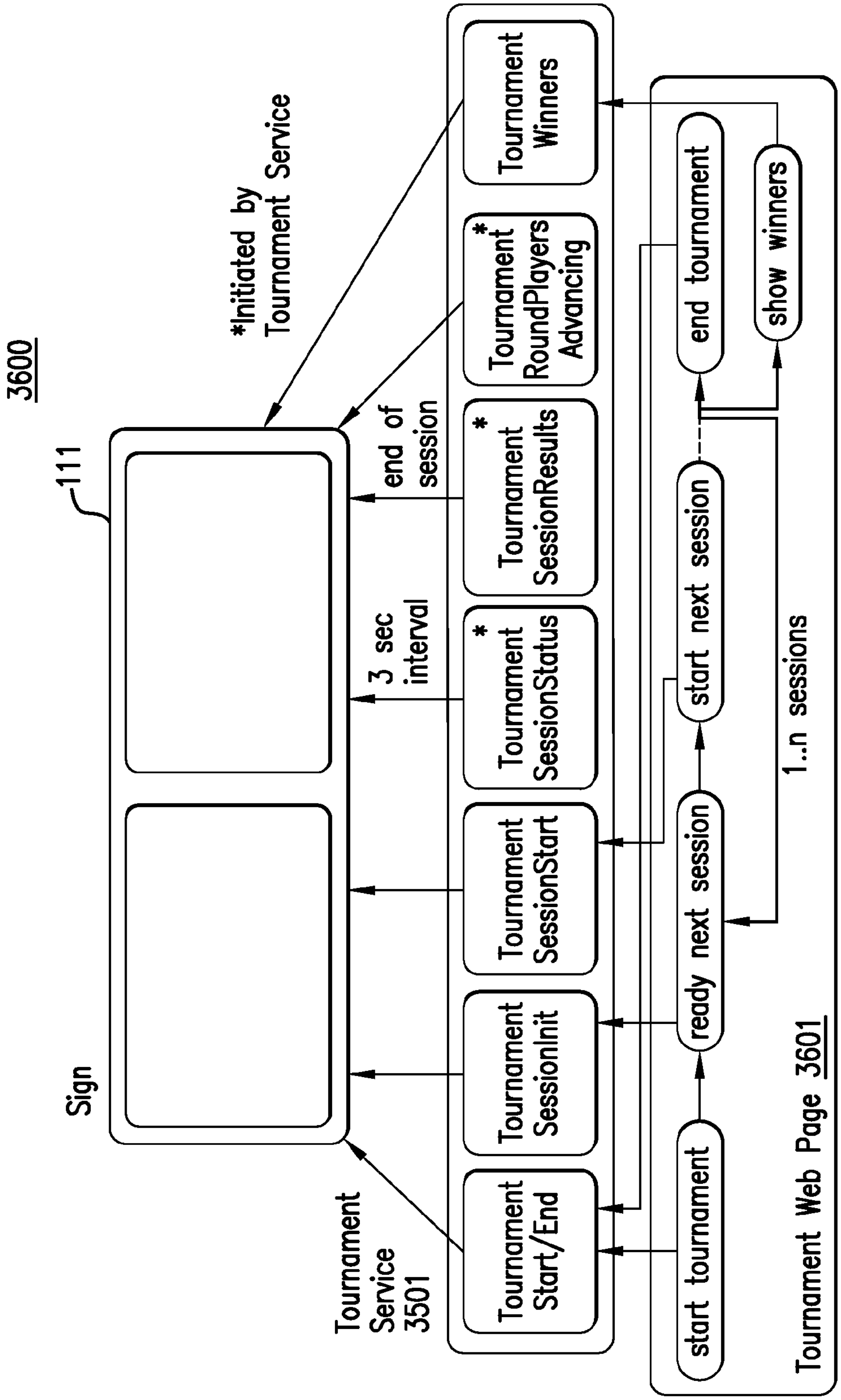
FIG. 36 illustrates an example convertible display system in a flow-style format in accordance with one or more embodiments wherein an overhead display (or designated gaming machine displays are provided display instructions through a tournament service in accordance with one or more embodiments.

Referring to FIG. 35, example overhead display communication network 3500 is shown in accordance with one or more embodiments. In this network 3500 overhead display 111 may receive communications from tournament service 3501 (implemented through control center server 101). Overhead display 111 may also communicate with sign manager service 3503 (which may be provided through SIGN server 3301 shown in FIG. 33A), and with network address discovery service 3505. This latter service, network address discovery service 3505 may be provided through a network server, such as a host server. Overhead display 111 may communicate with the three different services. Communications between overhead display 111 and network address (i.e. IIS) discovery service 3505 may use protocols, such as XML over UDP and XML over TCP/IP. Communications between overhead display 111 and tournament service 3501 may use a protocol, such as SOAP over HTTP, XML over UDP and XML over TCP/IP. Communications between overhead display 111 and sign manager service 3503 may use a protocol, such as SOAP over HTTP, XML over UDP and XML over TCP/IP. Referring to FIG. 36, example convertible display system 3600 is shown in a flow-style format in accordance with one or more embodiments. FIG. 36 shows that overhead display 111 is provided display instructions through tournament service 3501 in accordance with tournament web page 3601 and associated programming. Web page 3601 may be provided through control center server 101. Tournament web page 3601 is shown with programming information as discussed above with respect to the various screens which may be displayed to an authorized user (operator) at a user interface connected to control center server 101 and through which an authorized user may set up various parameters of one or more tournaments or competitive events. In accordance with the programming and execution thereof by control center server 101 and SIGN server 3301 (which may be incorporated within control center server 101), upon receiving a start tournament input, tournament service 3501 may populate a tournament start/end ('Tournament Start/End') display data set and transmit to overhead display 111 for display in display area (2). Another input may be to ready the next session, which may trigger tournament service 3501 populating and transmitting a tournament session initializing ('Tournament SessionInit') display set for display in display area (2). Another input may be to start the next session, which may trigger tournament service 3501 to transmit a tournament session start ('Tournament SessionStart') display set for display in display area (2). The programming may loop for up to 'n' sessions as defined by the operator and programmed into the tournament data set.

Simultaneous with the execution of the tournament and related displays in display area (2), tournament service 3501 also transmits a tournament session status ('Tournament SessionStatus') data set for display in display area (1) which may be updated periodically, e.g. each three seconds. The tournament session status data set may also be displayed together with live video feed of the respective players, ranked 1-n on the leader board, which may be displayed on a rotational basis, e.g. each eight seconds.

Following the completion of all sessions, an end tournament signal may trigger tournament service 3501 to transmit a tournament end ('Tournament Start/End') display set for display in display area (2). Also, simultaneously with the end tournament signal, a show winners signal may trigger transmission of a winners dataset for display in display area (1). Additionally tournament service 3501 may transmit tournament session results and tournament round players advancing data sets for display in display area (1).

Figure 37:
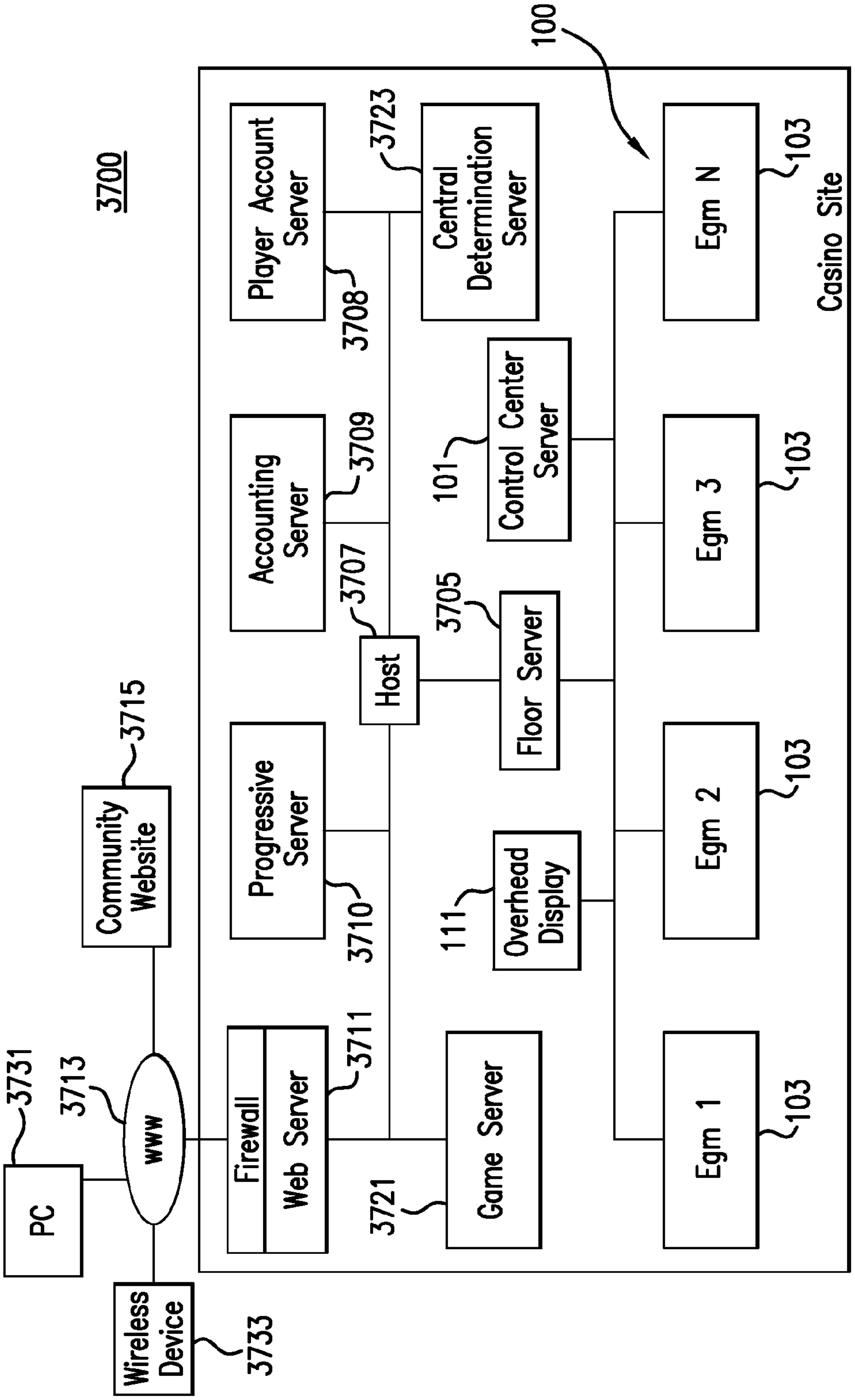
FIG. 37 illustrates an example block diagram of an example gaming network in accordance with one or more embodiments.

Referring to FIG. 37, a block diagram of example networked gaming system 3700 associated with one or more gaming facilities is shown including host server 3707 connecting to a set of backend servers and floor server 3705 which in turn connects to a network of gaming machines 103 including one or more convertible in-revenue/out-of-revenue gaming systems 100 in accordance with one or more embodiments. Each of the convertible in-revenue/out-of-revenue gaming systems 100 includes control center server 101, one or more banks of the networked gaming machines 103, and overhead display 111 (optionally) operably connected to automatically convert the gaming operating mode of each of the banks from in-revenue to out-of-revenue and vice-versa as described above.

As shown in FIG. 37 one or more overhead displays 111 and one or more control center servers 101 may be network connected through Floor Server 3705 to Host Server 3707 which in turn connects to various back-end servers, such as player account server 3708, accounting server 3709, progressive server 3710, web server 3711, game server 3721, and central determination server 3723 (the latter being employed in the case of Class II gaming operations for example).

In one or more embodiments, game server 3721 may provide server-based games and/or game services to network connected gaming devices, such as gaming machines 103 (which may be connected by network cable or wirelessly). Progressive server 3710 may accumulate progressive awards by receiving defined amounts (such as a percentage of the wagers from eligible gaming devices or by receiving funding from marketing or casino funds) and provide progressive awards to winning gaming devices upon a progressive event, such as a progressive jackpot game outcome or other triggering event such as a random or pseudo-random win determination at a networked gaming device or server (such as to provide a large potential award to players playing the community feature game). Accounting server 3709 may receive gaming data from each of the networked gaming devices and perform audit functions. Player account server 3708 may maintain player account records and persistent data such as accumulated player points. With reference to FIG. 37, while a few servers have been shown separately, they may be combined or split into additional servers having additional capabilities. In particular, the controller functions provided by central control server 101 may be performed by floor server 3705 or some other physical data processing system included in networked gaming system 3700.

In one or more embodiments, networked gaming system 3700 may include web server 3711 connected to a public web network, such as worldwide web (WWW) network 3713. Community Website 3715 may externally connect through network 3713 to web server 3711 through a firewall in order to provide access by networked gaming system 3700 to player information, such as a player's community website game or associated points obtained from non-wagering gaming activity. Such a service, for example, may be offered to a casino operator on a fee basis or through a subscription service with the community website provider, whereby a casino operator may access a player's records, view a player's activity at community website 3715, and choose, based on the player's activity, to offer or provide promotional credits or incentives to the player at the casino operator's facilities.

Community website 3715 may offer players a variety of games to play including a tournament or other competitive game which may be operated substantially as disclosed above. For example, the website may include a menu of available games which may include tournament or tournament qualifying games that may be played at the request of a player-visitor to community website 3715. In these examples, one or more tournaments or competitions may be programmed, such as through control center server 101 as substantially described herein or a server hosting community website 3715, and made available for participants to enroll (such as by paying a fee using a credit card or, if no fee is required, by simply entering a player name) and play a game associated with a selected tournament or competition during an active period of the selected tournament or competition, such as during a 24 hour, 1 week, or 1 month period. The scores achieved by each of the participants during the active tournament or competition period may be posted on a leader board that may be displayed on Community Website 3715. Each participant may play the associated game on personal computer 3731 or wireless device 3733, such as an iPad® tablet or, an iPhone® or Blackberry® phone, personal data assistant, etc. which may connect through internet 3713 to Community Website 3715. Each participant may use the associated keyboard or touchpad of their internet device as a user interface to perform the functions of a button deck on gaming machines 103 and view the game (such as a five-reel video game, e.g. FIG. 6) through the associated display. In one or more embodiments, in addition to the conventional game play initiated by pressing the play button (e.g. 'enter' button on player keyboard), random or pseudo-random interactive bonus features may display on or about the game display and player may have the opportunity to score additional points by popping or selecting one or more items (e.g. balloons, FIG. 28 et seq), such as by pressing the 'space' bar.

While playing, if the participant has a video camera operational, the participant's video stream may be displayed on a webpage of Community Website 3715 along with a real-time updated score and position on the leader board. Also, any other participants who may be playing in the selected tournament or competition, may have their video, score, and position displayed either simultaneously with the other participants or on a rotational basis. Depending upon the size of the participant's display, a portion of the player's screen may be used for the game while another portion may show the leader board and participant videos.

After a participant's game play, each participant's score may be posted, along with a name (which may be a player selected pseudonym) and picture (which may be a captured image or images from the video camera, a player uploaded still image, or a player selected avatar still or video image such as from a set of avatar images available through Community Website 3715 or player uploaded). Once the period of the tournament or competition has passed, awards may be posted or credited to player accounts of winning participants and redeemed, such as by the winning participant requesting a credit be applied to a player's credit card account or a player card account associated with a gaming operator (e.g. MGM, Wynn, TI, Caesar's Palace, Mandalay Bay, etc.).

The tournaments or competitions as described may be played on demand by a participant, in which case players may be provided a window of time in which to play in the tournament or competition, such as a day, week, or month. Alternatively, the tournaments or competitions may be scheduled as described herein by programming such as through the use of control center server 101 and played on a scheduled basis with a fixed start and stop time. Tournaments or competitions may be played in sessions or at one time. Tournaments or competitions may include several heats, such that winners from sessions in a first heat may advance to play in a second heat and so forth until a final heat is completed to determine the winners.

In either the on-demand or scheduled tournaments or competitions, participants may qualify to participate in follow-on tournaments or competitions which may be played online (such as at Community Website 3715) or at a physical location, such as a designated casino facility (e.g. Wynn, Caesar's Palace, Mandalay Bay, etc.). For example, winners online may receive an expense paid trip to the Wynn for a weekend plus an invitation to play in a tournament at the Wynn with a chance to win various additional prizes and awards. Similarly, online winners may qualify to participate in further online tournaments with additional prizes and awards.

In one or more embodiments, as in system 100 shown in FIG. 1, players may play a wagering game provided through Community Website 3715 during periods when the players are not playing a tournament or competition. When a tournament or competition is preparing to initiate in accordance with programming executed by control center server 101 (or a comparable server), control center server 101 may send a message to the player that the tournament or competition is due to begin and convert the game being played by the player to the tournament or competition game or operating mode.

The conversion may be initiated following play of a given game, credits, and any other game state (such as a bonus feature with free games) may be stored by the server; and, following the completion of the tournament or competition, the original game may be restored so that the player may complete any further play desired.

In one or more embodiments, a selected tournament or competition may be programmed to play in-revenue. For example, at the beginning of the tournament or competition play, a player may be prompted to add a specified amount to the credit meter (e.g. $100). When tournament or competition play is initiated, maximum bets may be played until the designated time of play ends or the player's credit meter goes to zero. The leader board position may be determined by the amount of credits on a player's credit meter during course of play (for example, if the tournament or competition has a scheduled start and stop time) until the end of play when the winning players are determined based on ending positions. In the case of an on-demand tournament or competition, a player may select the tournament or competition to be played, apply the required credits to the credit meter, and play the game with maximum wagers until the game play time period expires. In one or more embodiments, a player may not be required to apply maximum bets to each game play. For example, if a player is able to determine that the player has sufficient credits on the credit meter to place in the tournament or competition, the player may adapt a strategy to make minimum bets needed to finish the tournament or competition. At the end of the tournament/competition, the player's credit meter may be incremented by an award from the tournament/competition based on the participant's place on the leader board in the case of a scheduled tournament/competition. In the case of an on-demand tournament/competition, a participant's account may be incremented at a later time based on the participant's placement at the end of the tournament/competition playing period.

In one or more embodiments, a selected tournament or competition may be programmed to play out-of-revenue. For example, a player may pay an entry fee to enroll in a selected tournament. When the tournament is ready to begin, either initiated by the player in an on-demand tournament/competition or by the server in a scheduled tournament/competition, the game display shows the tournament game (such as a five-reel video game, e.g. FIG. 6) and an initial score (e.g. 10000 credits/points) on the credit meter. Once the game begins, the player may press the play button (or associated button on the player's keyboard) and depending upon the game outcomes, the score on the credit meter may increment. Conventionally, the credit meter is not decremented for each game play as may be the case for in-revenue game operations.

In the case of out-of-revenue tournaments or competitions, awards may be provided by a sponsor (such as a casino operator) or the website operator from marketing funds, entry fees, or a combination thereof. In the case of in-revenue tournaments or competitions, the tournament or competition award pool may be similarly funded and/or be funded by a portion of coin-in, either during regular non-tournament/competition play, during tournament/competition play, or a combination thereof.

To utilize all the features and games of Community Website 3715, a player may have an opportunity to sign-up to establish an account. For example, a registered player may be provided free playing credits of no remunerative value (non-cashable credits) but which may be used to play various wagering games on Community Website 3715. By playing one or more of the games, the player may accumulate player points to establish a playing record which may later be accessed by a subscribing casino operator as described above. In one or more embodiments, the accumulated player points may have a remunerative value, such as for obtaining rewards. An example reward may be an all expenses paid trip to the Encore resort & casino in Las Vegas. Another example may be promotional credits for use at a designated gaming facility. Each of these rewards may be sponsored by the respective casino operator, or the community website provider may offer such rewards as part of its player incentive program.

In one or more embodiments, a casino operator may be able to program its player account server to provide player rewards (based on player online game play) through a player console (not shown, similar to a cash/ticket voucher kiosk or ATM) network connected to host server 3707. For example, a player may use a player console interface to enter the player's community website account information and request promotional credits or some other award made available by the casino operator. In such case, such rewards may automatically be applied to a player's account associated with the casino operator or the player console may print a ticket with an associated credit value. In either case, the player may access the rewards at a gaming machine by inserting the ticket and having the ticket value credited to the credit meter, or, by inserting the player card and requesting the credits be downloaded to the gaming machine. Alternatively, the player may obtain a player reward at a player window located at the operator's facility by providing identification information to the attendant and requesting a player reward.

Figure 38:
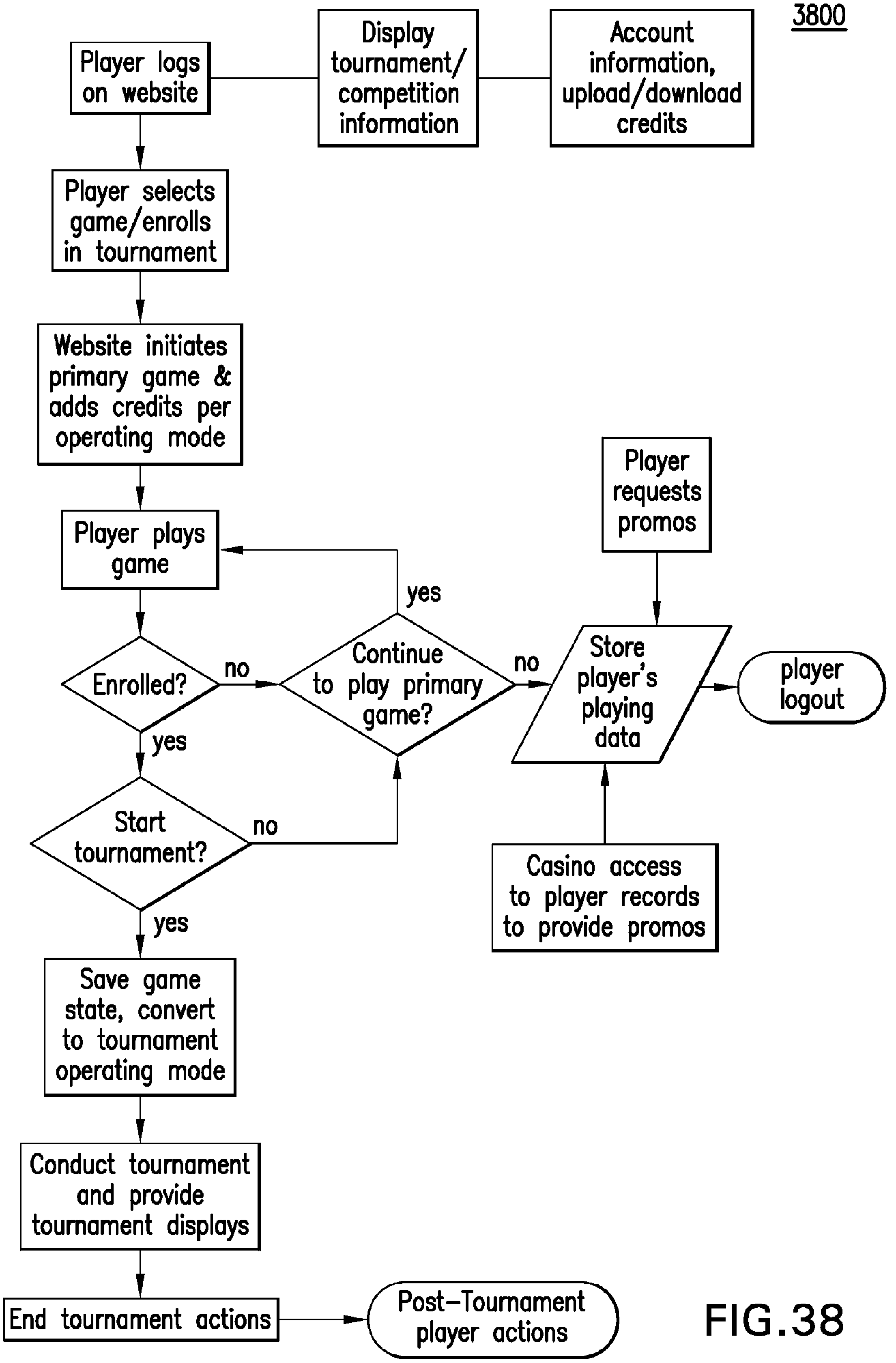
FIG. 38 illustrates an example flowchart of a web-based tournament or competition-style game in accordance with one or more embodiments.

Referring to FIG. 38, an example flowchart of web-based community game process 3800 is shown in accordance with one or more embodiments wherein a player may log into Community Website 3715 through personal computer (PC) 3731 or wireless device 3733 (such as an Apple iPhone® or iPad®), or any other suitable Internet-enabled device which may function as a player station by which a player may participate in games made available through Community Website 3715. By example, a player logs into Community Game website 3715 from home PC/wireless phone 3731/3, etc. and the player is provided points or virtual dollars or uploads credits through a credit card or from a player account (established by player on website) to play a player-selected Primary Game (selected from a set of available wagering games, e.g. reel-based or card video game). The player then plays the Primary Game and accumulates points/credits. The player may optionally enroll to play a tournament or competition game which is initiated either by a player (in the case of an on demand tournament/competition) or by a tournament server (in the case of a scheduled tournament/competition). The tournament server (which may be implemented to provide controller functions similar to central control server 101) stores the game state of the player selected Primary Game (or directs the device 3731 or 3733 to store the game state) and converts the game display to a tournament/competition game. Once the tournament begins, the player plays the game to accumulate points/credits and the tournament server may cause the leader board to be displayed and updated in real-time and player video feeds (if available) to be displayed on the player's display (through a web page, shown on the player's display or otherwise) and perhaps in a designated area of one or more other web pages of Community Website 3715. Once the tournament/competition play is completed, the game display may revert back to the player selected Primary Game and restore the prior game state. In the event that the tournament/competition was scheduled and the tournament/competition is completed, then the player may be paid an award based on the player's finishing position. The award may be credited to the player's credit meter or player account.

In the event that the credits are cashable, player can request a credit to player's credit card or, to a player account at a gaming operator (e.g. Wynn, Caesar's Palace, etc.)

In one or more alternative embodiments, player awards may not be cashable, in which case, player may play for points and may accumulate awards redeemable through Community Website 3715 or an affiliated casino site (for example, promotional credits may be applied to a patron account when the player identifies themselves and opens (or has an existing) player account). Also, the Community Website server may store player information including accumulated points, and this information may be accessed by the networked Casino Site when the player identifies themself at a Casino Site player desk. Corresponding promo credits may be applied to the Casino Patron Account.

Figure 39:
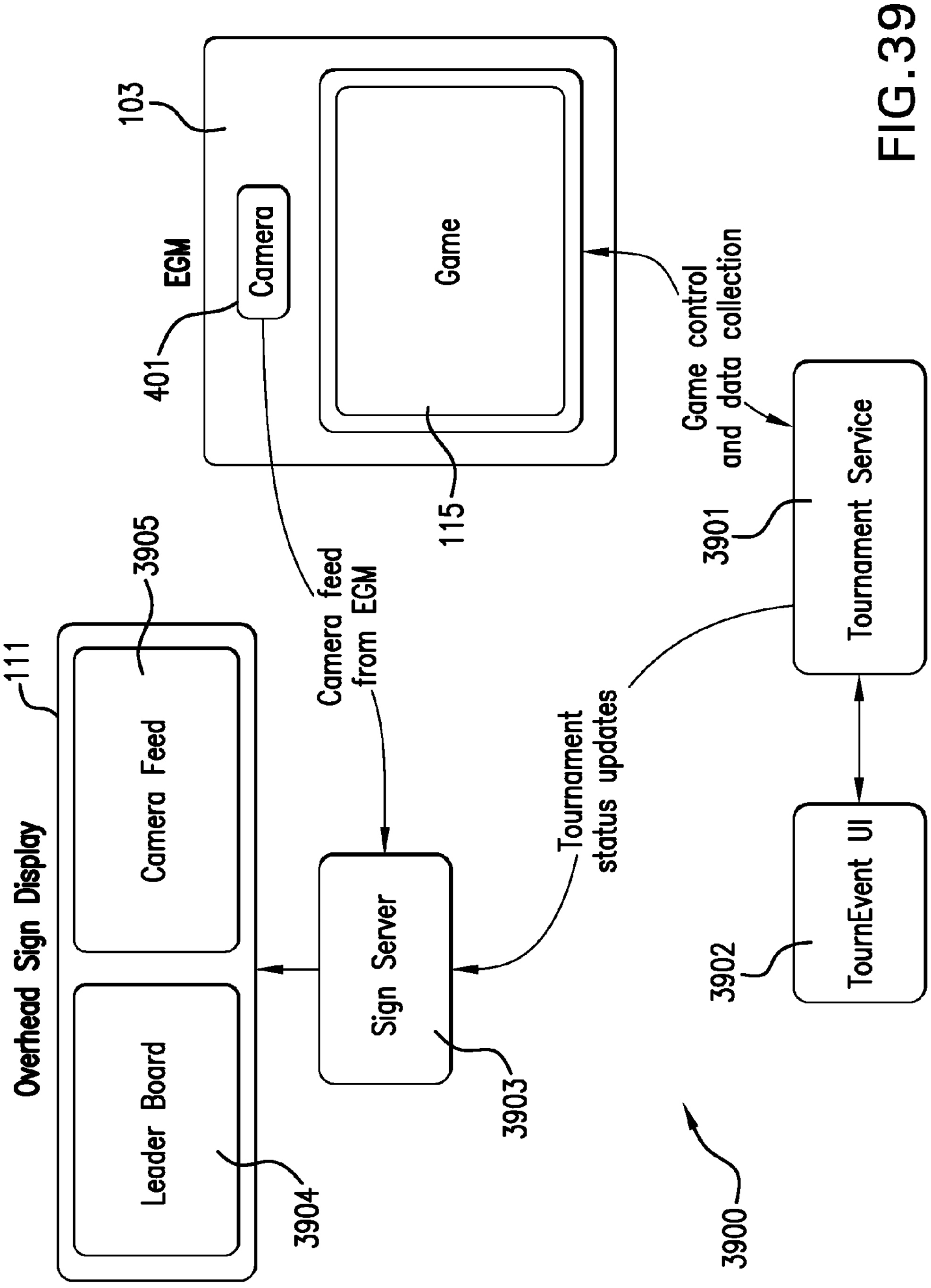
FIG. 39 is a diagrammatic representation of an implementation for collecting and distributing live video from the various video cameras included in a convertible individual play and tournament play gaming system.

FIG. 39 illustrates a system 3900 for capturing a video camera feed from a gaming machine 103 (labeled EGM in the figure) and displaying the video on overhead display 111. System 3900 includes a tournament service 3901 with a user interface 3902, and also includes a sign server 3903. It will be appreciated that although FIG. 39 shows only a single gaming machine 103 and associated display device 115 in order to simplify the drawing, a convertible tournament system will include a number of gaming machines in the indicated communication with tournament service 3901 and sign server 3903.

Tournament service 3901 comprises a number of functions performed by a suitable data processing device. For example, tournament service 3901 may be implemented through control center server 101 shown in FIG. 1. Regardless of the data processing device through which it is implemented, tournament service 3901 sends game control information to each connected gaming machine 103. Such instructions include instructions for converting the gaming machine operation from individual play to tournament mode group play. In addition to communications with the gaming machines 103, tournament service 3901 also communicates tournament status updates to sign server 3903. This tournament update information allows sign server 3903 to, among other things, produce and maintain the leader board graphic 3904 shown in a portion of overhead display 111. Sign server 3903 also receives the player video feed from each gaming machine camera 401 and selects which video feed to display in camera feed area 3905 of overhead display 111 at a given time.

It should be appreciated that all of the above-described options for switching and controlling the video feed displayed on overhead display 111 may be employed in the arrangement shown in FIG. 39. Also, although information for advertising and non-tournament displays may be provided through a different service not shown in FIG. 39, sign server 3903 may also cause overhead display 111 to display advertisements, entertaining graphics, and other graphic displays during times that a tournament is not being conducted through system 3900, and perhaps even during tournament play.

Figure 40:
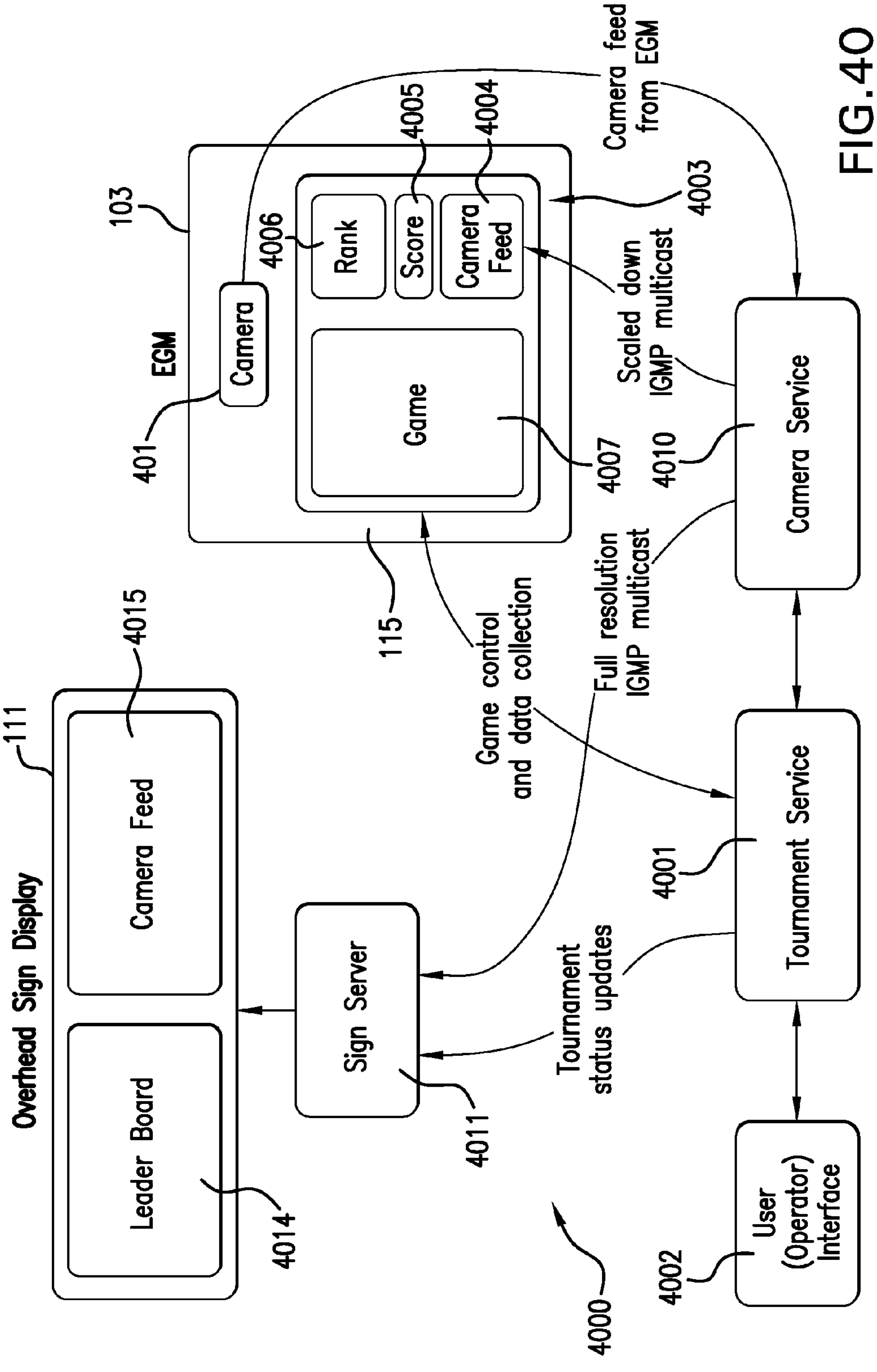
FIG. 40 is a diagrammatic representation of an alternate implementation for collecting and distributing live video from the various video cameras included in a convertible individual play and tournament play gaming system.

FIG. 40 shows an alternate system 4000 for handling video feeds from various gaming machines such as the single gaming machine 103 shown in the figure for purposes of example. Similar to the arrangement shown in FIG. 39, system 4000 includes a tournament service 4001 with a user (operator) interface 4002. System 4000 also includes a sign server 4011 adapted to control the graphic displays produced by overhead display 111, including a leader board graphic in display area 4014 and a player video shown in area 4015. Unlike system 3900 shown in FIG. 39, FIG. 40 shows the display 115 of gaming machine 103 divided to show a game in area 4007 and also a player dashboard 4003 similar to player dashboard 2803 described above in connection with FIG. 28. In particular, player dashboard 4003 includes a video feed area 4004 for showing a player video feed, an area 4005 for showing a player score, and an area 4006 for showing player rank. As discussed in connection with player dashboard 2803 above, the rank and score may be those for the player at the particular gaming machine 103, while the player video may switch between a number of players in the tournament, and in some cases just the top-ranked players for the ongoing tournament. The video shown at area 4004 may also be switched to the winning player upon completion of the given tournament.

In system 4000 shown in FIG. 40, the gaming machine camera 401 of each respective gaming machine included in the system communicates its video feed to a camera service 4010. Camera service 4010 comprises a number of functions implemented through a suitable data processing device. For example, camera service 4010 may be implemented through the same processing device used to implement tournament services 4001 (such as control center server 101 in FIG. 1, for example). Alternatively, camera service 4010 may be implemented through some other suitable data processing device. Regardless of the data processing device through which it is implemented, camera service 4010 functions to receive the camera feed from each gaming machine camera 401 and processes the different feeds to produce the proper video streams for both the gaming machine display 115 (in area 4004) and overhead display 111. In particular, the video feed received from the cameras 401 may be scaled down in resolution and formatted properly to be displayed in area 4004 of the respective gaming machine display 115, and may also be communicated at a resolution and format appropriate for display in the camera feed area 4015 of overhead display 111. In the particular embodiment shown in FIG. 40, camera service 4010 multicasts the feeds to sign server 4011 and to each gaming machine 103. Because the multicast may be consumed by any number of clients, the video feeds may be integrated into any future additions to the system without making changes to the camera service infrastructure. For example, although example system 4000 shows only a single sign server 4011, it will be appreciated that the system supports multiple signs servers. Furthermore, each sign server can support multiple overhead sign displays. These capabilities allow a gaming facility (casino) to place overhead sign displays throughout the facility to increase exposure for the tournament gaming system.

It will be noted that camera service 4010 is shown in FIG. 40 as having two-way communications with tournament services 4001. The communications from tournament service 4001 and camera service 4010 include video stream selection information for causing camera service 4010 to communicate the desired video stream to sign server 4011 and to each respective gaming machine 103. Communications from camera service 4010 to tournament service 4001 include camera status information and instruction acknowledgements.

Although the example systems shown in FIGS. 39 and 40 each show only a single sign server, it will be appreciated that alternate systems may include multiple sign servers. Also, a single sign server such as sign server 3903 or 4011 may drive more than one overhead display.

Referring generally to the forgoing description and to the following claims, as used herein the terms "comprising," "including," "carrying," "having," "containing," "involving," and the like are to be understood to be open-ended, that is, to mean including but not limited to. Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described example embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A gaming machine operable in a group play operating mode, the gaming machine including:

a processor;

a memory including one or more games executable by the processor, at least one of the games comprising a group play game being playable in a group play operating mode;

one or more displays operably connected to the processor;

a user interface operable by a player to initiate play of the group play game;

the group play game including a set of possible outcomes and a paytable, the set of possible outcomes including a set of possible winning outcomes, and the paytable including a set of awards corresponding to the possible winning outcomes;

responsive to initiation of a play in the group play game, the processor being operable to obtain a randomly or pseudo-randomly determined game outcome and instruct a first of the one or more displays to display a game presentation for the group play game in accordance with the game outcome for the play in the group play game;

in the event that the game outcome is one of the possible winning outcomes, the processor being operable to determine an award using the paytable;

in the group play operating mode, the processor being operable to instruct the one or more displays to display a player dashboard including player position information in the group play game, the player dashboard being simultaneously viewable with the game presentation for the group play game;

the gaming machine further comprising a video camera, the video camera operable to capture a live player video feed for display on the one or more displays, and wherein:

the processor is operable to transfer a player score and a player position to the one or more displays substantially in real-time, the player position comprising the position of the player relative to other players participating in the group play game;

the player dashboard includes a player display area, a player position display area, and a player score display area;

the live player video feed is displayable in the player display area substantially in real-time;

the player position is displayable in the player position display area simultaneously with the live player video feed; and the player score is displayable in the player score display area simultaneously with the live player video feed.

2. The gaming machine of claim 1 wherein the first display includes a first and second display area, the first display area displaying the game presentation for the group play game, and the second display area displaying the player dashboard.

3. The gaming machine of claim 2 wherein the first display area is expandable and the second display area is compressible by a first player input to the user interface.

4. The gaming machine of claim 3 wherein the first display area is compressible and the second display area is expandable by a second player input to the user interface.

5. The gaming machine of claim 3 wherein the user interface includes a touch sensitive panel overlaying the first display, the second display area being collapsible by a player tap on a portion of the touch sensitive panel overlaying the second display area.

6. The gaming machine of claim 1 further including a leader board display area on the one or more displays, and wherein:

the processor is operable to transfer a list of a predetermined number of positions and names of players of the group play game, the list being in an order based on scores for the respective players;

the list is displayable in the leader board display area substantially in real-time.

7. The gaming machine of claim 1 wherein the first display comprises a video display.

8. The gaming machine of claim 1 wherein the first display comprises a set of mechanical reels and a panel overlaying the mechanical reels; and wherein each of the mechanical reels includes a flexible video strip, each video strip including a set of symbol positions, each video strip operable to display a respective symbol in each of the symbol positions in accordance with the game, and in the event that a second game is installed on the gaming machine, the processor is operable to instruct each video strip to modify or change the respective symbol in each of the symbol positions in accordance with the second game.

9. The gaming machine of claim 1 wherein the display comprises a set of mechanical reels and a panel overlaying the mechanical reels;

each of the mechanical reels including a strip, each strip including a set of symbol positions with corresponding symbols or blanks;

the panel comprising a display, transparent in a first operating mode, and opaque in a second operating mode, wherein a first game is operable on the gaming machine in the first operating mode and a second game is operable on the gaming machine in the second operating mode;

in the event that the first game is operable on the gaming machine, the processor operable to instruct the panel to operate in the first mode and instruct the display to display a game presentation using the mechanical reels in accordance with the first game;

in the event that the second game is operable on the gaming machine, the processor operable to instruct the panel to display a set of reels in the second operating mode and to display a game presentation in accordance with the second game.

10. The gaming machine of claim 1 wherein the processor is operable to transfer content for a leader board to one of the one or more displays substantially in real-time;

the one of the one or more displays being operable to display the leader board while the player dashboard is simultaneously being displayed, the leader board and the player dashboard both being updated substantially in real-time.

11. The gaming machine of claim 10 wherein the display to which the content for the leader board is transferred is positioned above a primary display for the gaming machine.

12. The gaming machine of claim 10 wherein the display to which the content for the leader board is transferred is positioned to a lateral side of a primary display for the gaming machine.

13. The gaming machine of claim 1 wherein the one or more games comprise two or more pre-loaded games, each pre-loaded game separately executable by the processor depending on the operating mode.

14. A method of operating a number of gaming machines in a group play operation mode to conduct a group game competition, the method including:

placing each of the number of gaming machines in a group play mode in which a respective player operating the respective gaming machine is enabled to initiate one or more plays in a group play game at the respective gaming machine;

responsive to each initiation of a play in the group play game at a respective gaming machine, displaying a respective group play game result in a group play game presentation area at the respective gaming machine;

at each respective gaming machine, maintaining a respective group play game score based on the outcomes of the individual plays in the group play game at that gaming machine;

each gaming machine periodically communicating the respective group play game score maintained at that gaming machine to a group play controller;

at the group play controller, maintaining the current position of each player in the group game competition relative to each other player in the group game competition based on the current group play game scores of the respective players;

for each respective player, periodically communicating the current position of that respective player to the respective gaming machine at which that respective player is playing the group play game;

at each gaming machine, displaying the current position of the player playing the group play game at that respective gaming machine, the current position being displayed in a player dashboard display area which is displayed simultaneously with the group game play results in the group play game presentation area;

wherein the group play controller also generates leader board information based on the current position of each player, and periodically communicates the leader board information to each respective gaming machine; and each respective gaming machine displays a leader board based on the leader board information communicated from the group play controller, the leader board indicating the relative position of at least a number of players currently leading the group game competition.

15. The method of claim 14 wherein the leader board is displayed on a display device at the respective gaming machine different from a display device displaying the player dashboard at the gaming machine.

16. The method of claim 14 wherein the player dashboard at each gaming machine also includes a player score area displaying a current score for the player in the group game competition.

* * * * *